United States Patent
Park et al.

(10) Patent No.: US 12,287,794 B2
(45) Date of Patent: *Apr. 29, 2025

(54) DATA SERIALIZATION IN A DISTRIBUTED EVENT PROCESSING SYSTEM

(71) Applicant: Oracle International Corporation, Redwood Shores, CA (US)

(72) Inventors: Hoyong Park, San Jose, CA (US); Sandeep Bishnoi, Pleasanton, CA (US); Prabhu Thukkaram, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,127

(22) Filed: Apr. 14, 2023

(65) Prior Publication Data

US 2023/0252028 A1    Aug. 10, 2023

Related U.S. Application Data

(63) Continuation of application No. 15/700,784, filed on Sep. 11, 2017, now Pat. No. 11,657,056.
(Continued)

(51) Int. Cl.
*G06F 16/2455* (2019.01)
*G06F 8/35* (2018.01)
(Continued)

(52) U.S. Cl.
CPC ......... *G06F 16/24568* (2019.01); *G06F 8/35* (2013.01); *G06F 9/542* (2013.01);
(Continued)

(58) Field of Classification Search
None
See application file for complete search history.

(56) References Cited

U.S. PATENT DOCUMENTS 5,875,329 A    2/1999    Shan
6,501,852 B1    12/2002    Clark et al.
(Continued)

FOREIGN PATENT DOCUMENTS

CN    1451497 A    10/2003
CN    1689298 A    10/2005
(Continued)

OTHER PUBLICATIONS

Cluster Mode Overview, Spark 2.0.0 Documentation, Available Online at: http://spark.apache.org:80/docs/2.0.0/cluster-overview.html, Sep. 3, 2016, 3 pages.
(Continued)

*Primary Examiner* — Amresh Singh
(74) *Attorney, Agent, or Firm* — Kilpatrick Townsend & Stockton LLP

(57) ABSTRACT

A distributed event processing system is disclosed that receives a batch of events via a continuous data stream and performs the serialization of data in the batch of events. In certain embodiments, the system identifies a first data type of a first attribute for each event in a batch of events and determines a first type of data compression to be performed on data values represented by the first attribute. The system determines a first type of data compression to be performed on data values represented by the first attribute based on the first data type of the first attribute. The system then generates a first set of serialized data values for the first attribute. The system processes the first set of serialized data values against a set of one or more continuous queries to generate a first set of output events.

17 Claims, 31 Drawing Sheets

Related U.S. Application Data

(60) Provisional application No. 62/395,216, filed on Sep. 15, 2016.

(51) Int. Cl.
*G06F 9/54* (2006.01)
*G06F 16/21* (2019.01)
*G06F 16/2453* (2019.01)
*G06F 16/248* (2019.01)
*G06F 16/27* (2019.01)
*G06F 16/901* (2019.01)
*G06F 16/903* (2019.01)
*G06F 16/242* (2019.01)

(52) U.S. Cl.
CPC ........ *G06F 16/21* (2019.01); *G06F 16/24532* (2019.01); *G06F 16/248* (2019.01); *G06F 16/278* (2019.01); *G06F 16/9024* (2019.01); *G06F 16/90335* (2019.01); *G06F 16/2433* (2019.01)

(56) References Cited

U.S. PATENT DOCUMENTS

| | | |
|---|---|---|
| 6,633,867 B1 | 10/2003 | Kraft et al. |
| 6,829,764 B1 | 12/2004 | Cohen et al. |
| 6,905,019 B2 | 6/2005 | Lacomis |
| 7,139,977 B1 | 11/2006 | Russell |
| 7,284,041 B2 | 10/2007 | Nakatani et al. |
| 7,546,284 B1 | 6/2009 | Martinez et al. |
| 8,190,738 B2 | 5/2012 | Ruehle |
| 8,195,648 B2 | 6/2012 | Zabback et al. |
| 8,260,803 B2 | 9/2012 | Hsu et al. |
| 8,713,038 B2 | 4/2014 | Cohen et al. |
| 8,918,371 B1 | 12/2014 | Prikhodko et al. |
| 9,286,352 B2 | 3/2016 | Park et al. |
| 9,298,788 B1 | 3/2016 | Kekre et al. |
| 9,405,854 B2 | 8/2016 | Jerzak et al. |
| 9,424,150 B2 | 8/2016 | Jerzak et al. |
| 9,535,761 B2 | 1/2017 | Park et al. |
| 9,672,082 B2 | 6/2017 | Thukkaram et al. |
| 9,697,262 B2 | 7/2017 | Chandramouli et al. |
| 9,712,645 B2 | 7/2017 | de Castro Alves et al. |
| 9,894,147 B1 | 2/2018 | Zalpuri et al. |
| 9,900,360 B1 | 2/2018 | Aranya et al. |
| 9,934,263 B1 | 4/2018 | Black et al. |
| 9,972,103 B2 | 5/2018 | de Castro Alves et al. |
| 10,095,547 B1 | 10/2018 | Kulkarni et al. |
| 10,217,256 B2 | 2/2019 | de Castro Alves et al. |
| 10,552,161 B2 | 2/2020 | Bao et al. |
| 10,628,424 B2 | 4/2020 | Park et al. |
| 10,789,250 B2 | 9/2020 | Park et al. |
| 10,795,935 B2 | 10/2020 | Bequet et al. |
| 11,573,965 B2 | 2/2023 | Stiel et al. |
| 11,657,056 B2 | 5/2023 | Park et al. |
| 2002/0056004 A1 | 5/2002 | Smith et al. |
| 2005/0027698 A1 | 2/2005 | Collet et al. |
| 2005/0119988 A1 | 6/2005 | Buch et al. |
| 2005/0192921 A1 | 9/2005 | Chaudhuri et al. |
| 2006/0167869 A1 | 7/2006 | Jones |
| 2006/0218123 A1 | 9/2006 | Chowdhuri et al. |
| 2007/0168154 A1 | 7/2007 | Ericson |
| 2007/0250487 A1 | 10/2007 | Reuther |
| 2008/0016095 A1 | 1/2008 | Bhatnagar et al. |
| 2008/0021914 A1 | 1/2008 | Davies et al. |
| 2008/0072221 A1 | 3/2008 | Chkodrov et al. |
| 2008/0098370 A1 | 4/2008 | Fontoura et al. |
| 2008/0133209 A1 | 6/2008 | Bar-Or et al. |
| 2008/0133594 A1 | 6/2008 | Fotinatos et al. |
| 2008/0165127 A1 | 7/2008 | Eom |
| 2008/0301135 A1 | 12/2008 | Alves et al. |
| 2009/0070786 A1 | 3/2009 | Alves et al. |
| 2009/0089078 A1 | 4/2009 | Bursey |
| 2009/0106190 A1 | 4/2009 | Srinivasan et al. |
| 2009/0106214 A1 | 4/2009 | Jain et al. |
| 2009/0125536 A1 | 5/2009 | Lu et al. |
| 2009/0125916 A1 | 5/2009 | Lu et al. |
| 2009/0216728 A1 | 8/2009 | Brainerd et al. |
| 2009/0292759 A1 | 11/2009 | Piper et al. |
| 2010/0022627 A1 | 1/2010 | Scherer |
| 2010/0030896 A1 | 2/2010 | Chandramouli et al. |
| 2010/0125572 A1 | 5/2010 | Poblete et al. |
| 2010/0250572 A1 | 9/2010 | Chen et al. |
| 2011/0035253 A1 | 2/2011 | Mason et al. |
| 2011/0084967 A1 | 4/2011 | De Pauw et al. |
| 2011/0126201 A1 | 5/2011 | Iyer et al. |
| 2011/0196891 A1 | 8/2011 | de Castro Alves et al. |
| 2011/0213802 A1 | 9/2011 | Singh et al. |
| 2011/0302151 A1 | 12/2011 | Abadi et al. |
| 2011/0302164 A1 | 12/2011 | Krishnamurthy et al. |
| 2012/0054173 A1 | 3/2012 | Andrade et al. |
| 2012/0059839 A1 | 3/2012 | Andrade et al. |
| 2012/0131139 A1 | 5/2012 | Siripurapu et al. |
| 2012/0158783 A1 | 6/2012 | Nice et al. |
| 2012/0185584 A1 | 7/2012 | Pandit |
| 2012/0259910 A1 | 10/2012 | Andrade et al. |
| 2012/0310916 A1 | 12/2012 | Abadi et al. |
| 2012/0331333 A1 | 12/2012 | Imaki |
| 2013/0073586 A1 | 3/2013 | Aubry et al. |
| 2013/0080413 A1 | 3/2013 | Chen et al. |
| 2013/0262502 A1 | 10/2013 | Majeed et al. |
| 2013/0347005 A1 | 12/2013 | Lam et al. |
| 2014/0006474 A1 | 1/2014 | White et al. |
| 2014/0059109 A1 | 2/2014 | Jugel |
| 2014/0095425 A1 | 4/2014 | Sipple |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095471 A1 | 4/2014 | Deshmukh et al. |
| 2014/0095535 A1* | 4/2014 | Deshmukh ........... G06F 16/313 707/769 |
| 2014/0156683 A1 | 6/2014 | de Castro Alves |
| 2014/0172506 A1 | 6/2014 | Parsell et al. |
| 2014/0195559 A1 | 7/2014 | Ko et al. |
| 2014/0324530 A1 | 10/2014 | Thompson et al. |
| 2014/0372550 A1 | 12/2014 | Said et al. |
| 2015/0094958 A1 | 4/2015 | Al-Dossary et al. |
| 2015/0103837 A1 | 4/2015 | Dutta |
| 2015/0169786 A1 | 6/2015 | Jerzak et al. |
| 2015/0193295 A1 | 7/2015 | Boger |
| 2015/0222696 A1 | 8/2015 | Park et al. |
| 2015/0256435 A1 | 9/2015 | Sum et al. |
| 2015/0363464 A1 | 12/2015 | Alves et al. |
| 2015/0381712 A1 | 12/2015 | de Castro Alves et al. |
| 2016/0004751 A1 | 1/2016 | Lafuente Alvarez et al. |
| 2016/0006779 A1 | 1/2016 | Zhou et al. |
| 2016/0034361 A1 | 2/2016 | Block et al. |
| 2016/0063080 A1 | 3/2016 | Nano et al. |
| 2016/0085772 A1 | 3/2016 | Vermeulen et al. |
| 2016/0085809 A1 | 3/2016 | de Castro Alves et al. |
| 2016/0085810 A1 | 3/2016 | de Castro Alves et al. |
| 2016/0162787 A1 | 6/2016 | Kumaran et al. |
| 2016/0171067 A1* | 6/2016 | Acker ................... G06F 16/25 707/627 |
| 2016/0232230 A1 | 8/2016 | Radivojevic |
| 2016/0239272 A1 | 8/2016 | Petri |
| 2016/0283610 A1 | 9/2016 | Simitsis et al. |
| 2016/0306827 A1 | 10/2016 | Dos Santos et al. |
| 2016/0328432 A1 | 11/2016 | Raghunathan |
| 2017/0006135 A1 | 1/2017 | Siebel et al. |
| 2017/0024912 A1 | 1/2017 | de Castro Alves et al. |
| 2017/0039245 A1 | 2/2017 | Wholey, III et al. |
| 2017/0075693 A1 | 3/2017 | Bishop et al. |
| 2017/0116050 A1 | 4/2017 | Thukkaram et al. |
| 2017/0116210 A1 | 4/2017 | Park et al. |
| 2017/0116289 A1 | 4/2017 | Deshmukh et al. |
| 2017/0228253 A1 | 8/2017 | Layman et al. |
| 2017/0322838 A1 | 11/2017 | Winters et al. |
| 2017/0339203 A1 | 11/2017 | Kekre et al. |
| 2018/0074870 A1 | 3/2018 | Park et al. |
| 2018/0075046 A1 | 3/2018 | Park et al. |
| 2018/0075099 A1 | 3/2018 | Park et al. |
| 2018/0075100 A1 | 3/2018 | Park et al. |

(56) References Cited

U.S. PATENT DOCUMENTS

| | | | |
|---|---|---|---|
| 2018/0075107 | A1 | 3/2018 | Park et al. |
| 2018/0075125 | A1 | 3/2018 | Stiel et al. |
| 2018/0075163 | A1 | 3/2018 | Park et al. |
| 2018/0189389 | A1 | 7/2018 | Baldini Soares et al. |
| 2018/0270164 | A1 | 9/2018 | Ahmed et al. |

FOREIGN PATENT DOCUMENTS

| | | | |
|---|---|---|---|
| CN | 1739093 | A | 2/2006 |
| CN | 1739107 | A | 2/2006 |
| CN | 1997995 | A | 7/2007 |
| CN | 101957832 | A | 1/2011 |
| CN | 102687124 | A | 9/2012 |
| CN | 104471572 | A | 3/2015 |
| CN | 105723335 | A | 6/2016 |
| JP | 2003208323 | A | 7/2003 |
| JP | 2006338432 | A | 12/2006 |
| JP | 2007513426 | A | 5/2007 |
| JP | 2008504601 | | 2/2008 |
| JP | 2011039820 | A | 2/2011 |
| JP | 2011059967 | A | 3/2011 |
| JP | 2012063826 | A | 3/2012 |
| JP | 2013058221 | A | 3/2013 |
| JP | 2016500168 | A | 1/2016 |
| WO | 2014089190 | A1 | 6/2014 |
| WO | 2015191120 | A1 | 12/2015 |
| WO | 2017070354 | A1 | 4/2017 |
| WO | 2018052907 | A1 | 3/2018 |
| WO | 2018052908 | A1 | 3/2018 |
| WO | 2018053338 | A1 | 3/2018 |
| WO | 2018053343 | A1 | 3/2018 |
| WO | 2018169429 | A1 | 9/2018 |
| WO | 2018169430 | A1 | 9/2018 |

OTHER PUBLICATIONS

Configuration-Spark 2.0.0 Documentation, Anonymous, Available Online at: https://web.archive.org/web/20160913085756/https://spark.apache.org/docs/latest/configuration.html#compression-and-serialization, Sep. 13, 2016, 14 pages.
Developer's Guide for Oracle Event Processing 11g Release 1 (11.1.1.9), Oracle Fusion Middleware, Oracle Corporation, Feb. 1, 2015, 914 pages.
Distributed Event Based Systems—Complex Event Processing, Available Online at: www.INF.FU-BERLIN.DE, Oct. 12, 2015, 23 pages.
Distributed Systems—Event Ordering in Multi-Stage Processing, Available Online at: http://cep4iot.blogspot.nl/2015/09/distributed-systems-event-ordering-in.html, Sep. 30, 2015, 2 pages.
Mapreduce, Wikipedia, The Free Encyclopedia, Accessed from Internet on Oct. 17, 2016, 11 pages.
Oracle Fusion Middleware Developer's Guide for Oracle Event Processing 11g Release 1 (11.1.1.9), Oracle Corporation, Available Online at: https://docs.oracle.com/cd/E37115_01/dev.1112/e27150.pdf, Feb. 1, 2015, 79 pages.
Overview of Creating Oracle Event Processing Applications, Oracle Fusion Middleware, Developer's Guide for Oracle Event Processing, Available Online at: https://docs.oracle.com/cd/E68505_01/eventprocessing/develop/introduction.htm, 2015, 23 pages.
Pig (Programming Tool), Wikipedia, The Free Encyclopedia, Accessed from Internet on Oct. 17, 2016, 4 pages.
Spark Configuration, 3.3.0 Documentation, Sep. 13, 2016, 16 pages.
Spark SQL, Data Frames and Datasets Guide, Spark 2.0.0 Documentation, Available Online at: https://spark.apache.org/docs/2.0.0/sql-programming-guide.html, Sep. 2, 2016, 29 pages.
Spark Streaming Programming Guide, Spark 2.0.0 Documentation, Available Online at: http://spark.apache.org:80/docs/2.0.0/streaming-programming-guide.html, Sep. 1, 2016, 34 pages.
U.S. Appl. No. 14/079,538, Final Office Action mailed on Feb. 27, 2019, 10 pages.
U.S. Appl. No. 14/079,538, Final Office Action mailed on Nov. 16, 2017, 25 pages.
U.S. Appl. No. 14/079,538, Final Office Action mailed on Jul. 27, 2016, 28 pages.
U.S. Appl. No. 14/079,538, Non-Final Office Action mailed on Apr. 7, 2020, 13 pages.
U.S. Appl. No. 14/079,538, Non-Final Office Action mailed on Jun. 20, 2018, 22 pages.
U.S. Appl. No. 14/079,538, Non-Final Office Action mailed on Mar. 31, 2017, 24 pages.
U.S. Appl. No. 14/079,538, Non-Final Office Action mailed on Oct. 22, 2015, 34 pages.
U.S. Appl. No. 14/302,031, Final Office Action mailed on Apr. 22, 2015, 23 pages.
U.S. Appl. No. 14/302,031, Non-Final Office Action mailed on Aug. 27, 2014, 19 pages.
U.S. Appl. No. 14/302,031, Notice of Allowance mailed on Nov. 3, 2015, 19 pages.
U.S. Appl. No. 14/610,971, Non-Final Office Action mailed on Dec. 19, 2016, 10 pages.
U.S. Appl. No. 14/610,971, Notice of Allowance mailed on Apr. 12, 2017, 11 pages.
U.S. Appl. No. 14/861,687, Non-Final Office Action mailed on Oct. 11, 2017, 10 pages.
U.S. Appl. No. 14/861,687, Notice of Allowance mailed on Jun. 6, 2018, 10 pages.
U.S. Appl. No. 14/866,512, Final Office Action mailed on Sep. 13, 2017, 25 pages.
U.S. Appl. No. 14/866,512, Non-Final Office Action mailed on Apr. 10, 2017, 24 pages.
U.S. Appl. No. 14/866,512, Notice of Allowance mailed on Feb. 15, 2018, 5 pages.
U.S. Appl. No. 15/095,766, First Action Interview Pilot Program Pre-Interview Communication mailed on Feb. 28, 2017, 4 pages.
U.S. Appl. No. 15/700,784, Final Office Action mailed on Oct. 27, 2020, 14 pages.
U.S. Appl. No. 15/700,784, Non-Final Office Action mailed on Oct. 19, 2022, 13 pages.
U.S. Appl. No. 15/700,784, Non-Final Office Action mailed on Apr. 7, 2020, 14 pages.
U.S. Appl. No. 15/700,784, Notice of Allowance mailed on Feb. 23, 2023, 5 pages.
U.S. Appl. No. 15/700,862, Non-Final Office Action mailed on Nov. 9, 2018, 15 pages.
U.S. Appl. No. 15/700,862, Non-Final Office Action mailed on Jun. 10, 2019, 22 pages.
U.S. Appl. No. 15/700,862, Notice of Allowance mailed on Jan. 30, 2020, 16 pages.
U.S. Appl. No. 15/700,914, Final Office Action mailed on Oct. 27, 2020, 9 pages.
U.S. Appl. No. 15/700,914, Final Office Action mailed on Apr. 21, 2023, 17 pages.
U.S. Appl. No. 15/700,914, Non-Final Office Action mailed on Nov. 22, 2022, 18 pages.
U.S. Appl. No. 15/700,914, Non-Final Office Action mailed on Jun. 1, 2020, 9 pages.
U.S. Appl. No. 15/701,019, Final Office Action mailed on Feb. 22, 2021, 9 pages.
U.S. Appl. No. 15/701,019, Non-Final Office Action mailed on Jun. 15, 2020, 9 pages.
U.S. Appl. No. 15/701,019, Notice of Allowance mailed on Oct. 26, 2022, 12 pages.
U.S. Appl. No. 15/706,226, Final Office Action mailed on Apr. 27, 2022, 70 pages.
U.S. Appl. No. 15/706,226, Non-Final Office Action mailed on May 1, 2020, 48 pages.
U.S. Appl. No. 15/706,226, Non-Final Office Action mailed on Nov. 17, 2021, 73 pages.
U.S. Appl. No. 15/706,226, Notice of Allowance mailed on Nov. 21, 2022, 12 pages.
U.S. Appl. No. 15/706,329, Non-Final Office Action mailed on Nov. 13, 2019, 15 pages.

(56) References Cited

OTHER PUBLICATIONS

U.S. Appl. No. 15/706,329, Notice of Allowance mailed on Mar. 11, 2020, 10 pages.
U.S. Appl. No. 15/706,407, Final Office Action mailed on Apr. 2, 2020, 9 pages.
U.S. Appl. No. 15/706,407, Non-Final Office Action mailed on Nov. 8, 2019, 11 pages.
U.S. Appl. No. 15/706,407, Notice of Allowance mailed on Jun. 17, 2020, 8 pages.
U.S. Appl. No. 16/559,907, Non-Final Office Action mailed on Jul. 10, 2020, 27 pages.
U.S. Appl. No. 16/559,907, Notice of Allowance mailed on Jan. 27, 2021, 18 pages.
U.S. Appl. No. 16/559,913, Non-Final Office Action mailed on Jun. 15, 2020, 8 pages.
U.S. Appl. No. 16/559,913, Notice of Allowance mailed on Oct. 27, 2020, 7 pages.
U.S. Appl. No. 16/950,127, Non-Final Office Action mailed on Mar. 17, 2022, 9 pages.
U.S. Appl. No. 16/950,127, Notice of Allowance mailed on Aug. 26, 2022, 7 pages.
U.S. Appl. No. 17/173,044, Non-Final Office Action mailed on Sep. 29, 2021, 35 pages.
U.S. Appl. No. 17/173,044, Notice of Allowance mailed on Mar. 25, 2022, 10 pages.
Alves et al., Getting Started with Oracle Complex Event Processing 11g, (Chapters 1, 2, 4, 5, 6), Packet Publishing, Mar. 26, 2013, 340 pages.
Arasu et al., CQL: A language for Continuous Queries Over Streams and Relations, Lecture Notes in Computer Science, vol. 2921, 2004, pp. 1-19.
Arasu et al., The CQL Continuous Query Language: Semantic Foundations and Query Execution, The VLDB Journal, vol. 15, No. 2, Jul. 22, 2005, pp. 121-142.
Balkesen et al., Scalable Data Partitioning Techniques for Parallel Sliding Window Processing over Data Streams, 8th International Workshop on Data Management for Sensor Networks, Available Online at: https://www.inf.ethz.ch/personal/cagri.balkesen/publications/dmsn2011.pdf, Aug. 29, 2011, pp. 1-6.
Barga et al., Coping with Variable Latency and Disorder in Distributed Event Streams, Proceedings of the 26th IEEE International Conference on Distributed Computing Systems Workshops, Jul. 4, 2006, 6 pages.
Bestehorn et al., Fault-tolerant Query Processing in Structured P2P-systems, Distributed and Parallel Databases, vol. 28, Issue 1, Aug. 2010, pp. 33-66.
Blumofe et al., An Analysis of Dag-Consistent Distributed Shared-Memory Algorithms, Proceedings of the Eighth Annual ACM Symposium on Parallel Algorithms and Architectures, Jun. 24-26, 1996, 12 pages.
Brito et al., Speculative Out-of-Order Event Processing with Software Transaction Memory, Proceedings of the Second International Conference on Distributed Event-Based Systems, Jul. 2008, pp. 265-275.
Chintapalli et al., Benchmarking Streaming Computation Engines: Storm, Flink and Spark Streaming, IEEE International Parallel and Distributed Processing Symposium Workshops (IPDPSW), May 23, 2016, pp. 1789-1792.
Chinese Application No. 201380063379.4, Office Action mailed on May 7, 2019, 10 pages (6 pages of English Translation and 4 pages of Original Document).
Chinese Application No. 201380063379.4, Office Action mailed on Feb. 2, 2018, 13 pages (7 pages of English Translation and 6 pages Original Document).
Chinese Application No. 201380063379.4, Office Action mailed on Oct. 9, 2018, 7 pages (4 pages of English Translation and 3 pages Original Document).
Chinese Application No. 201580001992.2, Office Action mailed on Mar. 5, 2019, 21 pages (10 pages of English Translation and 11 pages of Original Document).
Chinese Application No. 201680053838.4, Office Action mailed on May 29, 2019, 10 pages (6 pages of English Translation and 4 pages of Original Document).
Chinese Application No. 201680053838.4, Office Action mailed on Jan. 16, 2019, 15 pages (8 pages of English Translation and 7 pages of Original Document).
Chinese Application No. 201780054700.0, Office Action mailed on Oct. 9, 2022, 30 pages (16 pages of English Translation and 14 pages of Original Document).
Chinese Application No. 201780056813.4, Office Action mailed on Oct. 21, 2022, 13 pages (6 pages of English Translation and 7 pages of Original Document).
Chinese Application No. 201780057260.4, Office Action mailed on Sep. 28, 2022, 6 pages.
Debbabi et al., Controlling Self-Organising Software Applications with Archetypes, Institute of Electrical and Electronics Engineers, Available Online at: https://ieeexplore.ieee.org/stamp/stamp.jsp?arnumber=6394112, Sep. 10-14, 2012, 10 pages.
European Application No. 13815232.7, Office Action mailed on May 10, 2019, 5 pages.
European Application No. 13815232.7, Summons to Attend Oral Proceedings mailed on Aug. 8, 2019, 6 pages.
European Application No. 15708969.9, Office Action mailed on May 16, 2019, 5 pages.
European Application No. 16794796.9, Office Action mailed on Nov. 14, 2019, 6 pages.
European Application No. 17771969.7, Office Action mailed on Jun. 19, 2020, 8 pages.
European Application No. 17771969.7, Summons to Attend Oral Proceedings mailed on Feb. 11, 2021, 9 pages.
European Application No. 17771970.5, Office Action mailed on Aug. 7, 2020, 9 pages.
European Application No. 17771970.5, Summons to Attend Oral Proceedings mailed on Apr. 28, 2021, 9 pages.
European Application No. 19190843.3, Extended European Search Report mailed on Nov. 20, 2019, 9 pages.
Herrmannsdoerfer et al., Model-Level Simulation for COLA, Institute of Electrical and Electronics Engineers, Available Online at: https://dl.acm.org/doi/pdf/10.1109/MISE.2009.5069895?download=true, May 17-18, 2009, pp. 38-43.
Indian Application No. 201947003017, First Examination Report mailed on Sep. 10, 2021, 6 pages.
Indian Application No. 201947003550, First Examination Report mailed on Dec. 20, 2021, 7 pages.
Indian Application No. 201947004748, First Examination Report mailed on Aug. 17, 2021, 8 pages.
Indian Application No. 201947004831, First Examination Report mailed on Mar. 16, 2022, 8 pages.
Japanese Application No. 2016-521684, Office Action mailed on Jan. 22, 2019, 6 pages (3 pages of English Translation and 3 pages of Original Document).
Japanese Application No. 2019-511926, Office Action mailed on Oct. 5, 2021, 8 pages (4 pages of English Translation and 4 pages of Original Document).
Japanese Application No. 2019-512634, Office Action mailed on May 18, 2021, 3 pages.
Japanese Application No. 2019-514231, Office Action mailed on May 11, 2021, 4 pages.
Japanese Application No. 2019-514315, Notice of Decision to Grant mailed on Dec. 14, 2021, 3 pages.
Japanese Application No. 2019-514315, Office Action mailed on May 11, 2021, 4 pages.
Kodase et al., Transforming Structural Model to Runtime Model of Embedded Software with Real-Time Constraints, Institute of Electrical and Electronics Engineers, Available Online at: https://ieeexplore.ieee.org/stamp/stamp.jsp?arnumber=1186690, Mar. 7, 2003, pp. 1-6.
Li et al., Event Stream Processing with Out-of-Order Data Arrival, 27th International Conference on Distributed Computing Systems Workshops, Jan. 1, 2007, 9 pages.
Mager et al., DistBack: A Low-Overhead Distributed Back-Up Architecture with Snapshot Support, 19th Institute of Electrical and

(56) References Cited

OTHER PUBLICATIONS

Electronics Engineers Workshop on Local & Metropolitan Area Networks (LANMAN), Apr. 10-12, 2013, 6 pages.
Masud et al., A Multi-Partition Multi-Chunk Ensemble Technique to Classify Concept-Drifting Data Streams, Advances in Knowledge Discovery and Data Mining, Available Online at: https://www.utdallas.edu/~bhavani.thuraisingham/Publications/Conference-Papers/DM/C184_A_Multi-partition_Multi-chunk_Ensemble.pdf, Jul. 23, 2009, pp. 363-375.
Olston et al., Pig Latin: A Not-So-Foreign Language for Data Processing, Proceedings of the 2008 ACM SIGMOD International Conference on Management of Data, Jun. 9-12, 2008, 12 pages.
Or, Understanding Your Apache Spark Application Through Visualization-The Databricks Blog, Available Online at: https://databricks.com/blog/2015/06/22/understanding-your-sparkapplication-through-visualization.html, Jun. 22, 2015, pp. 1-6.
International Application No. PCT/RU2017/000135, International Preliminary Report on Patentability mailed on Sep. 26, 2019, 7 pages.
International Application No. PCT/RU2017/000135, International Search Report and Written Opinion mailed on Sep. 6, 2017, 11 pages.
International Application No. PCT/RU2017/000136, International Preliminary Report on Patentability mailed on Sep. 26, 2019, 7 pages.
International Application No. PCT/RU2017/000136, International Search Report and Written Opinion mailed on Sep. 6, 2017, 10 pages.
International Application No. PCT/US2013/073086, International Preliminary Report on Patentability mailed on Jun. 18, 2015, 6 pages.
International Application No. PCT/US2013/073086, International Search Report and Written Opinion mailed on Mar. 14, 2014, 9 pages.
International Application No. PCT/US2015/016346, International Preliminary Report on Patentability mailed on Sep. 30, 2016, 6 pages.
International Application No. PCT/US2015/016346, International Search Report and Written Opinion mailed on May 4, 2015, 10 pages.
International Application No. PCT/US2015/016346, Written Opinion mailed on May 24, 2016, 5 pages.
International Application No. PCT/US2016/057924, International Preliminary Report on Patentability mailed on Jan. 16, 2018, 11 pages.
International Application No. PCT/US2016/057924, International Search Report and Written Opinion mailed on Jan. 17, 2017, 15 pages.
International Application No. PCT/US2016/057924, Written Opinion mailed on Oct. 26, 2017, 7 pages.
International Application No. PCT/US2016/057924, Written Opinion mailed on Sep. 27, 2017, 7 pages.
International Application No. PCT/US2017/051195, International Search Report and Written Opinion mailed on Nov. 8, 2017, 14 pages.
International Application No. PCT/US2017/051195, International Search Report and Written Opinion mailed on Aug. 13, 2018, 5 pages.
International Application No. PCT/US2017/051196, International Search Report and Written Opinion mailed on Nov. 7, 2017, 13 pages.
International Application No. PCT/US2017/051887, International Preliminary Report on Patentability mailed on Mar. 28, 2019, 8 pages.
International Application No. PCT/US2017/051887, International Search Report and Written Opinion mailed on Dec. 15, 2017, 12 pages.
International Application No. PCT/US2017/051897, International Preliminary Report on Patentability mailed on Mar. 28, 2019, 9 pages.
International Application No. PCT/US2017/051897, International Search Report and Written Opinion mailed on Dec. 15, 2017, 17 pages.
Sadana, Interactive Scatterplot for Tablets, AVI, Available Online at: https://vimeo.com/97798460, 2014, 7 pages.
Salmon et al., Design Principles of a Stream-Based Framework for Mobility Analysis, Geoinformatica, vol. 21, No. 2, Apr. 25, 2016, pp. 237-261.
Wang et al., Early-Stage Performance Modeling and Its Application for Integrated Embedded Control Software Design, Available Online at: https://dl.acm.org/doi/pdf/10.1145/974043.974061?download=true, Jan. 2004, pp. 110-114.
Yang et al., Map-Reduce-Merge: Simplified Relational Data Processing on Large Clusters, Proceedings of the ACM SIGMOD International Conference on Management of Data, Jun. 12-14, 2007, pp. 1029-1040.
Chinese Application No. 201780054700.0, Notice of Allowance mailed on Apr. 28, 2023, 4 pages.
Japanese Application No. JP2022-002960, Office Action mailed on Apr. 18, 2023, 4 pages.
U.S. Appl. No. 15/700,914, Notice of Allowance mailed on Feb. 29, 2024, 11 pages.

* cited by examiner

DATA SERIALIZATION IN A DISTRIBUTED EVENT PROCESSING SYSTEM

CROSS-REFERENCES TO RELATED APPLICATIONS

The present application is a continuation of, and claims the benefit of and priority to, U.S. patent application Ser. No. 15/700,784, filed on Sep. 11, 2017, entitled "DATA SERIALIZATION IN A DISTRIBUTED EVENT PROCESSING SYSTEM," which claims the benefit and priority under 35 U.S.C. 119(e) of U.S. Provisional Application No. 62/395,216, filed Sep. 15, 2016, entitled "FAST SERIALIZATION OF TUPLE BATCHES," the entire contents of which are incorporated herein by reference for all purposes.

This application is also related to application Ser. No. 15/700,862, filed on Sep. 11, 2017, entitled "GRAPH GENERATION FOR A DISTRIBUTED EVENT PROCESSING SYSTEM," application Ser. No. 15/700,914, filed on Sep. 11, 2017, entitled "CLUSTERING EVENT PROCESSING ENGINES," and application Ser. No. 15/701,019, filed on Sep. 11, 2017, entitled "DATA PARTITIONING AND PARALLELISM IN A DISTRIBUTED EVENT PROCESSING SYSTEM." The entire contents of each application is hereby incorporated by reference as if fully set forth herein, under 35 U.S.C. § 120.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's event processing needs.

BRIEF SUMMARY

Techniques are provided (e.g., a method, a system, non-transitory computer-readable medium storing code or instructions executable by one or more processors) for serializing event data received via a continuous stream of events. In one embodiment, a distributed event processing system is disclosed that is configured to receive a batch of events via a continuous data stream and perform the serialization of data in the batch of events. The distributed event processing system may be configured to process the event data against a set of continuous queries to generate a set of output events. The distributed event processing system may further be configured to transmit the set of output events to a user of the distributed event processing system.

In one embodiment, a distributed event processing system comprising a plurality of computing devices is disclosed. A computing device in the plurality of computing devices is configured to receive a batch of events from an event stream. The event stream has an associated schema. The schema identifies one or more attributes for each event received via the event stream. The computing device is comprised in a cluster of computing nodes in the distributed event processing system and the cluster of computing nodes comprises at least a subset of the plurality of computing devices in the distributed event processing system.

In certain embodiments, the computing device is configured to identify a first data type of a first attribute of the one or more attributes for each event in the batch of events and determine a first type of data compression to be performed on data values represented by the first attribute. In certain examples, the first type of data compression is determined based on the first data type of the first attribute. The computing device is then configured to generate a first set of serialized data values for the first attribute and store the first set of serialized data values represented by the first attribute.

In certain embodiments, the computing device is further configured to process the first set of serialized data values corresponding to the first attribute against a set of one or more continuous queries to generate a first set of output events. The computing device is then configured to transmit the first set of output events to a user.

In some embodiments, the computing device is configured to generate a first set of de-serialized data values corresponding to the first attribute based on the first set of serialized data values and process the first set of de-serialized data values corresponding to the first attribute against the set of one or more continuous queries to generate the first set of output events.

In some embodiments, the computing device is configured to generate the first set of de-serialized data values corresponding to the first attribute by identifying the first type of data compression to be performed on the data values represented by the first attribute and de-serializing the first set of serialized data values represented by the first attribute in accordance with the first type of data compression.

In some embodiments, the computing device is configured to identify a second data type of a second attribute for each event in the batch of events. In one example, the second data type is different from the first data type. The computing device is configured to determine a second type of data compression to be performed on data values represented by the second attribute for the events in the batch of events. In an example, the second type of data compression is different from the first type of data compression. The computing device is further configured to generate a second set of serialized data values represented by the second attribute based on determining the second type of data compression and store the second set of serialized data values represented by the second attribute. In some examples, the second type of data compression is determined based on the second data type of the second attribute.

In some embodiments, the computing device is configured to generate a second set of de-serialized data values corresponding to the second attribute based on the second set of serialized data values and process the second set of de-serialized data values corresponding to the second attribute against the set of one or more continuous queries to generate the first set of output events.

In some examples, the first type of data compression or the second type of data compression comprises at least one of a base compression technique, a value index compression technique, or a precision reduction and value index compression technique.

In certain embodiments, the computing device is configured to process the first set of serialized data values corresponding to the first attribute by identifying a set of one or more operations to be performed on each event in the batch of events based on the set of one or more continuous queries, representing the set of one or more operations as a continuous query language (CQL) Resilient Distributed Dataset (RDD) Directed Acyclic Graph (DAG) of transformations, and processing the first set of serialized data values corresponding to the first attribute against the CQL RDD DAG of transformations to generate the first set of output events.

In some examples, the first data type of the first attribute is a numeric data type and the second data type of the second attribute is a non-numeric data type.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
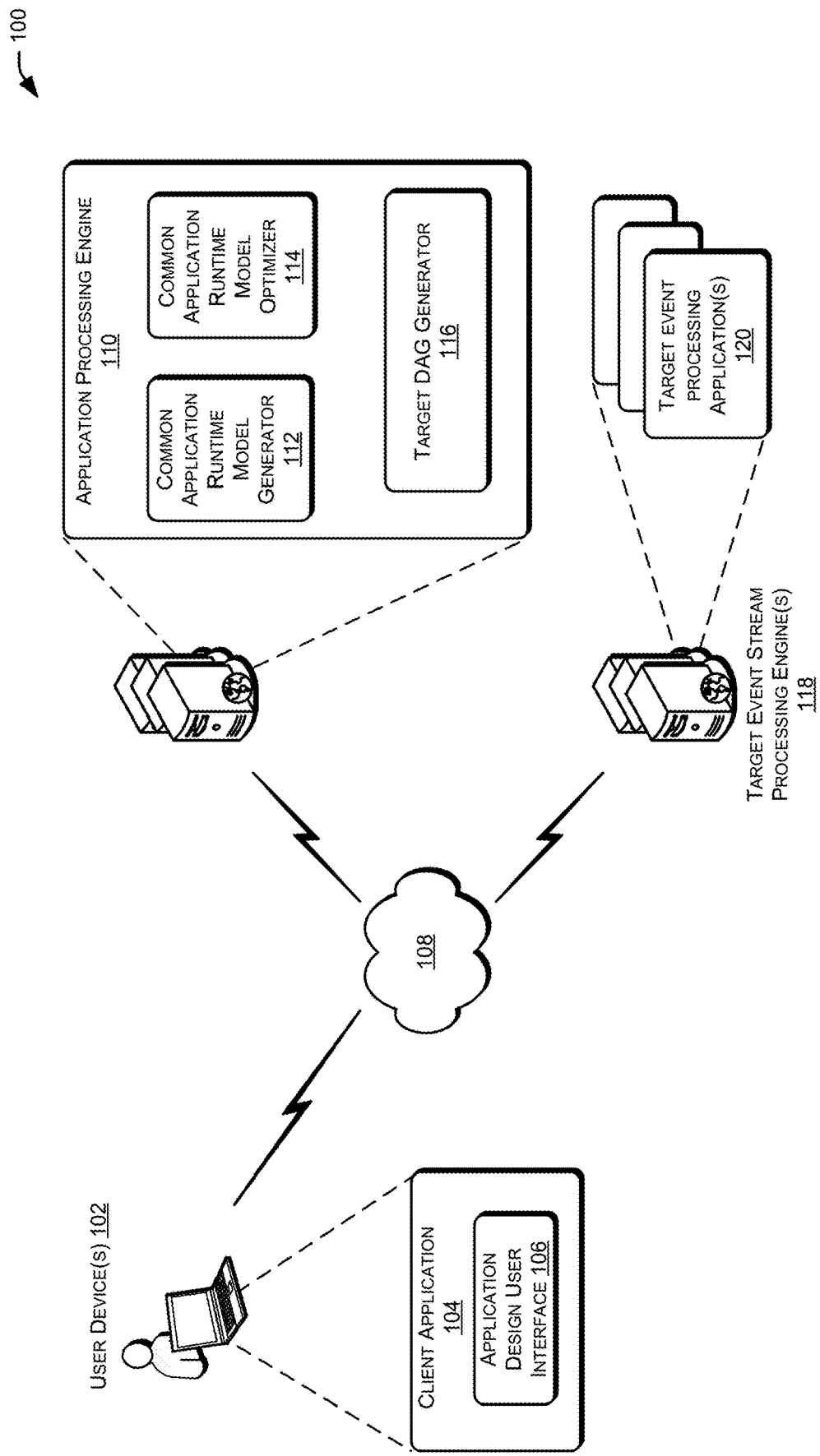
FIG. 1 depicts aspects of an example event processing system architecture that provides an environment by which an event processing application can be processed for different execution environments, in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Overview of Complex Event Processing (CEP)

Complex Event Processing (CEP) provides a modular platform for building applications based on an event-driven architecture. At the heart of the CEP platform is the Continuous Query Language (CQL), which allows applications to filter, query, and perform pattern-matching operations on streams of data using a declarative, SQL-like language. Developers may use CQL in conjunction with a lightweight Java programming model to write applications. Other platform modules include a feature-rich IDE, management console, clustering, distributed caching, event repository, and monitoring, to name a few.

As event-driven architecture and complex event processing have become prominent features of the enterprise computing landscape, more and more enterprises have begun to build mission-critical applications using CEP technology. Today, mission-critical CEP applications can be found in many different industries. For example, CEP technology is being used in the power industry to make utilities more efficient by allowing them to react instantaneously to changes in demand for electricity. CEP technology is being used in the credit card industry to detect potentially fraudulent transactions as they occur in real time. The list of mission-critical CEP applications continues to grow. The use of CEP technology to build mission-critical applications has led to a need for CEP applications to be made highly available and fault-tolerant.

Today's Information Technology (IT) environments generate continuous streams of data for everything from monitoring financial markets and network performance, to business process execution and tracking RFID tagged assets. CEP provides a rich, declarative environment for developing event processing applications to improve the effectiveness of business operations. CEP can process multiple event streams to detect patterns and trends in real time and provide enterprises the necessary visibility to capitalize on emerging opportunities or mitigate developing risks.

A continuous stream of data (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
. . .

In the above stream, for stream element (<timestamp_N+1>, <ORCL,62>), the event is <ORCL,62> with attributes "stock_symbol" and "stock_value." The timestamp associated with the stream element is "timestamp_N+1." A continuous event stream is thus a flow of events, each event having the same series of attributes.

As noted, a stream may be the principle source of data that CQL queries may act on. A stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. In addition, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

Event Processing Applications

The quantity and speed of both raw infrastructure and business events is exponentially growing in IT environments. Whether it is streaming stock data for financial services, streaming satellite data for the military or real-time vehicle-location data for transportation and logistics businesses, companies in multiple industries must handle large volumes of complex data in real-time. In addition, the explosion of mobile devices and the ubiquity of high-speed connectivity adds to the explosion of mobile data. At the same time, demand for business process agility and execution has also grown. These two trends have put pressure on organizations to increase their capability to support event-driven architecture patterns of implementation. Real-time event processing requires both the infrastructure and the application development environment to execute on event processing requirements. These requirements often include the need to scale from everyday use cases to extremely high velocities of data and event throughput, potentially with latencies measured in microseconds rather than seconds of response time. In addition, event processing applications must often detect complex patterns in the flow of these events.

The Oracle Stream Analytics platform targets a wealth of industries and functional areas. The following are some use cases:

Telecommunications: Ability to perform real-time call detail (CDR) record monitoring and distributed denial of service attack detection.

Financial Services: Ability to capitalize on arbitrage opportunities that exist in millisecond or microsecond windows. Ability to perform real-time risk analysis, monitoring and reporting of financial securities trading and calculate foreign exchange prices.

Transportation: Ability to create passenger alerts and detect baggage location in case of flight discrepancies due to local or destination-city weather, ground crew operations, airport security, etc.

Public Sector/Military: Ability to detect dispersed geographical enemy information, abstract it, and decipher high probability of enemy attack. Ability to alert the most appropriate resources to respond to an emergency.

Insurance: Ability to learn and to detect potentially fraudulent claims.

IT Systems: Ability to detect failed applications or servers in real-time and trigger corrective measures.

Supply Chain and Logistics: Ability to track shipments in real-time and detect and report on potential delays in arrival.

Real Time Streaming & Event Processing Analytics

With exploding data from increased number of connected devices, there is an increase in large volumes of dynamically changing data; not only the data moving within organizations, but also outside the firewall. High-velocity data brings high value, especially to volatile business processes. However, some of this data loses its operational value in a short time frame. Big Data allows the luxury of time in processing for actionable insight. Fast Data, on the other hand, requires extracting the maximum value from highly dynamic and strategic data. It requires processing much faster and facilitates taking timely action as close to the generated data as possible. The Oracle Stream Analytics platform delivers on Fast Data with responsiveness. Oracle Edge Analytics pushes processing to the network edge, correlating, filtering and analyzing data for actionable insight in real-time.

The Oracle Stream Analytics platform provides ability to join the incoming streaming events with persisted data, thereby delivering contextually aware filtering, correlation, aggregation and pattern matching. It delivers lightweight, out of the box adapters for common event sources. It also provides an easy-to-use adapter framework for custom adapter development. With this platform, organizations can identify and anticipate opportunities, and threats represented by seemingly unrelated events. Its incremental processing paradigm can process events using a minimum amount of resources providing extreme low latency processing. It also allows it to create extremely timely alerts, and detect missing or delayed events immediately, such as the following:

Correlated events: If event A happens, event B almost always follows within 2 seconds of it.

Missing or Out-of-Sequence events: Events A, B, C should occur in order. C is seen immediately after A, without B.

Causal events: Weight of manufactured items is slowly trending lower or the reading falls outside acceptable norms. This signals a potential problem or future maintenance need.

In addition to real-time event sourcing, the Oracle Stream Analytics platform design environment and runtime execution supports standards-based, continuous query execution across both event streams and persisted data stores like databases and high performance data grids. This enables the platform to act as the heart of intelligence for systems needing answers in microseconds or minutes to discern patterns and trends that would otherwise go unnoticed. Event Processing use cases require the speed of in-memory processing with the mathematical accuracy and reliability of standard database SQL. This platform queries listen to incoming event streams and execute registered queries continuously, in-memory on each event, utilizing advanced, automated algorithms for query optimization. While based on an in-memory execution model, however, this platform leverages standard ANSI SQL syntax for query development, thus ensuring accuracy and extensibility of query construction. This platform is fully compliant with the ANSI SQL '99 standard and was one of the first products available in the industry to support ANSI SQL reviewed extensions to standard SQL for real-time, continuous query pattern matching. The CQL engine optimizes the execution of queries within a processor leaving the developer to focus more on business logic rather than optimization.

The Oracle Stream Analytics platform allows for both SQL and Java code to be combined to deliver robust event processing applications. Leveraging standard industry terminology to describe event sources, processors, and event output or sinks, this platform provides a meta-data driven approach to defining and manipulating events within an application. Its developers use a visual, directed-graph canvas and palette for application design to quickly outline the flow of events and processing across both event and data sources. Developing the flow through drag and drop modeling and configuration wizards, the developer can then enter the appropriate metadata definitions to connect design to implementation. When necessary or preferred, with one click, developers are then able to drop into custom Java code development or use the Spring® framework directly to code advanced concepts into their application.

Event driven applications are frequently characterized by the need to provide low and deterministic latencies while handling extremely high rates of streaming input data. The underpinning of the Oracle Stream Analytics platform is a lightweight Java container based on an OSGi® backplane. It contains mature components from the WebLogic JEE application server, such as security, logging and work management algorithms, but leverages those services in a real-time event-processing environment. An integrated real-time kernel provides unique services to optimize thread and memory management supported by a JMX framework enabling the interaction with the container for performance and configuration. Web 2.0 rich internet applications can communicate with the platform using the HTTP publish and subscribe services, which enables them to subscribe to an application channel and have the events pushed to the client. With a small footprint this platform is a lightweight, Java-based container, that delivers faster time-to-production and lower total cost of ownership.

The Oracle Stream Analytics platform has the ability to handle millions of events per second with microseconds of processing latencies on standard, commodity hardware or optimally with Oracle Exalogic and its portfolio of other Engineered Systems. This is achieved through a complete "top-down" layered solution, not only with a design focus on high performance event processing use cases, but also a tight integration with enterprise-class real-time processing infrastructure components. The platform architecture of performance-oriented server clusters focuses on reliability, fault tolerance and extreme flexibility with tight integration into the Oracle Coherence technology and enables the enterprise to predictably scale mission-critical applications across a data grid, ensuring continuous data availability and transactional integrity.

In addition, this platform allows for deterministic processing, meaning the same events can be fed into multiple servers or the same server at different rates achieving the same results each time. This enables incredible advantages over systems that only rely on the system clock of the running server.

The techniques described above and below may be implemented in a number of ways and in a number of contexts. Several example implementations and contexts are provided with reference to the following figures, as described below in more detail. However, the following implementations and contexts are but a few of many.

Distributed Event Processing

In certain situations, users of an enterprise may wish to identify and respond to significant events that occur within the enterprise quickly so that they can take immediate action upon the identification of such events. For example, a user may wish to identify significant events that relate to sales orders that have crossed a threshold within the enterprise. In such a scenario, a user may submit one or more queries to a data store/data warehouse and wish to view the results of a query in less than a few seconds rather than in minutes or hours so that the user can take immediate action if an anomaly is detected. Real-time data processing and data analytics may be used by enterprises to process event streams in real-time for more reactive decision making and to take immediate action for those times when acting within seconds or minutes is significant.

In accordance with an embodiment of the present disclosure, a distributed event processing system is disclosed that can process or query very large quantities of data relatively quickly and in real-time using a combination of CEP and distributed event stream processing. The distributed event processing system can perform real-time processing of data streams by executing queries (e.g., CQL queries) against the data streams (e.g., live feeds) that are received continuously. The distributed event processing system can receive one or more continuous data streams, register a continuous query against the data streams, and continuously execute the query as new data appears in the streams. Since this type of continuous query is long-running, the distributed event processing system can provide a continuous stream of results to a user.

In certain embodiments, the disclosed distributed event processing system may be configured to deploy and execute applications (e.g., event processing applications) by distributing the execution of an application on a cluster of machines within the system. An event processing application described herein may include a set of rules that may be expressed in the form of continuous queries that are used to process input streams. A continuous query may comprise instructions (e.g., logic) that identify the processing to be performed for received events including what events are to be selected as notable events and output as results of the query processing. Continuous queries may typically perform filtering and aggregation functions to discover and extract notable events from the input event streams. An application can be configured to listen to one or more input event streams, execute logic (e.g., a query) for selecting one or more notable events from the one or more input event streams, and output the selected notable events via one or more output event streams.

For instance, an event processing application may comprise a word counting application that counts a quantity of references to a particular word within a set of input texts. Such an application can include, for example, continuous queries that read a set of texts and count the number of times that each word appears in each text. The input text may contain, for example, short messages received in the stream from an on-line application, such as Facebook® or Twitter®. As noted above, continuous queries may be configured using the CQL language. For instance, to specify a word-counting task/operation to be performed in the word counting streaming application, a user can write a CQL query that can take a form such as: FROM location GROUP BY word SELECT count. Such a query can gather all of the sentences from the specified location, group the unique words from those sentences into distinct groups, and then count the quantity of words in each group.

By distributing the execution of the application on a cluster of machines, the disclosed distributed event processing system may be configured to provide results pertaining to the execution of the application quickly and in real-time to a user. The distributed event processing system may be configured to partition the data pertaining to the application into separate computing nodes, and each computing node can be maintained as a separate file on a separate computing machine. Each such machine can be configured to execute a query in the application in parallel with the other machines relative to the data maintained on that machine.

Efficient DAG Generation for a Distributed Event Processing System

In certain embodiments of the present disclosure, an application processing engine for processing information related to an application (e.g., an event processing application) is disclosed. The application processing engine is configured to receive information identifying the event processing application. In certain examples, the event processing application is expressed as an Event Processing Network (EPN) of components and the information identifying the event processing application information includes information related to the various components (e.g., adapter, processer, stream, or event beans) of the event processing application. For instance, the information identifying the event processing application may include configuration information, query information, and other types of information related to the application.

In certain embodiments, the application processing engine may be configured to process the information identifying the application and generate a 'common application runtime model' of the application. As described herein, a 'common application runtime model' of the application is a representation of the application as a set of one or more configuration blocks, where each configuration block represents a processing stage with associated metadata describing the application. The application processing engine may be configured to convert the 'common application runtime model' of the application into one or more generic representations of the application. The application processing engine may then be configured to cause the execution of the one or more generic representations of the application in different execution (runtime) environments supported by different target event processing systems.

The generation of the 'common application runtime model' in accordance with embodiments of the present disclosure enables the execution of a generic representation of the application in different physical execution (runtime) environments without the developer (e.g., a user) of the application having to re-write the application code to suit a particular physical execution (runtime) environment of the target engine prior to its execution in the target engine.

The techniques described above may be implemented in a number of ways and in a number of contexts. Several example implementations and contexts are provided with reference to FIGS. 1-9 below which describe additional details of the manner in which the disclosed distributed event processing system may perform operations related to the deployment, processing, and execution of event processing applications.

FIG. 1 depicts aspects of an example event processing system architecture 100 that provides an environment by which an event processing application can be processed for different execution environments, in accordance with an embodiment of the present disclosure. In an embodiment, the architecture (event processing system) 100 includes an application processing engine 110 communicatively connected to one or more user devices 102 via a network 108.

Network 108 may facilitate communications and exchange of data between user devices 102 and the application processing engine. Network 108 may be any type of network familiar to those skilled in the art that can support data communications using any of a variety of commercially-available protocols, including without limitation TCP/IP, SNA, IPX, AppleTalk, and the like. Merely by way of example, network 108 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

The user devices 102 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, the user devices 102 may be any other electronic device, such as a thin-client computer, Internet-enabled gaming system, and/or personal messaging device, capable of communicating over a network (e.g., network 108). Although example system environment 100 is shown with one user device, any number of user and/or client computing devices may be supported, in other embodiments.

In certain embodiments, the application processing engine 110 may be configured to process an event processing application for execution in different runtime environments. In certain examples, an event processing application may be generated by a user of a user device 102. For instance, a user 102 may build an application (e.g., an event processing application) using a client application 104 (e.g., a browser) in the user device using an application design user interface 106 provided by the client application 104. As noted above, an event processing application may include a set of rules (e.g., expressed in the form of continuous queries) that are used to process input streams of data coming from an event source. The event source may include a variety of data sources such as a monitoring device, a financial services company, or a motor vehicle. Using the data, the event processing application might identify and respond to patterns, look for extraordinary events and alert other applications, or do some other work that requires immediate action based on quickly changing data.

The application processing engine 110 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up the application processing engine 110 may run any of operating systems or a variety of additional server applications and/or mid-tier applications, including HTTP servers, FTP servers, CGI servers, Java servers, database servers, and the like. Example database servers include without limitation those commercially available from Oracle, Microsoft, Sybase, IBM and the like.

In certain embodiments, the application processing engine 110 may be configured to receive an application (e.g., an event processing application) as described above from the user device 102 and process the information in the application to generate a 'common application runtime model' of the application. As noted above, a 'common application runtime model' of the application is a representation of the application as a set of one or more configuration blocks, wherein each configuration block represents an event bean with associated metadata describing the application. The application processing engine 110 may be configured to convert the 'common application runtime model' of the application into one or more generic representations of the application. In certain embodiments, the application processing engine 110 may then be configured to cause the execution of the more generic representations of the application in different execution (runtime) environments supported by different target event processing systems.

In certain embodiments, the application processing engine 110 may include a common application runtime model generator 112, a common application runtime model optimizer 114, and a target DAG generator 116. These components may be implemented in hardware, firmware, software, or combinations thereof. The common application runtime model generator 112 may be configured to generate the 'common application runtime model' for the application based on the information associated with the application. The common application runtime model optimizer 114 may be configured to optimize the 'common application runtime model' to generate an optimized common application runtime model for the application. The target DAG generator 116 may be configured to convert the optimized common application runtime model into one or more generic representations of the application that can be executed by one of the target event stream processing engines (systems). The operations performed by components 112, 114, and 116 of the application processing engine 110 are discussed in detail in relation to FIG. 2 below.

In certain embodiments, the target event processing engines 118 may be configured to receive the common application runtime model from the application processing engine 110 and convert the information in the common application runtime model into a platform-specific implementation of the application (i.e., a target event processing application 120) that can be executed in the runtime (execution) environment provided by the target event stream processing engines 118. The target event stream processing engines 118 may then be configured to continuously execute the target event processing applications 120 as new data appears in the streams and provide a continuous stream of results to a user. The target event stream processing engines 118 may perform the real-time processing of data streams by executing one or more operations (e.g., CQL queries) defined in the target event processing applications 120 against the data streams (e.g., live feeds) that are received continuously. For example, the target event stream processing engines 118 can receive one or more continuous data streams, register the target event processing applications 120 against the data streams, and continuously execute one or more queries defined in the target event processing applications 120 as new data appears in the streams. Since this type of continuous query is long-running, the target event stream processing engines can provide a continuous stream of results to a user. Additional operations performed by the target event stream processing engines 118 is discussed in detail in relation to FIG. 3.

In certain embodiments, each target event stream processing engine 118 may represent a particular physical execution environment for executing a target event processing application. For instance, a first target event stream processing engine may include a first event streaming platform that is configured to execute the target event processing application in a first physical execution(runtime) environment, a second target event stream processing engine may include a second event streaming platform that is configured to execute the application in a second physical execution(runtime) environment, a third target event stream processing engine may include a third event streaming platform that is configured to execute the application in a third physical execution(runtime) environment, and so on. The first, second, and third event streaming platforms may be different from each other. For instance, the first event streaming platform may represent an Oracle Event Processor (OEP) system managed by Oracle®. The second event streaming platform may represent a first type of distributed event processing platform, such as the Spark® framework, managed by the Spark® system, and the third event streaming platform may represent a third type of distributed event processing platform, such as the Flink® framework managed by the Flink® system.

Figure 2:
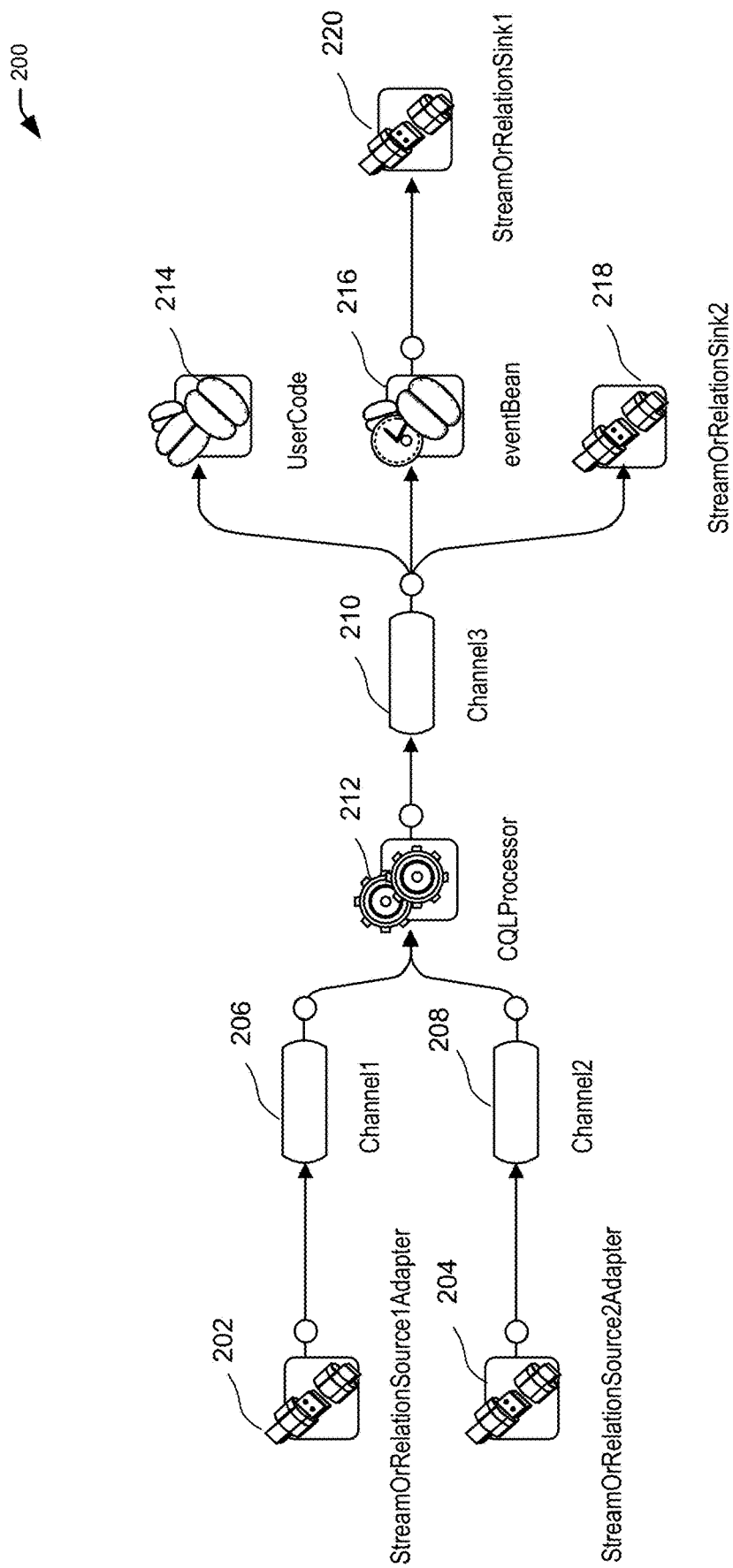
FIG. 2 is a graphical representation of an Event Processing Network (EPN) for an event processing application in accordance with an embodiment of the present disclosure.

FIG. 2 is a graphical representation of an Event Processing Network (EPN) 200 for an event processing application in accordance with an embodiment of the present disclosure. An event processing application may be expressed, in certain examples, as a network of components. Such a network of components is commonly referred to as the event processing network (EPN) 200. The EPN 200 is a conceptual model for expressing event-based interactions and event processing specifications among the components of an event processing application. The components of an event processing application may include adapters, streams, processors, business logic Plain Old Java Objects (POJOs), and beans. Each component in the EPN 200 has a role in processing the data received via an event stream. As noted above, the event processing network (EPN) 200 may include information that describes these various components, how the components are connected together, event types processed by the application, continuous query or logic for the selection of events used by the application, business rules defined in the application, and so on.

In certain embodiments, a user of a user device 102 may generate the EPN 200 for an event processing application using the application design user interface (e.g., 106) provided by a client application (e.g., 104) in the user device. In other embodiments, the user may provide information that identifies the application via the application design user interface. Such information may include, for instance, one or more continuous queries defined in the application, application parameters that specify a type of deployment of the application, runtime configuration of application (e.g., the number of executors to use, parallelism parameters, the size of memory, the high availability parameters) and so on, and the a client application may build and/or generate the EPN 200 for an event processing application based on this information.

In certain embodiments, and as shown in FIG. 2, the EPN 200 for an event processing application may be composed of the following component types:

(1) One or more adapters (202, 204) that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks. In the embodiment shown in FIG. 2, the adapters include a StreamOrRelationSource1 Adapter 202 and a StreamOrRelationSource2 Adapter 204.

(2) One or more channels (206, 208, 210) that act as event processing endpoints. Among other things, channels are responsible for queuing event data until the event processing agent can act upon it.

(2) One or more application processors (or event processing agents) 212 are configured to consume normalized event data from a channel, process it using queries to select notable events, and forward (or copy) the selected notable events to an output channel 210.

(4) One or more beans 214, 216, and 218 are configured to listen to the output channel 220, and are triggered by the insertion of a new event into the output channel 220. In some embodiments, this user code is a plain-old-Java-object (POJO). The user application can make use of a set of external services, such as JMS, Web services, and file writers, to forward the generated events to external event sinks.

(5) Event beans 214, 216, and 218 may be registered to listen to the output channel 220, and are triggered by the insertion of a new event into the output channel. In some embodiments, this user code may use the Oracle CEP event bean API so that the bean can be managed by Oracle CEP.

In one embodiment, an event adapter (202, 204) provides event data to an input channel (206, 208). The input channel (206, 208) is connected to a CQL processor (212) associated with one or more CQL queries that operate on the events offered by the input channel (206, 208). The CQL processor (212) is connected to an output channel (220) to which query results are written.

In some embodiments, an assembly file may be provided for an event processing application describing the various components of the event processing application, how the components are connected together, and event types processed by the application. Separate configuration files may be provided for specifying the continuous query or logic for selection of events. In certain embodiments, the information in an event processing application may be assembled using the Spring® XML, framework. As will be described in greater detail below, this approach enables applications to be easily integrated with existing Spring® beans, and other light-weight programming frameworks that are based upon a dependency injection mechanism. For example, the assembly file can be a custom extension of a Spring® framework context XML configuration file so that the event server can leverage Spring's® Inversion of Control (IoC) container in its entirely, thus allowing a user to seamlessly use Spring® beans in the assembly of an EPN.

Figure 3:
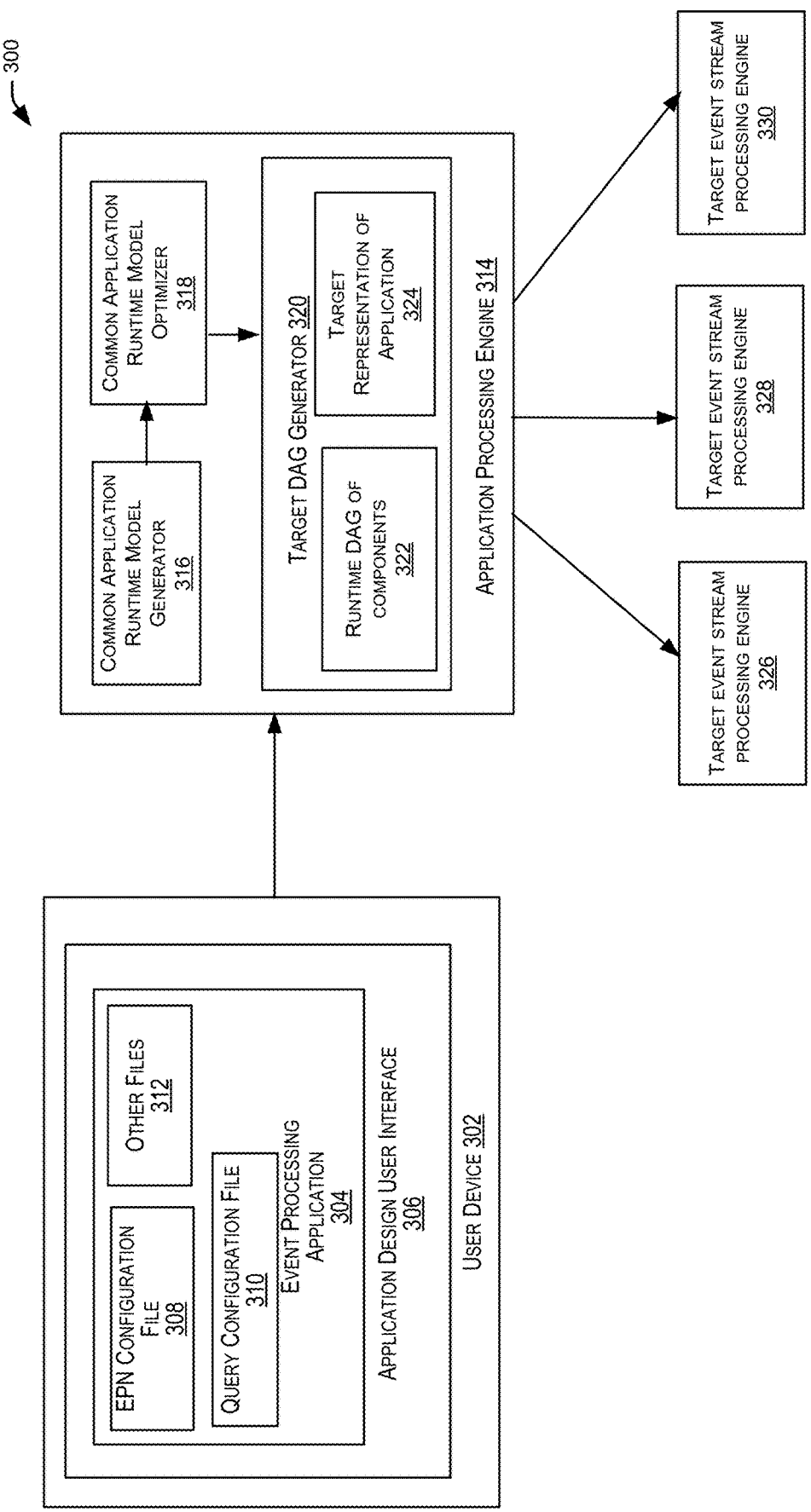
FIG. 3 is a simplified block diagram illustrating the components of an application processing engine, in accordance with an embodiment of the present disclosure.

FIG. 3 is a simplified block diagram 300 illustrating the components of an application processing engine, in accordance with an embodiment of the present disclosure. In certain embodiments, the application processing engine 314 may be configured to receive information that identifies an event processing application (e.g., 304) from a user of user device 302 and generate a common runtime application model based on this information. As noted above, an event processing application 304 can be generated by a user of the user device 302 using an application design user interface 306 provided by a client application (e.g., 104) in the user device.

In some examples, information identifying an application may include information that describes the various components (e.g., adapter, processer, stream, or event bean) of the application. This information may include, for instance, configuration information, query information, and other types of information. Configuration information may include, for instance, information that describes the various components of the event processing application, how the components are connected together, and event types processed by the application. For example, configuration information may include information that describes the event processing application as a network of components (i.e., the EPN 200). Query information may include information specifying the continuous query or logic for selection of events by the application. Other types of information may include Plain Old Java Objects (POJO) and business rules defined in the application.

In certain examples, the information identifying an application can be specified in configuration files. For example, each component in the EPN 200 of an event processing application 304 can have an associated configuration file. In other examples, the information in the application 304 can be represented in a single configuration file that includes the information for all the components in the application. In one implementation, the configuration files can be expressed as regular XML documents whose structure is defined using standard XML, schema based on a configuration schema defined by the common runtime model.

In certain examples, the information identifying an application can be specified using various configuration files such as an EPN configuration file, a query configuration file, and other files. An example of an EPN configuration file and a query configuration file for an event processing application is illustrated below. In the illustrated example, the event processing application is an order event processing application 304 configured to receive and process a continuous stream of events, wherein each event represents an order for an item sold by a company. Each order in the order event stream may comprise attributes such as an order identifier, an order status, and an order amount related to an item. An example of an EPN configuration file 308 for the event processing application 304 is illustrated below. The EPN configuration file 308 comprises a sequence of sub-elements, where each sub-element comprises the configuration information for an event processing component in the event processing application.

EPN Configuration File

```
<wlevs:event-type-repository>
<wlevs:event-type type-name="OrderEvent">
<wlevs:properties>
<wlevs:property name="orderId" type="int" />
<wlevs: property name="status" type="char" />>
<wlevs:property name="amount" type="int" />
</wlevs:properties>
</wlevs:event-type>
</wlevs:event-type-repository>
<wlevs:adapter id="socketAdapter" provider="socket" /> <wlevs:channel id="orders" event-type="OrderEvent" >
<wlevs:listener ref="orderProcessor"/>
<wlevs:source ref=" socketAdapter "/>
</wlevs:channel>
<wlevs:processor id=" orderProcessor " />
<wlevs:channel id="otutputChannel" event-type=" OrderEvent ">
<wlevs:listener ref="outputAdapter"/>
<wlevs:source ref=" orderProcessor "/>
</wlevs:channel>
<wlevs:adapter id="outputAdapter" provider="stdout" />
```

An example of a query configuration file 310 for the event processing application 304 is illustrated below. The query configuration file 310 specifies one or more continuous queries or logic for the selection of events in the event processing application.

Query Configuration File

```
<processor>
<name>orderProcessor</name>
<rules>
<query id="helloworldRule"> <![CDATA[
select status, count(*) from orders group by status
]]>
</query>
</rules>
</processor>
```

In certain embodiments, the application processing engine 314 may be configured to generate a 'common application runtime model' for the application (e.g., 304) based on the configuration information, the query information, and the other information specified in the EPN configuration file 308, the query configuration file 310, and the other files 312. The 'common application runtime model' may then be converted into one or more generic representations of the application by the target DAG generator 320 for execution in different physical execution (runtime) environments supported by different target event stream processing engines 226, 228, and 230. The generation of the 'common application runtime model' enables the execution of a generic representation of the application in different physical execution (runtime) environments without the developer (e.g., a user) of the application having to re-write the application code to suit a particular physical execution (runtime) environment of the target engine prior to its execution in the target engine. The common application runtime model is independent to the physical execution environment. The platform independent abstraction allows the system to generate the DAG and codes for the physical execution environment easily.

In certain embodiments, the generation of the 'common application runtime model' by the application processing engine 314 may include representing the application as a set of one or more event beans with associated configuration information. Additional details of the manner in which the application processing engine 314 may represent the 'common application runtime model' as a set of event beans is described in detail below.

Figure 4:
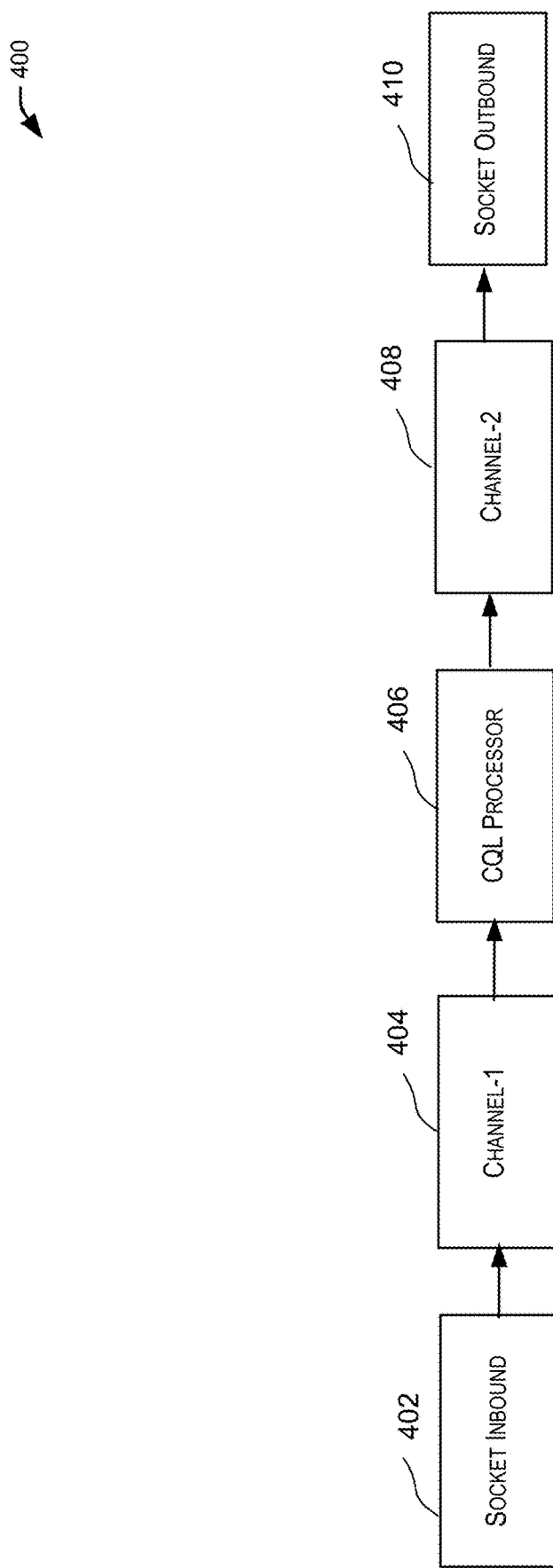
FIG. 4 is an example of a representation of a 'common application runtime model' generated by the common application model generator, in accordance with an embodiment of the present disclosure.

In certain embodiments, the application processing engine 314 includes a common application runtime model generator 316, a common application runtime model optimizer 318, and a target DAG generator 320. The common application runtime model generator 316 is configured to generate a 'common application runtime model' for the application, based on the information identifying the application specified in the EPN configuration file 308, the query configuration file 310, and the other files 312. In certain embodiments, the generation of the 'common application runtime model' by the common application runtime model generator 316 involves loading the EPN configuration file 308, the query configuration file 310, and the other files 312 into memory using an EPN loader implemented using the Spring® application framework. The result is a set of Spring® beans connected by Spring's® inversion of control injection. The common application runtime model generator 316 is then configured to parse the EPN configuration file 308 using an XML parser such as JAXB (Java Architecture for XML Binding) and set the parsed configuration file to each associated bean in the EPN network. In certain examples, each parsed configuration block or file will have an identifier so that the block or file can find the event bean and set the configuration block or file to the event bean. Thus, in an embodiment, generating the 'common application runtime model' for the application comprises representing the application as a set of one or more configuration blocks, wherein each configuration block represents a Spring® event bean with associated metadata. An example of the representation of the 'common application runtime model' is shown in FIG. 4. In certain examples, the 'common application runtime model' maintains metadata about the components of an event processing application without any processing logic in it.

FIG. 4 depicts an example of a representation of a 'common application runtime model' 400 generated by the common application model generator 316, in accordance with an embodiment of the present disclosure. In an embodiment, the 'common application runtime model' 400 may be generated based on information identifying the application (e.g., from the EPN configuration file 308, the query configuration file 310, and other files 312) and may be represented as a set of one or more configuration blocks, wherein each configuration block represents a Spring® event bean with associated metadata. In an embodiment, the configuration blocks 402, 404, 406, 408, and 410 in the common runtime application model 400 may include the following information:

```
SocketInbound 402
    host = "localhost"
    port = 9999
Channel-1 404
    tableName ="orders"
    eventType = "OrderEvent"
    relation = false
CQLProcessor 406
    rule="select status, count(*) from orders group by status"
Channel-2 408
    eventType = "OrderEvent"
StdoutOutbound 410
    <no additional info>
```

For instance, in the configuration block 402, socket inbound represents the "socketAdapter" adapter in the EPN, in the configuration block 404, channel-1 represents the "orders" channel in the EPN, in the configuration block 406, CQL processor represents the "orderProcessor" processor in the EPN, in the configuration block 408, channel-2 represents the "otutputChannel" channel in the EPN, and in the configuration block 410, socket outbound 410 represents the "outputAdapter" adapter in the EPN.

As noted above, the representation of the event processing application as a 'common application runtime model' 400 enables the application to be executed in different target event stream processing engines (e.g., 326, 328, or 330) without the user having to re-write the code of the application to suit the particular physical execution (runtime) environment of the target engine, prior to its execution in the target engine.

Returning to the discussion of FIG. 3, in certain embodiments, the common application runtime model generated by the common application runtime model generator 316 may further be optimized by the common application runtime model optimizer 318. The optimization of the common application runtime model (e.g., 400) may include, for instance, combining multiple stages within a configuration block into a single stage (e.g. combining multiple continuous queries into a single optimized continuous query) or breaking a single stage into multiple stages for parallel processing (e.g. breaking a continuous query into multiple continuous queries that can perform map and reduce operations). For instance, the consecutive queries without repartitioning can be combined into a single CQL stage with a single CQL Process. For example, two stages "select * from orders where orderStatus='open'" and "select count(*) from orders group by orderId" can be combined into a single CQL stage with "select count(*) from orders group by orderId where orderStatus="open". The optimizer can also break a single stage into multiple stages in order to maximize the scalability. For example, the fully-stateful query stage, "select count(*) from orders" can be broken into two stages with partitioning, "select count(*) from order group by orderId" and "select sum(*) from counts". This enables the global count of events to be processed with partial counts with partitioning and then the partial counts can be summed into the global counts.

In certain embodiments, the target DAG generator 320 may be configured to convert the optimized common application runtime model into one or more generic representations of the application that can be executed by one of the target event stream processing engines (326, 328, or 330). For instance, the target DAG generator 320 may be configured to convert the optimized common application runtime model into a runtime DAG 322 or a target representation of the application 324 depending on the target event stream processing engine that the application will execute in. For instance, if the target event stream processing engine (e.g., 326) is an Oracle Event Processor (OEP) managed by Oracle®, then the target DAG generator 320 may be configured to convert the configuration blocks in the common application runtime model (or the optimized common application runtime model) into a target representation of the application 324 that will be executed by the target event stream processing engine 326. The conversion may include, in certain embodiments, the replication of the objects in the common application runtime model with appropriate beans with the actual processing logic by the target DAG generator 320. For example, the metadata of the CQL Processor bean in the common application runtime model may be copied to the new instance of the event processing component (e.g., CQL Processor) which runs the CQL Engine to process the input events using the given query (e.g. copied from the CQLProcessor in the common runtime application model).

Figure 5:
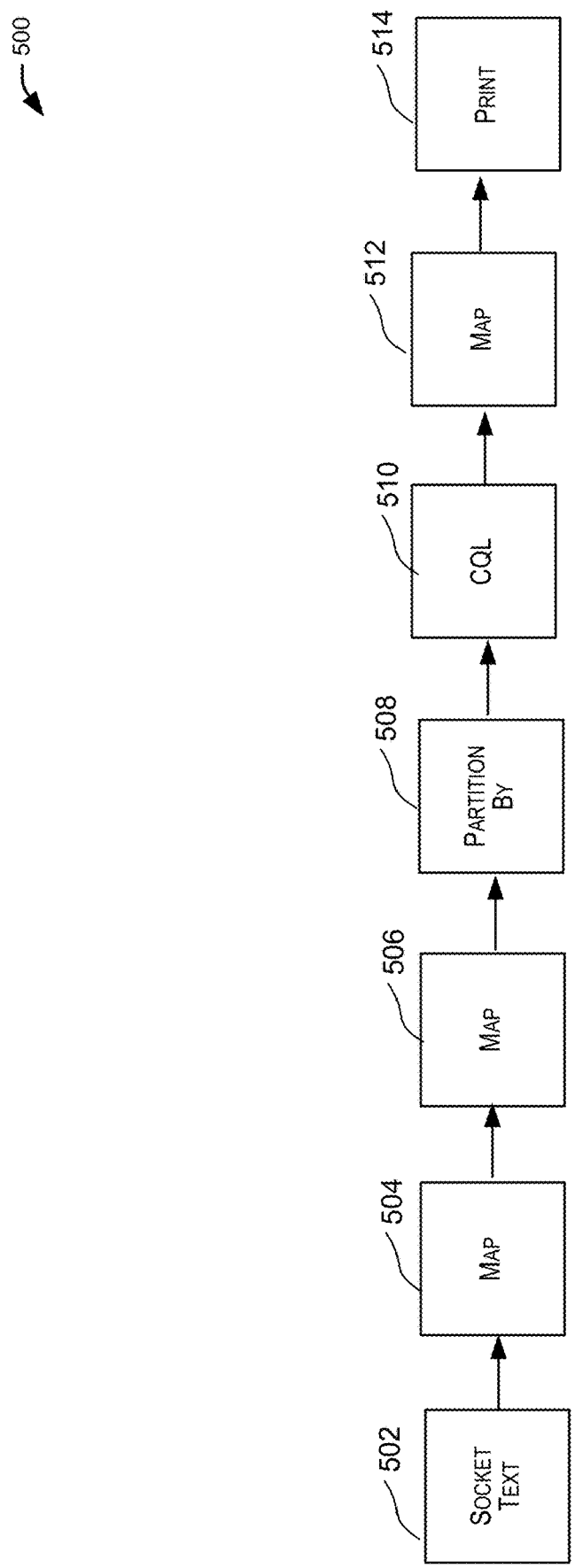
FIG. 5 is an example of a runtime Directed Acyclic Graph (DAG) of components generated by a DAG generator, in accordance with an embodiment of the present disclosure.

If, for example, the target event stream processing engine (e.g., 328) is a distributed event processing platform managed by the Spark® distributed system, then the target DAG generator 320 may be configured to convert the objects (configuration blocks) in the common application runtime model (or the optimized common application runtime model) into a runtime DAG of components 322 representing the application. An example of a runtime DAG of components 322 generated by the target DAG generator is shown in FIG. 5. The runtime DAG of components 322 is then converted into a target application (Spark® CQL application) by the target event stream processing engine 328. An example of a target application generated by the target event stream processing engine 328 for calculating the number of orders grouped by order status for the order event processing application is shown below:

Example of a Target Application
Setup
   1. val sparkConf=new SparkConf
   2. val sc=new SparkContext(sparkConf)
   3. val cc=new CQLContext(sc, Seconds(1))
Event Type, Stream Registration
   4. val orderEvent=EventType("orders", Attribute("orderId",INT), Attribute("status",CHAR), Attribute ("amount", INT))
   5. cc.registerEventType(orderEvent)
   6. cc.registerStream(orderEvent)
Load Data
   7. val lines=cc.socketTextStream("localhost", 9999)
   8. val rows=lines.map(_.split(","))

9. val kv_orders=rows.map(r=>(r(1), EventUtil.createTupleValue(orderEvent, r(0).toInt, r(1), r(2).toInt))
Partition Data
10. val orders=rorders.transform(rdd=>rdd.partitionBy (new OrderPartitioner(numPartitions)).map {case(k,v)=>v}
)
CQL Processing
11. val result=cc.cql(orders, "select status, count(*) from orders group by status")
Output
12. val sresult=result.map(x=>x.mkString(","))
13. sresult.print FIG. 5 is an example of a runtime Directed Acyclic Graph (DAG) of components 500 generated by the target DAG generator, in accordance with an embodiment of the present disclosure. In certain embodiments, and as noted above, the target DAG generator 320 may be configured to convert the objects (402, 404, 406, 408, and 410) in the common application runtime model (e.g., 400) into a runtime DAG of components 500 representing the application when the execution (runtime) environment of the target application is a distributed event processing system (e.g., the Spark® distributed event processing system).

In an embodiment, the runtime DAG of components includes the following components, SocketText 502, Map-1 504, Map-2 506, PartitionBy 508, CQL 510, Map-3 512, and Print 514. The SocketInbout 402 (shown in FIG. 4) is converted to the SocketText 502, the Map-1 504, and the Map 506. The SocketText 502 component comprises line 7 in the example of the target application shown above, which loads strings from socket. The Map-1 504 component comprises line 8 in the example of the target application which converts strings into comma separated values. The Map-2 506 component comprises line 9 in the example of the target application which converts the comma separated values to Tuples. The CQLProcessor 406 and Channel-1 404 is converted to the PartitionBy 508 and the CQL 510. The PartitionBy 508 component comprises line 10 in the example of the target application which creates a partitioning based on the group by criteria in the CQL. The CQL 510 component comprises line 11 in the example of the target application which is the main CQL processing stage. The Channel-2 408 and the StdoutOutbound 410 is converted to the Map-3 512 and Print 51. The Map-3 512 component comprises line 12 in the example of the target application which converts the Tuple to comma separated string and the Print 514 component comprises line 13 from the example of the target application which prints the output strings to stdout console.

Figure 6:
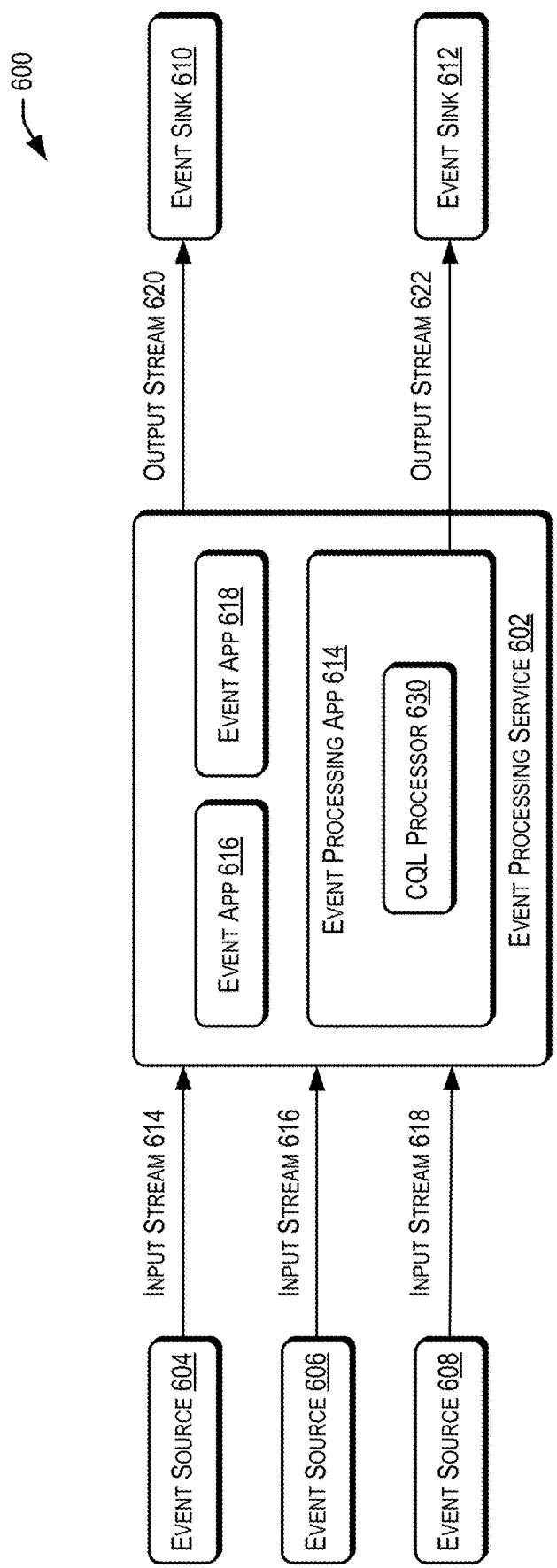
FIG. 6 is a simplified high level diagram of an event processing system that may incorporate an embodiment of the present disclosure.

FIG. 6 depicts a simplified high level diagram of an event processing system 600 that may incorporate an embodiment of the present disclosure. In an embodiment, the event processing system 600 may represent an Oracle Event Processor (OEP) system managed by Oracle®. Event processing system 600 may comprise one or more event sources (604, 606, 608), an event processing service (EPS) 602 (also referred to as CQ Service 602) that is configured to provide an environment for processing event streams, and one or more event sinks (610, 612). The event sources generate event streams that are received by EPS 602. EPS 602 may receive one or more event streams from one or more event sources.

For example, as shown in FIG. 6, EPS 602 receives a first input event stream 614 from event source 604, a second input event stream 616 from event source 606, and a third event stream 618 from event source 608. One or more event processing applications (614, 616, and 618) may be deployed on and be executed by EPS 602. An event processing application executed by EPS 602 may be configured to listen to one or more input event streams, process the events received via the one or more event streams based upon processing logic that selects one or more events from the input event streams as notable events. The notable events may then be sent to one or more event sinks (610, 612) in the form of one or more output event streams. For example, in FIG. 6, EPS 602 outputs a first output event stream 620 to event sink 610, and a second output event stream 622 to event sink 612. In certain embodiments, event sources, event processing applications, and event sinks are decoupled from each other such that one can add or remove any of these components without causing changes to the other components.

In one embodiment, EPS 602 may be implemented as a Java server comprising a lightweight Java application container, such as one based upon Equinox OSGi, with shared services. In some embodiments, EPS 602 may support ultra-high throughput and microsecond latency for processing events, for example, by using JRockit Real Time. EPS 602 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 6 provides a drilldown for one such event processing application 614. As shown in FIG. 6, event processing application 614 is configured to listen to input event stream 618, execute a continuous query 630 comprising logic for selecting one or more notable events from input event 618, and output the selected notable events via output event stream 622 to event sink 612. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 614 in FIG. 6 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real-time as the events are received by EPS 602 without having to store all the received events data. Accordingly, EPS 602 provides a special querying mechanism that enables processing of events to be performed as the events are received by EPS 602 without having to store all the received events.

Event-driven applications are rule-driven and these rules may be expressed in the form of continuous queries that are used to process input streams. A continuous query may comprise instructions (e.g., logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 602 for a particular event stream may be executed each time that an event is received in that event stream. As part of the continuous query execution, EPS 602 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

It should be appreciated that system 600 depicted in FIG. 6 may have other components than those depicted in FIG. 6. Further, the embodiment shown in FIG. 6 is only one example of a system that may incorporate an embodiment of the present disclosure. In some other embodiments, system 600 may have more or fewer components than shown in FIG. 6, may combine two or more components, or may have a different configuration or arrangement of components. System 600 can be of various types including a service provider computer, a personal computer, a portable device (e.g., a mobile telephone or device), a workstation, a network computer, a mainframe, a kiosk, a server, or any other data processing system.

Figure 7:
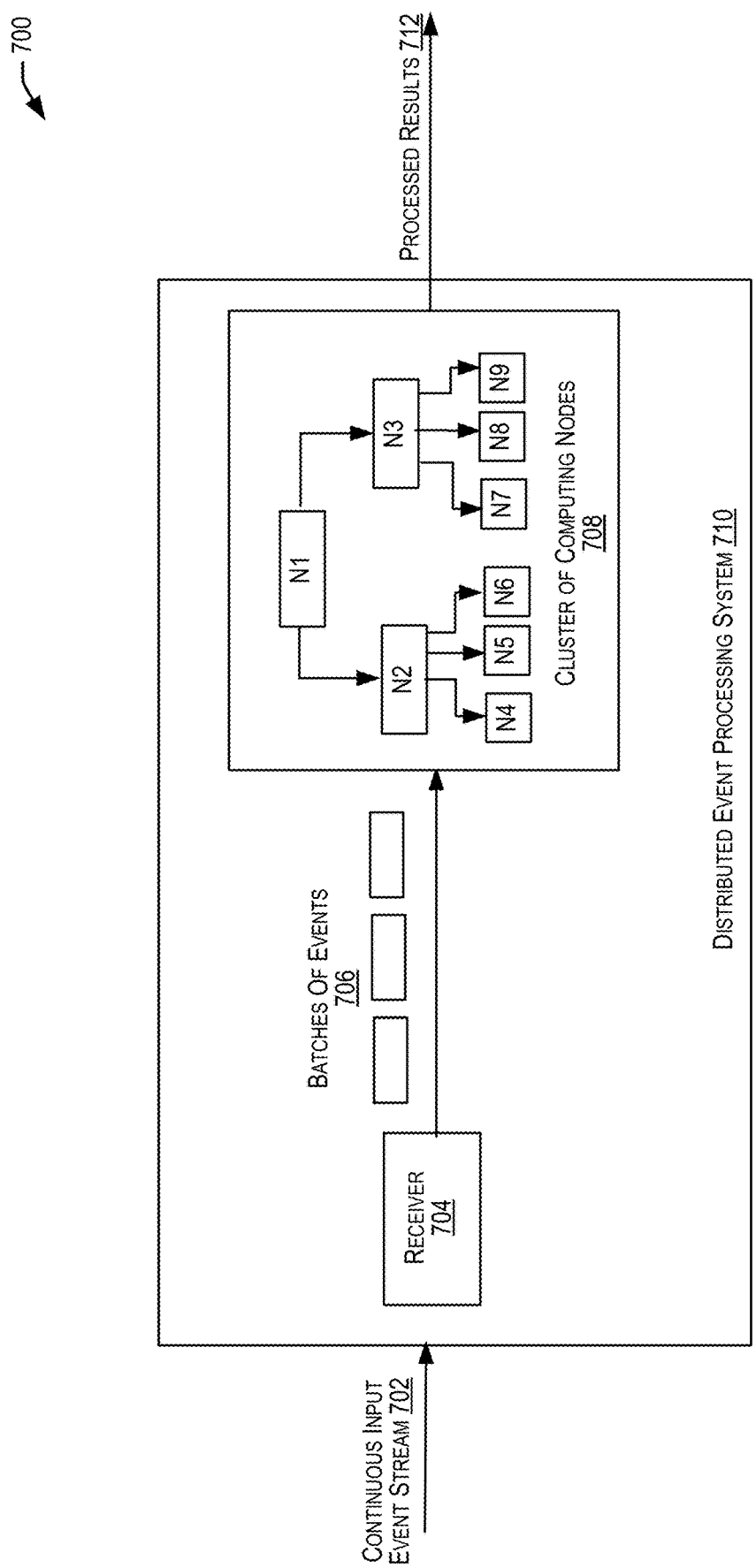
FIG. 7 is a block diagram illustrating the components of a distributed event processing system, in accordance with an embodiment of the present disclosure.

FIG. 7 is a simplified block diagram 700 illustrating the components of a distributed event processing system 710, in accordance with an embodiment of the present disclosure. The embodiment shown in FIG. 7 is one example of a distributed event processing system that may incorporate an embodiment of the present disclosure. In some other embodiments, system 710 may have more or fewer components than shown in FIG. 7, may combine two or more components, or may have a different configuration or arrangement of components. System 710 can be any type of computing device, such as, but not limited to, a mobile, desktop, thin-client, and/or cloud computing device, a server, or any other data processing system.

In some examples, the distributed event processing system 710 may be made up of pre-integrated and optimized combinations of software resources, hardware resources, networking resources, and other resources. Hardware resources may include, without limitation, servers, data storage devices, servers, printers, or the like. Software resources may include, without limitation, a computing program, an application (e.g., cloud-based applications, enterprise applications, or any other applications), a computer-program product (e.g., software), a service (e.g., cloud-based services), or the like. Data resources may include, without limitation, any accessible data objects such as a file (e.g., a networked file or directory information), a database, and the like.

In certain embodiments, the distributed event processing system 710 may comprise a receiver 704 and a cluster of computing nodes 708. The receiver 704 may be configured to receive a continuous input event stream 702 and discretize (divide) the event stream into one or more batches of events 706 of a particular duration (e.g., X seconds) for subsequent processing by the cluster of computing nodes 708 in the distributed event processing system 710. Each batch of events is referred to herein as a Dstream. In some examples, each Dstream is internally represented by the receiver 704 as a Resilient Distributed Dataset (RDD), which is a snapshot of all the input stream of data (events) ingested during a specified time period (i.e., in an event batch). Thus, in some embodiments, the input data stream 702 is represented as a sequence of Dstreams where each Dstream is internally represented as an RDD, and each RDD comprises the events (tuples) received during a particular batch interval. In certain examples, each RDD represents an immutable, partitioned collection of elements that can be stored in cache memory and executed in parallel in the distributed event processing system.

In certain embodiments, the cluster of computing nodes 704 may be configured to partition the data contained in each RDD across the cluster of computing nodes and perform operations on the data in parallel against a set of queries defined in an application and provide the results of the processing to a user of the distributed event processing system. Thus, the cluster of computing nodes 708 may be configured to distribute the processing of the event data in an RDD across the cluster of computing nodes 708 and provide results pertaining to the execution of the application against the event data quickly and in real-time to a user. In an embodiment, the distributed event processing system 710 may be configured using the Apache® Spark Streaming framework to perform the distributed and real-time processing of continuous streams of data and the deployment of event processing applications.

Figure 8:
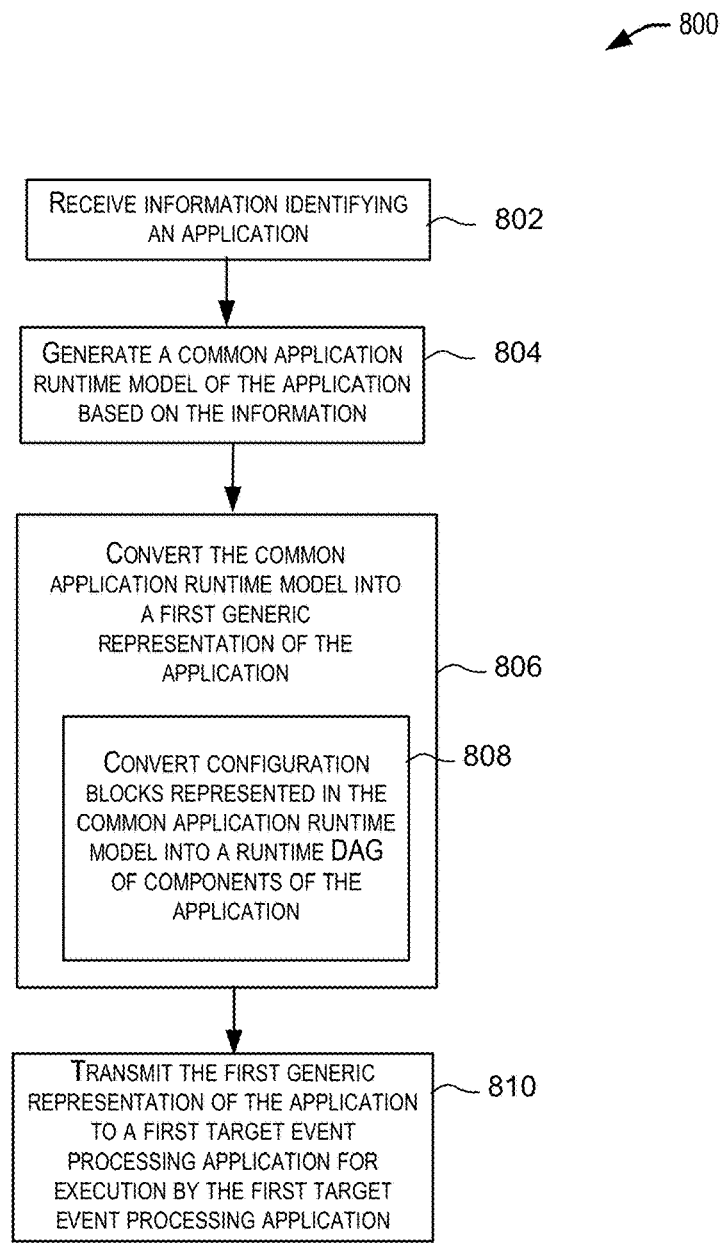
FIG. 8 is an example flow diagram of a process that describes a set of operations for processing an event processing application to generate a common application runtime model of the application, in accordance with one embodiment of the present disclosure.

FIG. 8 is an example flow diagram of a process 800 that describes a set of operations for processing an event processing application to generate a common application runtime model of the application, in accordance with one embodiment of the present disclosure. In certain embodiments, the process 800 can be performed by one or more components (e.g., 316, 318, and 320) in the application processing engine (314) described in FIG. 3. The process 800 starts at 802 by receiving information identifying an application. This information may include, for instance, information that describes the various components (e.g., adapter, processer, stream, or event bean) of the application such as configuration information, query information, and other types of information. As noted above, this information may be expressed in configuration files (308, 310, and 312) as described in FIG. 3.

At 804, the process includes generating a 'common application runtime model' of the application based on the information identifying the application. In an embodiment, generating the 'common application runtime model' for the application may include representing the application as a set of one or more configuration blocks, wherein each configuration block represents an event bean with associated metadata. The configuration blocks may include an inbound socket event bean, an outbound socket event bean, a continuous query language (CQL) processor event bean, or one or more channel event beans as described in relation to FIG. 4.

At 806, the process includes converting the 'common application runtime model' of the application into a first generic representation of the application. The first generic representation of the application may be configured to be executed in a first target event processing system of a plurality of target event processing systems. In one example, converting the 'common application runtime model' of the application into a first generic representation of the application may include converting the configuration blocks in the common application runtime model into a runtime DAG of components of the application. An example of the runtime DAG of components generated for an application is shown in FIG. 5.

In some embodiments, at 808, the process includes transmitting the first generic representation of the application to the first target event processing system for execution by the first target event processing system. In one example, the first target event processing system is a distributed event processing system.

Figure 9:
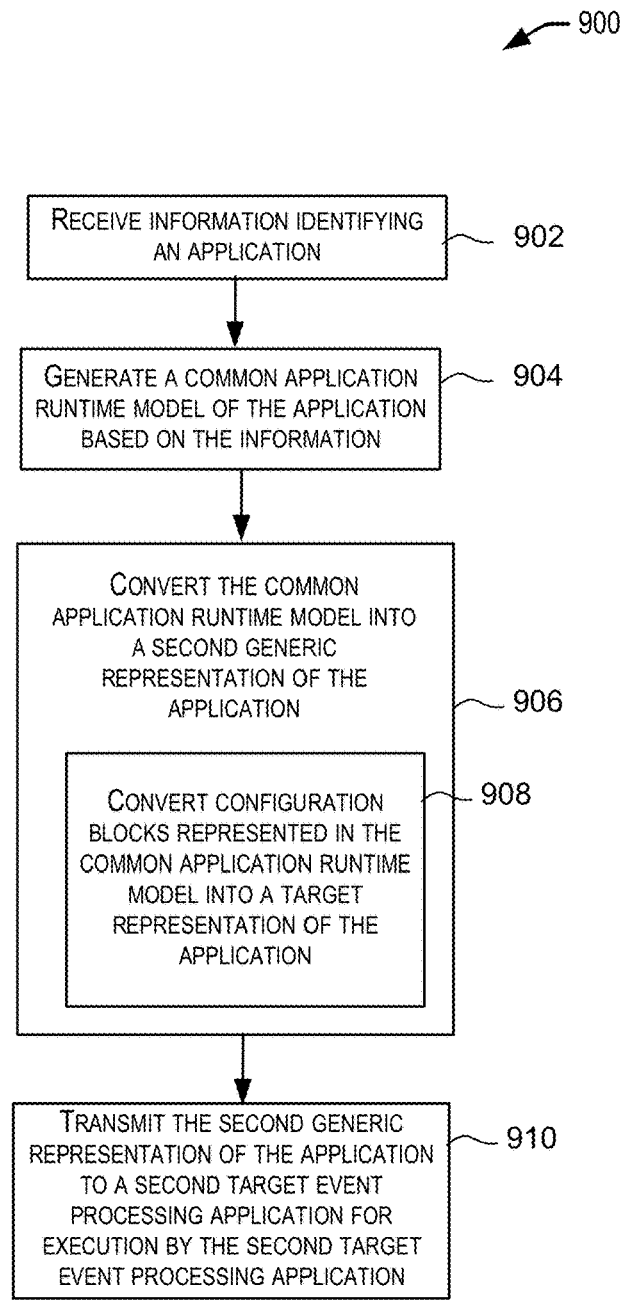
FIG. 9 is an example flow diagram of a process that describes a set of operations for processing an event processing application to generate a common application runtime model of the application, in accordance with another embodiment of the present disclosure.

FIG. 9 is an example flow diagram of a process 900 that describes a set of operations for processing an event processing application to generate a common application runtime model of the application, in accordance with another embodiment of the present disclosure. In certain embodiments, the process 900 can be performed by one or more components (e.g., 316, 318, and 320) in the application processing engine (314) described in FIG. 3. The process 900 starts at 902 by receiving information identifying an application. As noted above, this information may include configuration information, query information, and other types of information that describe the various components of the application.

At 904, the process includes generating a 'common application runtime model' of the application based on the information identifying the application. In an embodiment, generating the 'common application runtime model' for the application may include representing the application as a set of one or more configuration blocks, wherein each configuration block represents an event bean with associated metadata. The configuration blocks may include an inbound socket event bean, an outbound socket event bean, a continuous query language (CQL) processor event bean, or one or more channel event beans as described in relation to FIG. 4.

At 906, the process includes converting the 'common application runtime model' of the application into a second generic representation of the application. The second generic representation of the application may be configured to be executed in a second target event processing system of a plurality of target event processing systems. In some examples, the second target event processing system may be different from the first target event processing system. In one example, converting the 'common application runtime model' of the application into a second generic representation of the application may include converting the configuration blocks in the common application runtime model into a target representation of the application.

In some embodiments, at 908, the process includes transmitting the second generic representation of the application to the second target event processing system for execution by the second target event processing system. In one example, the second target event processing system is an Oracle® Event Processor (OEP) system.

Serialization and Deserialization of Event Data

In certain embodiments, the disclosed distributed event processing system may be configured to perform the serialization and de-serialization of event data received via a continuous event stream. The serialization and de-serialization of event data enables the conversion of complex data objects in memory into sequences of bits that can be transferred to the computing nodes in the distributed event processing system. The serialization and de-serialization of the event data enables the efficient storage and representation of the data by the processing nodes in the distributed event processing system prior to the processing of the event data by the distributed event processing system. In addition, the serialization and de-serialization of the event data reduces latencies in exchanging input and output events between the processing nodes in the distributed event processing system and improves the overall performance of the distributed event processing system.

The techniques described above may be implemented in a number of ways and in a number of contexts. Several example implementations and contexts are provided with reference to FIGS. 1-10 below which describe additional details of the manner in which the disclosed distributed event processing system may perform operations related to the deployment, processing, and execution of event processing applications.

Figure 10:
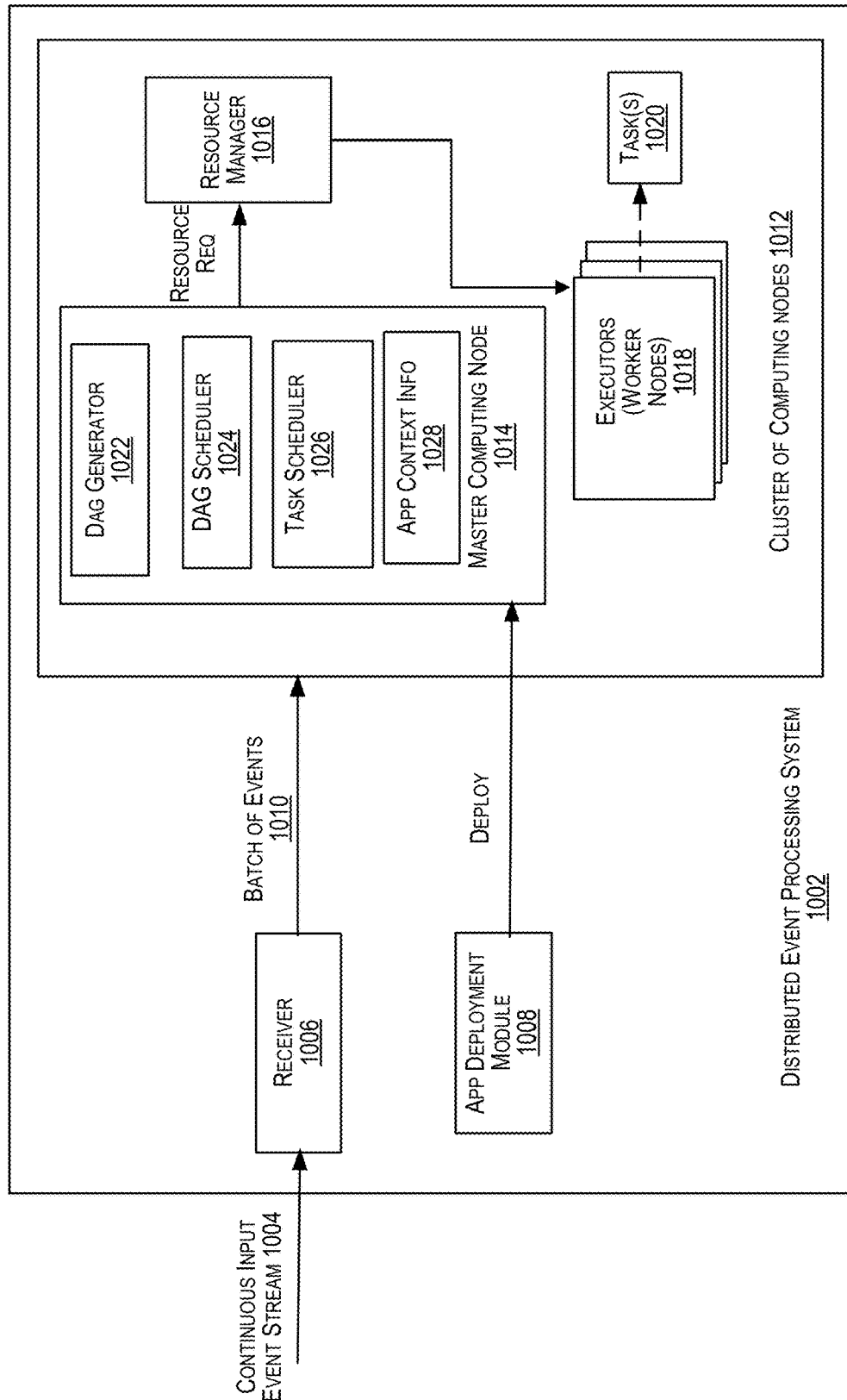
FIG. 10 is a simplified block diagram illustrating the components of a distributed event processing system, in accordance with an embodiment of the present disclosure.

FIG. 10 is a simplified block diagram 1000 illustrating the components of a distributed event processing system, in accordance with an embodiment of the present disclosure. The distributed event processing system 1000 may be the same as or similar to the distributed event processing system 110 described in FIG. 1. The embodiment shown in FIG. 10 is one example of a distributed event processing system that may incorporate an embodiment of the disclosure. In other embodiments, the distributed event processing engine may have more or fewer components than shown in FIG. 10, may combine two or more components, or may have a different configuration or arrangement of components. These components may be implemented in hardware, firmware, software, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.). The embodiment shown in FIG. 10 is thus one example of a distributed event processing engine for implementing an embodiment system and is not intended to be limiting.

In certain embodiments, the distributed event processing system 1002 may include a receiver 1004, an application deployment module 1008, and a cluster of computing nodes 1012. The receiver 1006 may be capable of receiving a continuous input stream of data 1004 (e.g., from an event source 204, 206, or 208) as described in FIG. 2 and divide the input data stream into one or more batches of events 1010, referred to herein an Dstreams. As noted above, each Dstream (i.e., event batch) comprises all of the input stream of data (events) ingested during a specified time period and can internally be represented by the receiver 1006 as an RDD object, which is an immutable, partitioned collection of elements that can be executed on in parallel in the cluster of computing nodes 1012 in the distributed event processing system 1002.

The application deployment module 1006 may be configured to deploy an application (e.g., an event processing application) for processing and execution by the computing nodes in the cluster of computing nodes 1012. An application as described herein may refer to a computer program (e.g., built by a user) of the distributed event processing system. For instance, an application may comprise a word counting application that counts a quantity of references to a particular word within a set of input texts. Such an application may be built using, for example, one or more continuous queries that read a set of texts and count the number of times that each word appears in each text. The input text may contain, for example, short messages received in the stream from an on-line application, such as Facebook® or Twitter®. As noted above, continuous queries may be configured using the CQL language. For instance, to specify a word-counting task/operation to be performed in the word counting streaming application, a user can write a CQL query that can take a form such as: SELECT count FROM location GROUP BY word. Such a query can gather all of the sentences from the specified location, group the unique words from those sentences into distinct groups, and then count the quantity of words in each group.

In certain embodiments, the application deployment module 1008 may be configured to receive information that identifies an application from a user of the distributed event processing system. For example, the application deployment module 1008 may be configured to receive information that identifies an application via an application design user interface in the application deployment module 1008. Information that identifies an application may include a set of one or more continuous queries defined in the application. Information that identifies an application may also include application parameters associated with the application. Application parameters may include, for instance, a deployment type parameter that specifies a type of deployment (e.g., 'cluster mode') of the application on the cluster of nodes 1012. Additional application parameters may include parameters related to runtime configuration of application (e.g., the number of executors to use, parallelism parameters, the size of memory, the high availability parameters, and so on).

Upon receiving the information related to the application, in certain embodiments, the application deployment module 1008 may then be configured to transmit an instruction to the cluster of computing nodes 1012 to deploy the application on a computing node in the cluster. In certain examples, the cluster of computing nodes 1012 may be configured to deploy the application to a master computing node 1014 on the cluster of computing nodes 1012. The master computing node 1014 may be configured to store the 'application context' of the application. The 'application context' may include, for instance, the application's content such as the application's topology, scheduling information, application parameters, and the like.

In certain embodiments, the master computing node 1014 may be referred to as the 'driver program,' or the application master that runs/executes the application. The driver program may be defined as a process that runs the main( ) function of the application and creates the 'application context' for the application. The driver program may be responsible for both driving the application and requesting resources from the resource manager 1016. The resource manager 1016 may be a service that acquires resources for the computing nodes on the cluster of computing nodes 1012 to execute the application. To run/execute the application on the cluster, the master computing node 1014 connects to the resource manager 1016 which then allocates resources for the application. Once connected, the master computing node 1014 acquires one or more executors on one or more computing nodes (also known as worker nodes 1018) in the cluster. The executors are processes that run computations and store data for the application. The master computing node 1014 sends application code (for example, defined by a JAR file) to the executors. Based on the transformations and actions defined in the application, the master computing node 1014 may send tasks 1020 to the executors.

In certain embodiments, the master computing node 1014 may include a DAG generator 1022, a DAG scheduler 1024, a task scheduler 1026, and application context information 1028. As noted above, application context information 1028 may comprise information about an application such as the application's topology, scheduling information, application parameters, and the like. The DAG generator 1022 may be configured to define and/or create a Directed Acyclic Graph (DAG) of RDD objects based on the RDD objects that it receives from the receiver. In some examples, the DAG generator 1022 may represent the DAG of RDD objects as a RDD lineage graph of all the RDDs that it has received during a certain interval of time. Each RDD object in the RDD lineage graph maintains a pointer to one or more parents along with the metadata about what type of relationship it has with its parent. The RDD lineage graph also identifies the DAG of transformations to be executed for each RDD object. When the master computing node 1014 is requested to run a job in the application, the DAG generator 1022 executes the DAG of transformations. The transformations may identify one or more operations to be performed on the RDD objects to transform the data in the RDD object from one form to another. These operations may be defined, for example, as part of the application generation process by the application deployment module 1008. When an operation is applied on an RDD object, a new RDD object with transformed data is obtained. Examples of operations performed on an RDD object may include, for instance, map, filter, flatMap, reduce, union, groupByKey, distinct, join, collect, count, and the like. The DAG of transformations that involve the CQL language may be referred to herein as CQL transformations.

The DAG scheduler 1024 is configured to generate a physical execution plan based on the RDD lineage graph generated by the DAG generator. In one embodiment, the DAG scheduler 1024 generates the physical execution plan by splitting the RDD lineage graph into multiple stages, wherein each stage is identified based on the transformations that need to be executed against the data in each RDD object. For example, if the transformations to be executed on an RDD object include map transformations and reduce transformations, the map transformations may be grouped together into a single stage and the reduce transformations may be grouped together into another stage. The DAG scheduler 1024 then submits the stages to the task scheduler 1026.

The task scheduler 1026 divides the application (job) into stages. Each stage is comprised of one or more tasks. In one embodiment, the number of tasks for a particular stage is determined based on the number of partitions of the input data in an RDD object. For example, and as noted above, the DAG scheduler 1024 may schedule all the map operations into a single stage. The stages are then passed to the task scheduler 1026 and the task scheduler 1026 launches the tasks via the resource manager. The tasks are then executed by the executor nodes 1018. The task scheduler 1026 identifies the nodes in the cluster of computing nodes 1012 that will execute the operations defined in application (job) against each RDD object (i.e., each batch of events being processed).

In certain embodiments, when an executor node 1018 receives an RDD object, it performs the serialization and de-serialization of data in the RDD object if the RDD object needs to be sent to other executor (worker) nodes in the cluster of computing nodes. As noted above, the processing of the data in the RDD object may involve the execution of one or more continuous queries defined in the application. In an embodiment, the executor node (e.g., 1018) that is identified by the task scheduler 1026 may invoke a CQL Engine (such as the CQL processor 230) to perform the processing of data in the RDD object and return the results of the processing to the master computing node 1014. The manner in which the executor node 1018 may perform the serialization and deserialization of data in an RDD object prior to its processing is discussed in detail in relation to FIG. 11 below.

Figure 11:
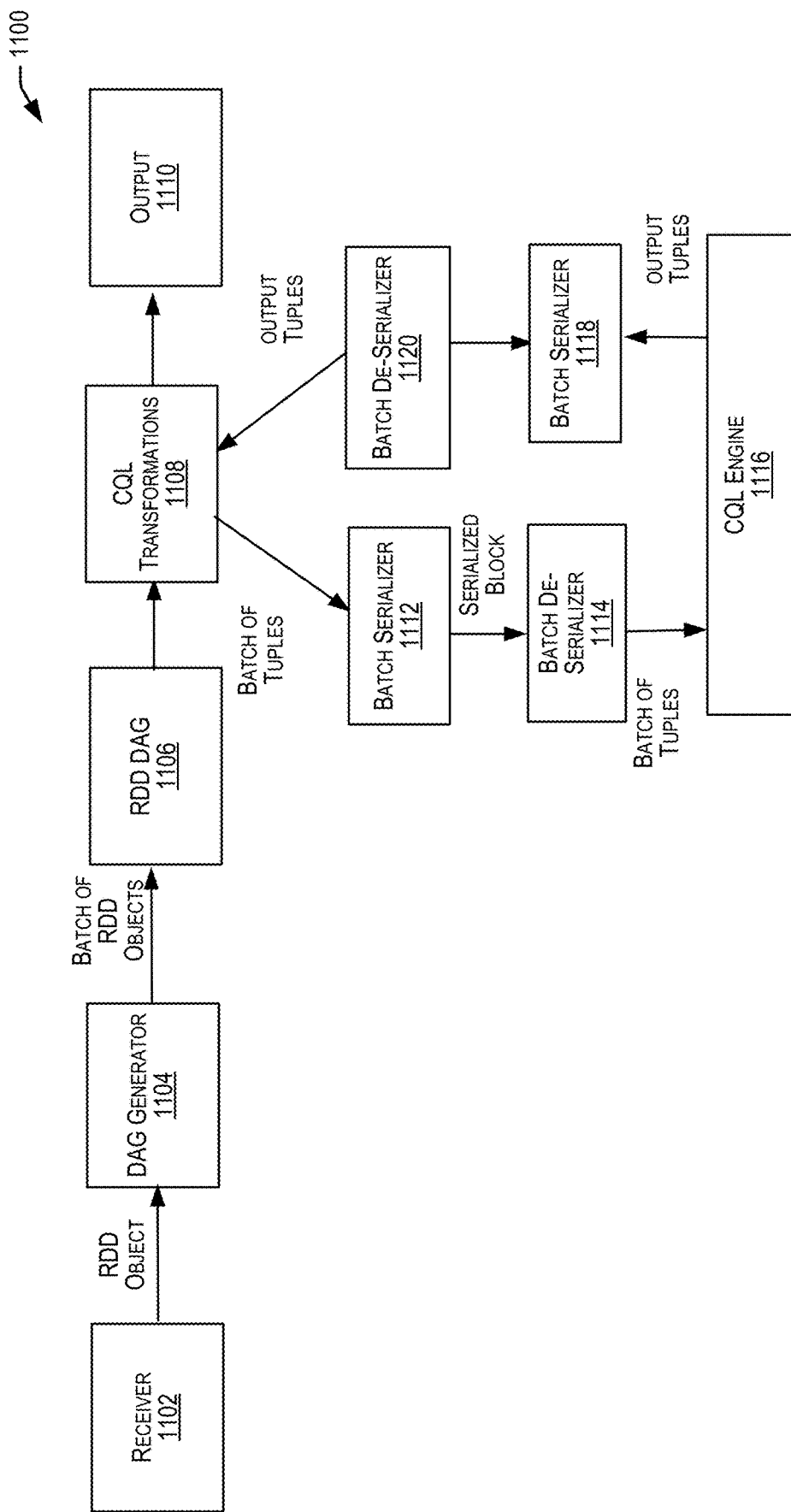
FIG. 11 is a high level data flow of a process for performing the serialization and de-serialization of data in a Resilient Distributed Dataset (RDD) object, in accordance with an embodiment of the present disclosure.

FIG. 11 depicts a high level data flow of a process for performing the serialization and de-serialization of data in an RDD object, in accordance with an embodiment of the present disclosure. In certain examples, one or more of the operations in FIG. 10 may be performed by a node (e.g., a master node or an executor node) in the cluster of computing nodes when it receives an RDD object from the receiver for processing. In one set of operations, a receiver 1102 receives an input data stream and divides the input data stream into one or more batches of events (tuples) of a particular duration (e.g., X seconds). In one embodiment, and as described in relation to FIG. 10, each batch of events (tuples) may internally be represented by the receiver as an RDD object. The DAG generator 1104 receives the RDD objects and creates a DAG of RDD objects 1106. As noted above in FIG. 10, in certain examples, the DAG of RDD objects 1106 comprises a CQL transformations 1108 to be executed against each RDD object. When the master computing node (e.g., 1014 as shown in FIG. 10) is requested to run a job in the application, the DAG generator 1104 executes the CQL transformations 1108 to process a set of input tuples represented by the RDD object. The set of input tuples to be processed may, in some examples, be obtained from the parent transformation of the CQL transformations 1108. The child transformation of the CQL transformations 1108 then invokes the specific operation to be performed against the set of input tuples as represented in the CQL transformations 1108.

In certain examples, the CQL transformations 1108 invokes a batch serializer process 1112 against the set of input tuples in the RDD object to perform the serialization of data in the RDD object. In an embodiment, the batch serializer process 1112 may be executed by the node (e.g., executor node) in the cluster of computing nodes that is processing the RDD object. As noted above, the data in the RDD object represents a batch of input tuples (events) received via the event stream. The batch serializer process 1112 serializes the data in the RDD object and the serialized block of the result from the batch serializer process is sent to a CQL Engine 1116 through a network to process the set of input tuples. In certain embodiments, the node that is processing the RDD object may invoke the CQL Engine 1116 to process the set of input tuples in the RDD object. The CQL Engine 1116 may, for instance, be an event processing engine (e.g., 630 described in FIG. 6) deployed on the executor node. The CQL Engine 1116 may be configured to receive the set of input tuples, process the set of input tuples based upon processing logic (operations/transformations) defined in the application, and generate a set of output tuples as a result of the processing.

In certain embodiments, the CQL Engine 1116 may invoke a batch de-serializer process 1114 against the serialized block of data that it receives from the batch serializer process 1112 prior to processing the data in the RDD object. This is because the serialized block is a binary format or wire format that is suitable for transferring through the network and it needs to be de-serialized as a JAVA object in order for the CQL Engine 1116 to be able to process. The result of the de-serialization process is thus a set of input tuples that is in a form that can be processed by the CQL Engine 1116. The CQL Engine 1116 processes the set of input tuples and generates a set of output tuples based on the processing. In certain examples, the CQL Engine 1116 invokes another batch serializer process 1118 to serialize set of output tuples and the result of the serialization is a serialized block of output tuples. When the serialized set of output tuples are received by the DAG generator, the CQL transformations 1108 invokes another batch de-serializer process 1120 against the received serialized block of output tuples. The result of the batch de-serializer process 1120 is a set of de-serialized output tuples. The CQL transformations 1108 returns the set of output tuples to the child transformation in the CQL transformations to perform the next set of processing operations on the data in the RDD object. In some embodiments, the set of output tuples 1110 are then transmitted to a user of the distributed event processing system.

In certain embodiments, the batch serializer process and the batch de-serializer process described above can be performed by software modules or instructions executed by the node (e.g. the executor node) in the cluster of nodes in the distributed event processing system that is processing the RDD object. Additional details of the operations performed by the batch serializer process and the batch de-serializer process are discussed in detail in relation to FIGS. 12-15 below.

Figure 12:
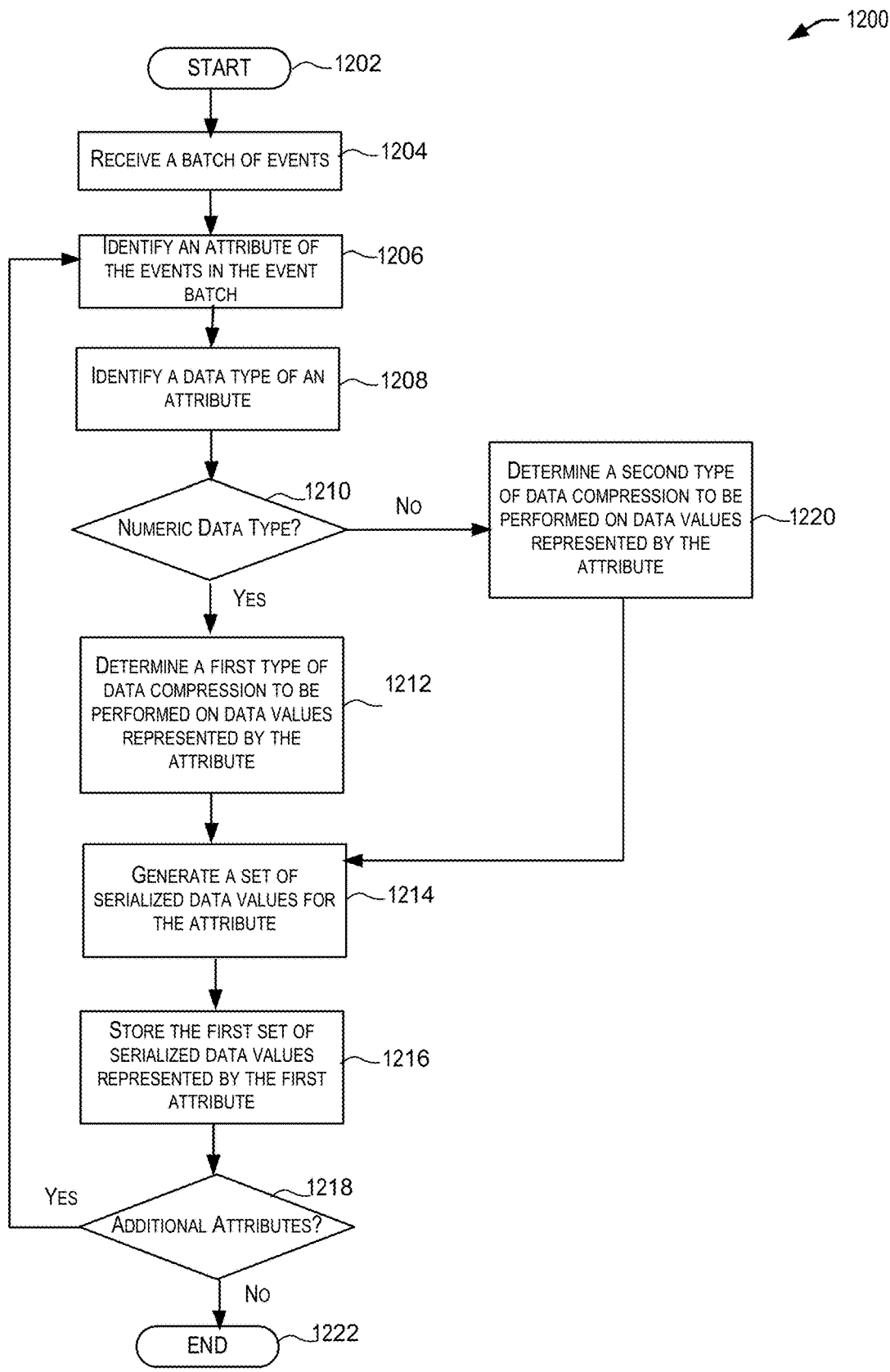
FIG. 12 is an example flow diagram of a process that describes a set of operations by which data comprised in a batch of events can be serialized, in accordance with an embodiment of the present disclosure.

FIG. 12 is an example flow diagram of a process 1200 that describes a set of operations by which data comprised in a batch of events can be serialized, in accordance with an embodiment of the present disclosure. In certain embodiments, the process 1200 can be performed by a batch serializer process (1112) in the distributed event processing system. As noted above, the batch serializer process may, in certain embodiments, be invoked by the master computing node when the master computing node (e.g., 1014 as shown in FIG. 10) is requested to run a job/operation defined in the application. As described above, the master computing node identifies a node (e.g., an executor node 1018) in the cluster of computing nodes 1012 in the distributed computing system 1002 to process a batch of events against the job/operation defined in the application and generate a set of output events as a result of the processing. In certain embodiments, processing the batch of events may include the serialization of the data in the batch of events. The process of FIG. 12 describes one technique by which data in a batch of events can be serialized. The particular series of processing steps depicted in FIG. 12 is not intended to be limiting. Alternative embodiments may have more or less steps than those shown in FIG. 12 in various arrangements and combinations.

In certain embodiments, the processing depicted in FIG. 12 may be performed by a node in the cluster of computing nodes 1012 in the distributed computing system 1002 each time a batch of events is received via a task 1020 (shown in FIG. 10). The process starts at 1202 when it receives a batch of events from the CQL transformations 1108 at 1204. In certain examples, each event in a batch of events may be referred to as a tuple, and the batch of events may be referred to as a batch of input tuples or a set of input tuples. As noted above, each event received via the event stream conforms to a schema associated with the event stream and the schema identifies one or more attributes for each event received via the event stream.

For instance, a continuous event stream may represent product related information related to products sold by a company, where each event in the event stream may represent an order for an item. Such a continuous event stream may comprise attributes such as an order identifier, an order status, and an order amount related to an item. The schema for such an input stream can be represented as S(timestamp, <orderId>, <orderStatus>, <orderAmount>). Each event received via such a stream will thus be identified by a time stamp and three attributes. In certain embodiments, the one or more attributes of the events may be represented as one or more columns in the set of input tuples (batch of events) and hence, an attribute, in some examples, may refer to a column that stores data values for a tuple(event) in the set of input tuples.

At 1206, the process includes identifying an attribute (e.g., a first attribute) of the events in the batch of events. At 1208, the process includes identifying a data type of the attribute. For instance, per the example of the order processing stream described above, the processes at 1206 and 1208 may identify that the attribute corresponds to an 'orderId' attribute of the events and that the data type of the attribute is a numeric data type. At 1210, the process includes determining if the data type of the attribute is a numeric data type. If the identified data type of the attribute is a numeric data type, then, in certain embodiments, the process proceeds to 1212 to determine a first type of data compression to be performed on data values represented by the attribute. For instance, at 1212, the process may include determining that a numeric value compression technique (for e.g., a base value compression, a precision reduction compression, or a precision reduction value index) is to be applied on the data values represented by the attribute. At 1214, the process includes generating a set of serialized data values for the attribute as a result of the application of the numeric value compression technique on the data values stored by the attribute. The process of generating a set of serialized data values for a numeric attribute of an event is discussed in FIG. 13A, FIG. 13B, FIG. 13C, and FIG. 13D. At 1216, the process includes storing the set of serialized data values represented by the attribute.

In certain embodiments, at 1218, the process includes determining if there are additional attributes of the events that need to be processed. If there are additional attributes to be processed, the process loops back to 1206 to identify the next attribute (e.g., a second attribute) of the events in the event batch and the processes at 1208-516 are performed for the next attribute.

In certain embodiments, at 1210, if the identified data type of the attribute is not determined to be a numeric data type, then, in certain embodiments, the process proceeds to 1220 to determine a second type of data compression to be performed on data values represented by the attribute. For instance, continuing with the example of the order processing stream described above, the processes at 1206 and 1208 may identify that a second attribute of the events corresponds to the 'orderStatus' attribute and that the data type for this attribute is a non-numeric data type. In this case, the process continues to 1220 to determine a second type of data compression to be performed on data values stored by the attribute. In an embodiment, the second type of data compression may be different from the first type of data compression. For instance, the process at 1220 may determine that a non-numeric value compression technique (e.g., a value index compression) is to be applied on the data values stored by the attribute. At 1214, the process includes generating a set of serialized data values represented by the attribute as a result of the application of the non-numeric value compression technique on the data values stored by the attribute. The process by which a set of serialized data values may be generated for a non-numeric attribute of an event is discussed in in FIG. 14. At 1216, the process includes storing the set of serialized data values represented by the attribute.

In certain embodiments, the process may again continue to 1218 to determine if there are any additional attributes of the event that are to be identified and processed. If there are more attributes, then the process loops back to 1206 to identify a third attribute of the events in the batch of events. The process at 1208 may then include identifying a data type for the third attribute and the process at 1210 may include determining a third type of data compression to be performed on data values stored by the third attribute based on the data type of the third attribute. For instance, continuing with the example of the order processing event stream described above, a third type of data compression may be performed on data values stored by the 'orderAmount' attribute based on the data type of the attribute. In certain examples, when all the attributes for the events have been identified and processed, the process ends at 1222.

Figure 13A:
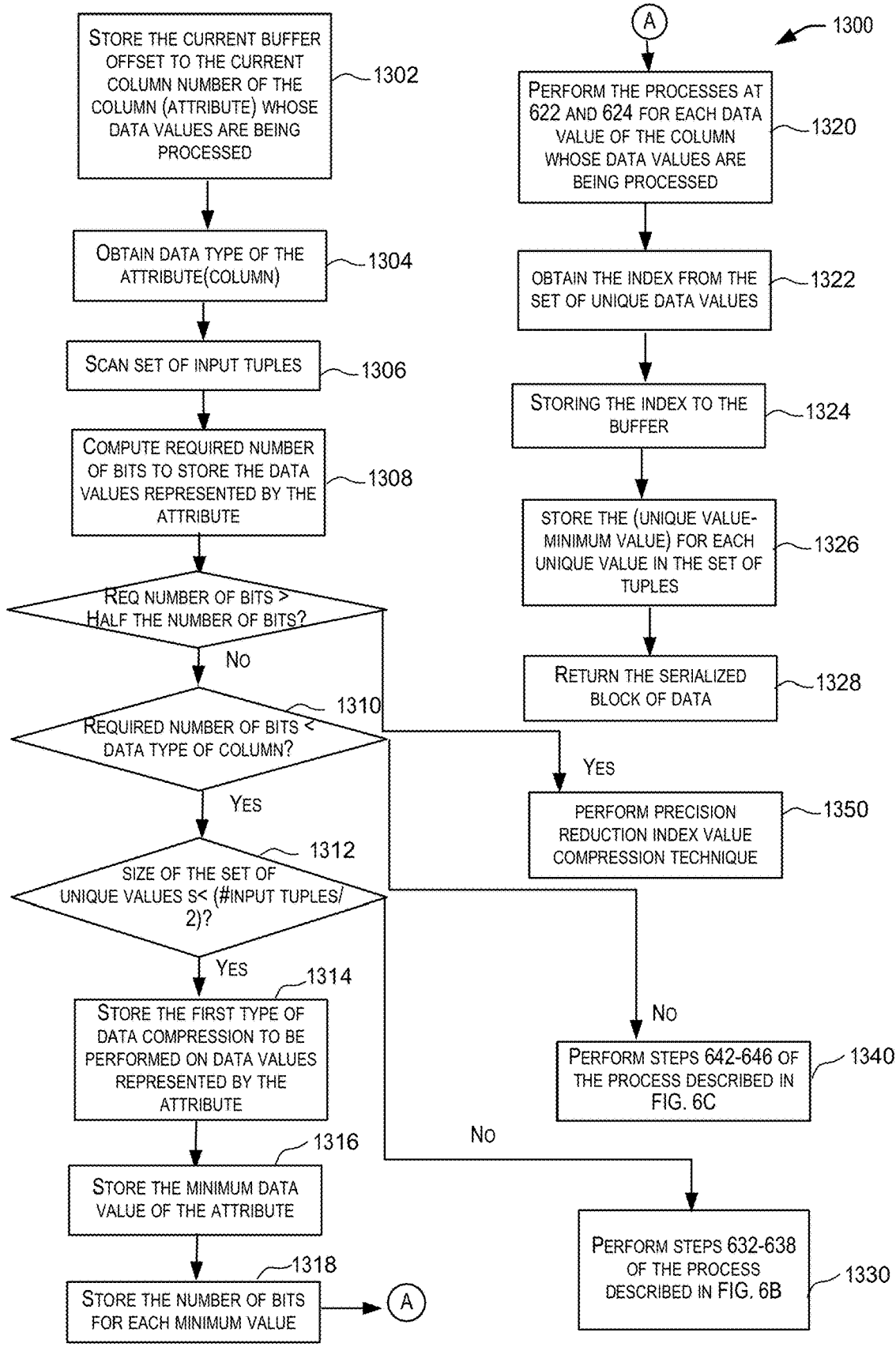
FIG. 13A is an example flow diagram of a process that describes a set of operations for generating a set of serialized data values for a numeric attribute of an event, in accordance with an embodiment of the present disclosure.

FIG. 13A is an example flow diagram of a process 1300 that describes a set of operations for generating a set of serialized data values for a numeric attribute of an event, in accordance with an embodiment of the present disclosure. In an embodiment, the process 1300 describes additional details of the operations performed by the process in 1214 of FIG. 12. In certain examples, the process 1300 begins at 1302 by storing the current buffer offset to the current column number of the column (for e.g., the first attribute) whose data values are being processed. At 1304, the process includes obtaining the data type (column type) of the attribute. For example, the data type of the attribute, in this case, may be determined to be a numeric attribute. At 1306, the process includes scanning the set of input tuples to obtain the minimum value, the maximum value, and the set of unique values represented by the attribute. At 1308, the process includes computing the required number of bits to store the data values represented by the attribute from the range (maximum-minimum). At 1309, the process includes determining if the required number of bits is larger than half of the number of bits of the data type of the attribute and the size of the set of unique value is smaller than the number of input tuples/value_index_threshold where the value_index_threshold is configurable. In an example, the value_index_threshold can be configured to a value of 11 as the default value. If so, the process continues to 1350 to perform the precision reduction index value compression technique. At 1310, the process includes determining if the required number of bits is smaller than the number of bits of the original data type of the column. The checking at 1310 is performed to ensure that the size of serialized block does not increase from the original block. This is because if the bits required to cover the range of values is greater than the bits required for the original data, the result block created using the value indexed technique could be larger than the original block size.

If the required number of bits is smaller than the number of bits of the original data type of the column, the process continues to 1312 to determine if the size of the set of unique values is smaller than the number of input tuples/2. This determination is performed to ensure that the compression rate is large enough. If there are too many unique values, in certain examples, the value itself is used instead of the value and the index to the value. If it is determined that the required number of bits is smaller than the original data type of the column and the size of the set of unique values is smaller than the number of input tuples/2 then the processes described in 1314-626 are performed.

For example, at 1314, the process includes storing the first type of data compression to be performed on the data values represented by the attribute as a precision reduction value index type of data compression. The precision reduction technique reduces the bits representing values from the used values by finding the range of values. The required bits will depend on the range of values. At 1316, the process includes storing the minimum data value of the attribute. At 1318, the process includes storing the number of bits for each minimum value. At 1320, the process includes performing the operations at 1322 and 1324 for each data value of the column (e.g., the attribute) whose data values are currently being processed. For instance, at 1322, the process includes obtaining the index from the set of unique data values. At 1324, the process includes storing the index to the buffer. After all the data values of the column have been processed, at 1326, the process includes storing the (unique value-minimum value) for each unique value in the set of tuples. These values represents the actual value indexed from the index stored at the step 1324.

In certain embodiments, if the process at 1312 determines that the size of set of unique values is not smaller than the number of input tuples/2, then, in some embodiments, the processes 1332-638 described in FIG. 13B below are performed. In certain embodiments, if the process at 1310 determines that the required number of bits is not smaller than the original data type of the column, then, in one embodiment, the processes in 1342-646 described in FIG. 13C are performed. In certain embodiments, the process ends at 1328 by returning a set of serialized data values (i.e., a serialized block of data) for the attribute to the CQL Engine for processing the set of tuples (i.e., the batch of events) received via the event stream.

Figure 13B:
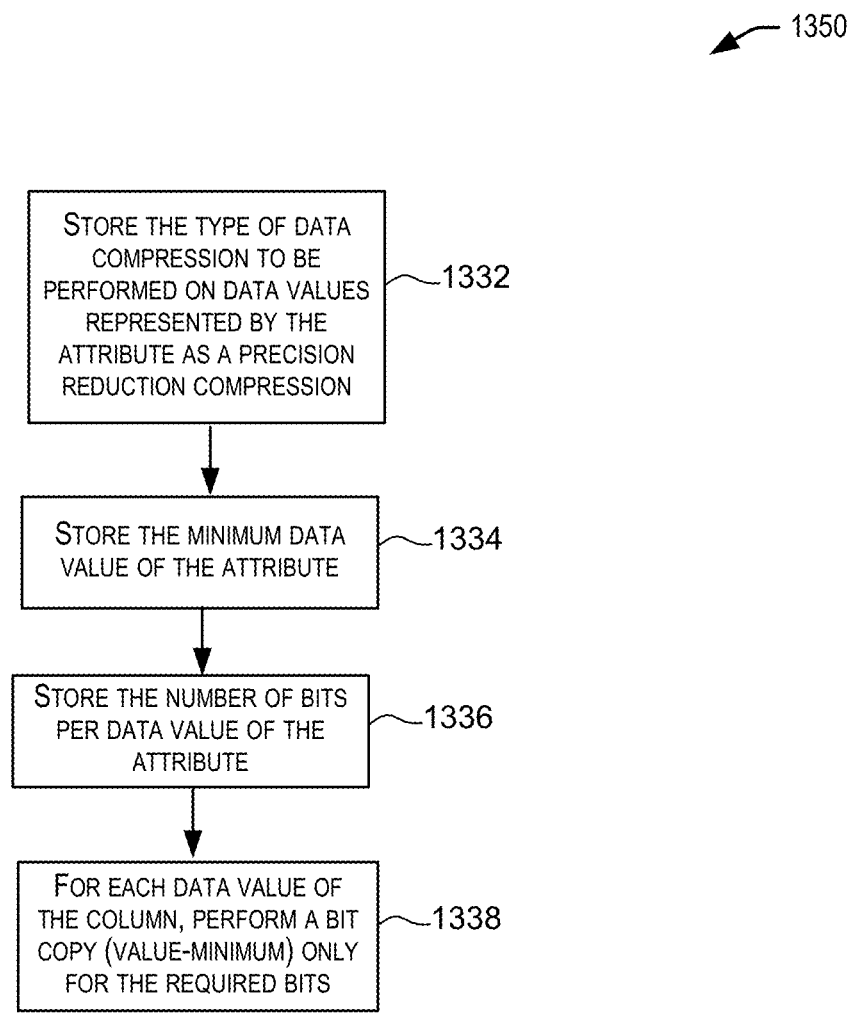
FIG. 13B is an example flow diagram of a process that describes a set of operations for generating a set of serialized data values for a numeric attribute of an event using the precision reduction compression technique, in accordance with an embodiment of the present disclosure.
Figure 13C:
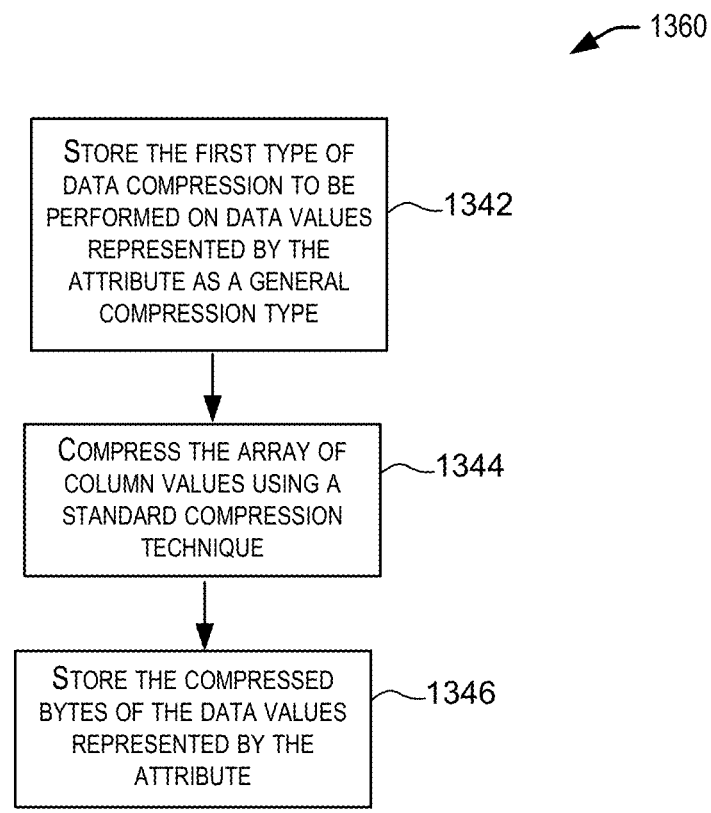
FIG. 13C is an example flow diagram of a process that describes a set of operations for generating a set of serialized data values for a numeric attribute of an event using the regular compression technique, in accordance with an embodiment of the present disclosure.

FIG. 13B is an example flow diagram of a process 1350 that describes a set of operations for generating a set of serialized data values for a numeric attribute of an event using the precision reduction compression technique, in accordance with an embodiment of the present disclosure. In an embodiment, the process 1350 describes additional details of the operations performed by the process in 1330 of FIG. 13A. In certain examples, the process 1350 begins at 1332 by storing the type of data compression to be performed on data values represented by the attribute as a precision reduction compression. At 1334, the process includes storing the minimum data value of the attribute. At 1336, the process includes storing the number of bits per data value of the attribute. At 1338, the process includes for each data value of the column, performing a bit copy (value-minimum) only for the required bits. For example, the set of input values (10,11,12) will be stored with the bits 00 for the value 0 which is the result of (10-10 (the minimum value)), 01 for the value 1 which is the result of (11-10), and 02 for the value 2 which is the result of (12-10). The sequence of bit values 00, 01, and 02 can be stored into a byte(8 bits) 00010200 and stored as 154 in hex value.

FIG. 13C is an example flow diagram of a process 1360 that describes a set of operations for generating a set of serialized data values for a numeric attribute of an event using the regular compression technique, in accordance with an embodiment of the present disclosure. In an embodiment, the process 1360 describes additional details of the operations performed by the process in 1340 of FIG. 13A. In certain examples, the process 1360 begins at 1342 by storing the first type of data compression to be performed on data values represented by the attribute as a general compression type. At 1344, the process includes compressing the array of column values using a standard compression technique such as, zip or gzip. At 1346, the process includes storing the compressed bytes of the data values represented by the attribute.

Figure 13D:
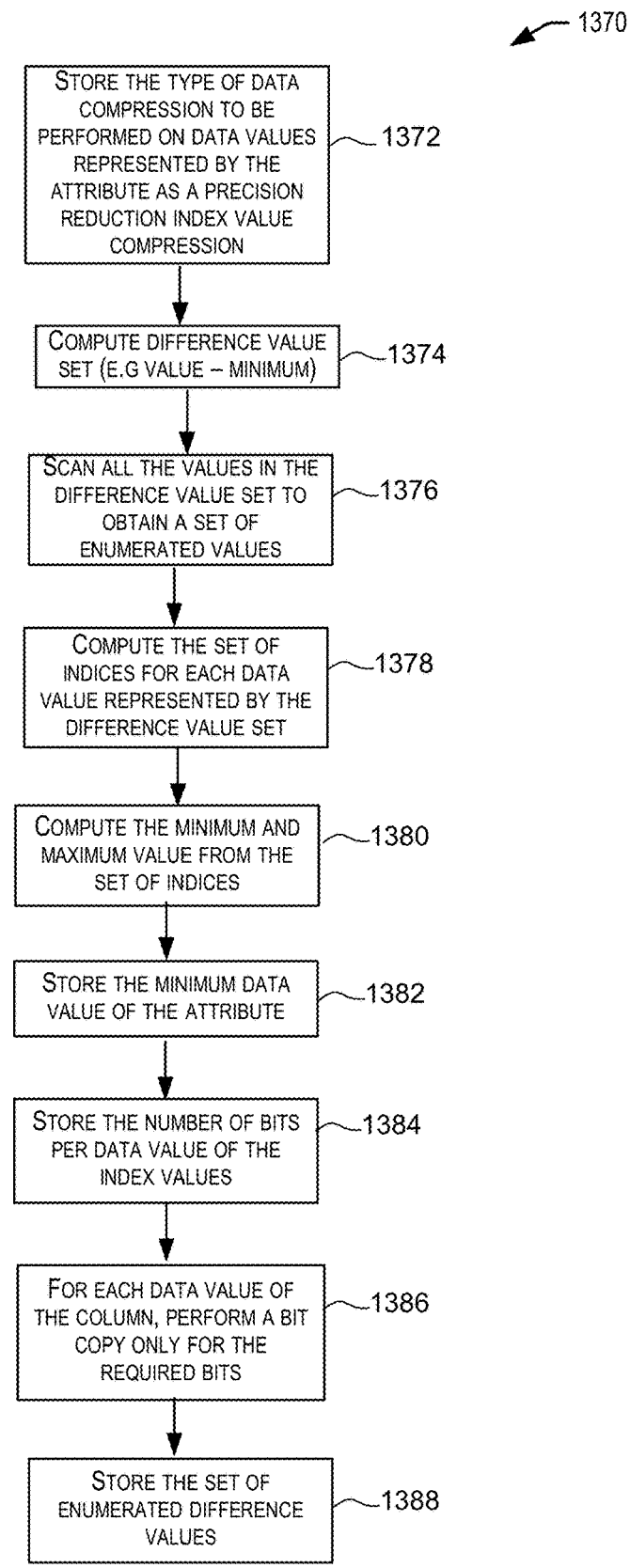
FIG. 13D is an example flow diagram of a process that describes a set of operations for generating a set of serialized data values for a numeric attribute of an event using the precision reduction value index compression technique, in accordance with an embodiment of the present disclosure.

FIG. 13D is an example flow diagram of a process 1370 that describes a set of operations for generating a set of serialized data values for a numeric attribute of an event using the precision reduction value index compression technique, in accordance with an embodiment of the present disclosure. In an embodiment, the process 1370 describes additional details of the operations performed by the process in 1350 of FIG. 13A. In certain examples, the process 1370 begins at 1372 by storing the type of data compression to be performed on data values represented by the attribute as a precision reduction index value compression. At 1374, the difference value set (e.g value-minimum) is computed. At 1376, the process includes scanning all the values in the difference value set to obtain a set of enumerated values. At 1378, the process includes computing the set of indices for each data value represented by the difference value set. At 1380, the process includes computing the minimum and maximum value from the set of indices. At 1382, the process includes storing the minimum data value of the attribute. At 1384, the process includes storing the number of bits per data value of the index values. At 1386, the process includes for each data value of the column, performing a bit copy only for the required bits. At 1388, the process includes storing the set of enumerated difference values.

Figure 14:
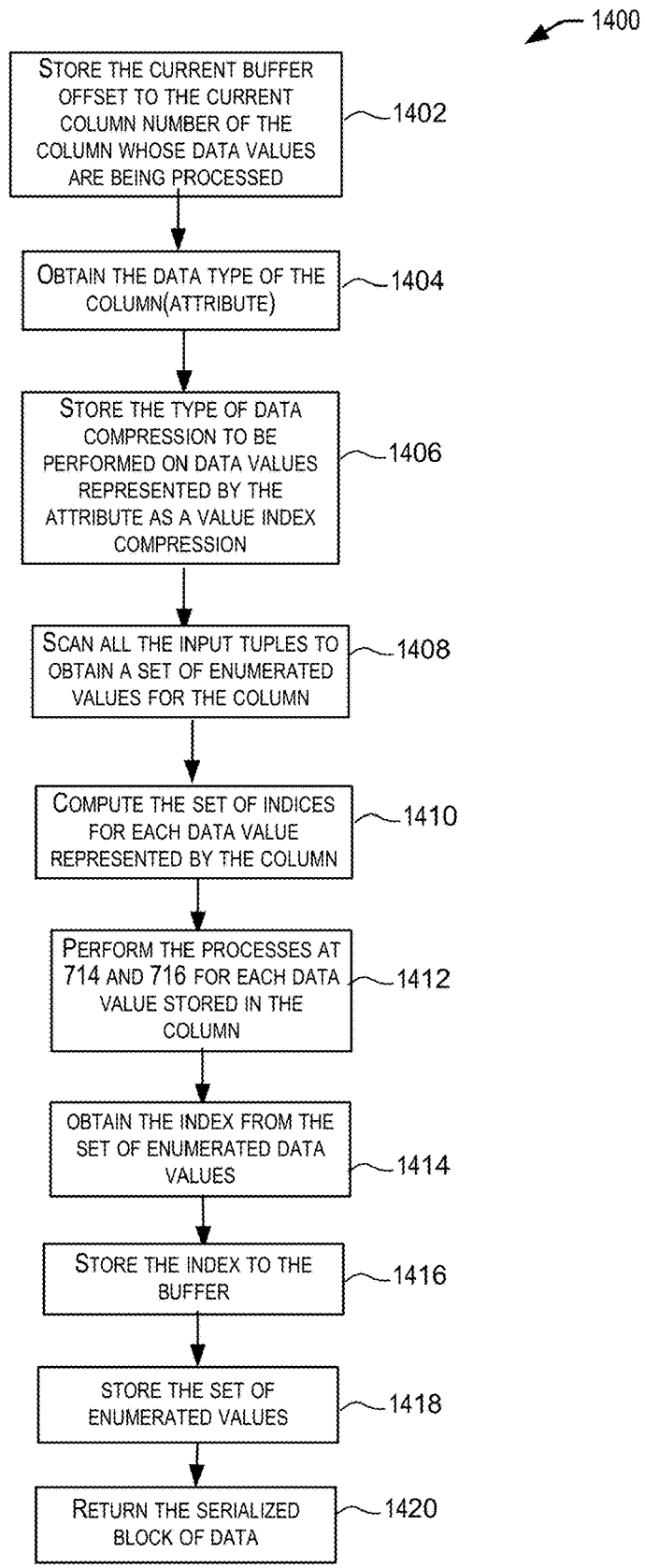
FIG. 14 is an example flow diagram of a process that describes a set of operations to generate a set of serialized data values for a non-numeric attribute of an event, in accordance with an embodiment of the present disclosure.

FIG. 14 is an example flow diagram of a process 1400 that describes a set of operations to generate a set of serialized data values for a non-numeric attribute of an event, in accordance with an embodiment of the present disclosure. In an embodiment, the process 1400 describes additional details of the operations performed by the process 1214 of FIG. 12 when it is determined that a second type of data compression is to be performed on the data values represented by an attribute (e.g., a non-numeric attribute). The process 1400 begins at 1402 by storing the current buffer offset to the current column number of the column (for e.g., the attribute) whose data values are being processed. At 1404, the data type (column type) of the attribute is obtained. For instance, in this case, the data type of the attribute is determined to be a non-numeric attribute. At 1406, the process includes storing the type of data compression to be performed on data values represented by the attribute as a value index compression. In this case, all the possible values within the batch of inputs are enumerated and the index of the location is used instead of copying values multiple times.

At 1408, the process includes scanning all the input tuples to obtain a set of enumerated values for the column. At 1410, the process includes computing the set of indices for each data value represented by the column. At 1412, the process includes performing the operations described in 1414-716 below for each data value stored in the column. At 1414, the process includes obtaining the index from the set of enumerated values. At 1416, the process includes storing the index to the buffer. At 1418, the process includes storing the set of enumerated values. At 1420, the process ends by returning a set of serialized data values (i.e., a serialized block of data) for the attribute to the CQL Engine for processing the set of tuples (i.e., the batch of events) received via the event stream.

Figure 15:
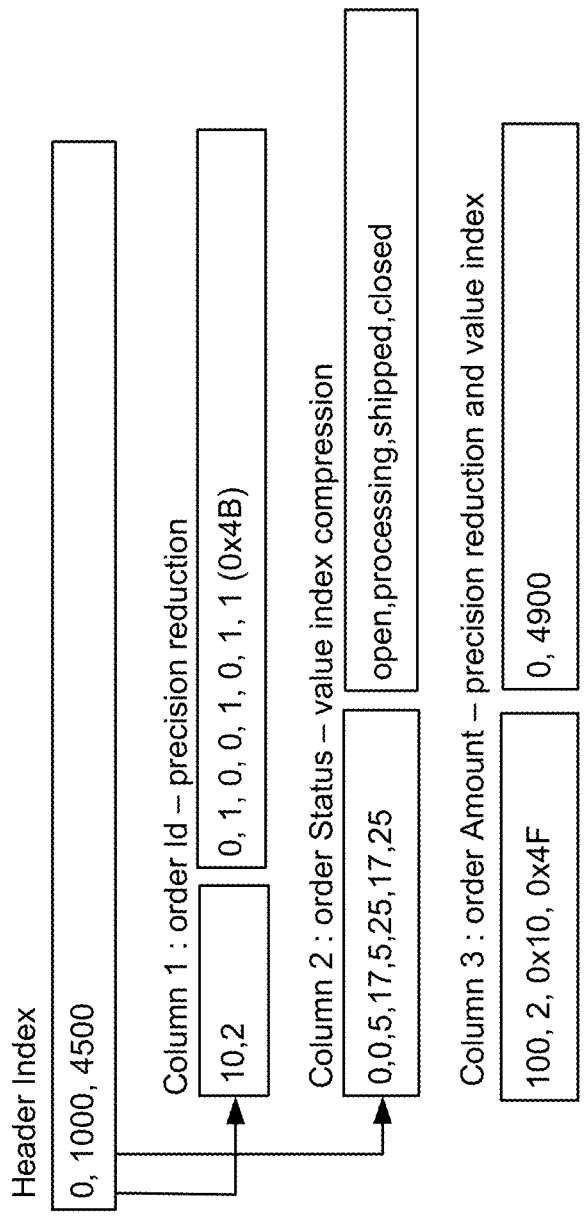
FIG. 15 is an example of the manner in which event stream data can be serialized based on determining the data type of the attributes of the events in the event stream, in accordance with an embodiment of the present disclosure.

FIG. 15 is an example of the manner in which event stream data can be serialized based on determining the data type of the attributes of the events in the event stream, in accordance with an embodiment of the present disclosure. In the example illustrated below, the event stream represents product related information related to products sold by a company. Each event in the event stream may represent an order for an item and comprise attributes such as an order identifier, an order status, and an order amount related to the item. The schema for such an order event stream can be represented as S(timestamp, <orderId>, <orderStatus>, <orderAmount>). Each event received via such a stream can thus be identified by a time stamp and three attributes. As an example, a batch of events received via an order event stream may include the following events and associated timestamps:

. . .

(timestamp_N, 10, "open",100)
(timestamp_N+1, 11, "open",5000)
(timestamp_N+2, 10,"processing",100)
(timestamp_N+3, 10,"shipped",100)
(timestamp_N+4, 11, "processing",5000)
(timestamp_N+5, 10,"closed",100)
(timestamp_N+6, 11,"shipped",5000)
(timestamp_N+7, 11,"closed",5000)

As noted above, in certain embodiments, the one or more attributes of the events may be represented as one or more columns in a set of input tuples that represent a batch of events. Hence, an attribute, in some examples, may refer to a column that stores data values for a tuple(event) in the set of input tuples. An example of a set of input tuples corresponding to a batch of events received via the order event stream may be as shown in Table-1 below:

TABLE 1

| Tuple (event) | Attribute 1(column 1) Order Id | Attribute 2(column 2) Order Status | Attribute 3(column 3) Order Amount |
|---|---|---|---|
| e1 | 10 | Open | 100 |
| e2 | 11 | Open | 5000 |
| e3 | 10 | Processing | 100 |
| e4 | 10 | Shipped | 100 |
| e5 | 11 | Processing | 5000 |
| e6 | 10 | Closed | 100 |
| e7 | 11 | Shipped | 5000 |
| e8 | 11 | Closed | 5000 |

In certain embodiments, the events in the event batch are serialized by identifying the data type of each attribute of the events and determining a particular type of compression technique to be applied to the data values represented by each attribute based on the data type of the attribute. For instance, a first compression technique may be applied to a first attribute (e.g., the order id attribute) of the event based on determining that the first attribute is a numeric attribute, a second compression technique may be applied to a second attribute (e.g., the order status attribute) of the event based on determining that the second attribute is a non-numeric attribute, and a third compression technique may be applied to a third attribute (e.g., the order amount attribute) of the event based on determining that the third attribute is a numeric attribute. In certain examples, the first type of compression technique, the second type of compression technique, and the third type of compression technique may be different from each other.

In an embodiment, columnar storage can be used to store the attributes (columns) that have the same datatype so that the values in the columns are the same data type. In certain embodiments, the values stored in columns of numeric types may be compressed using a base value compression technique or a precision reduction compression technique. The precision reduction reduces the bits representing values from the used values by finding the range of values. The required bits will depend on the range of values. The base value compression uses the minimum value as the base value and stores the differences from the base value for other values. For example, the set of input values that represent the 'order id' of each event in the event batch (10,11,10,10,11,10,11, 11) can be compressed to (10, 1), 01001011 in binary or 0x4B in hexadecimal which represents the values of (0, 1, 0, 0, 1, 0, 1, 1) using reduced bits to 2 bits from 32 bits since the minimum value is 10 and the range is 2. For another example, the set of input values that represent the 'order amount' can be compressed using a precision reduction and value index technique. In this case, the set of input values that represent the order amount (100, 5000,100,100,5000, 100,5000,5000) can be compressed to (100, 2, 0x10, 0x4F) and (0,4900) by using both the precision reduction and value index techniques. The input set can be represented as (0, 4900, 0, 0, 4900, 0, 4900, 4900) with the base value of 100. The result set has a value of 00010000, 01001111 in binary and 10 and 4F in hexadecimal which represents (0, 1, 0, 0, 1, 0, 1, 1) having indexes to the base value table (0, 4900) (e.g., 0 is pointing to 0 and in turn 100 with the base value 100 and 1 is pointing to 4900 and in turn 5000 with the base value 100).

Figure 16:
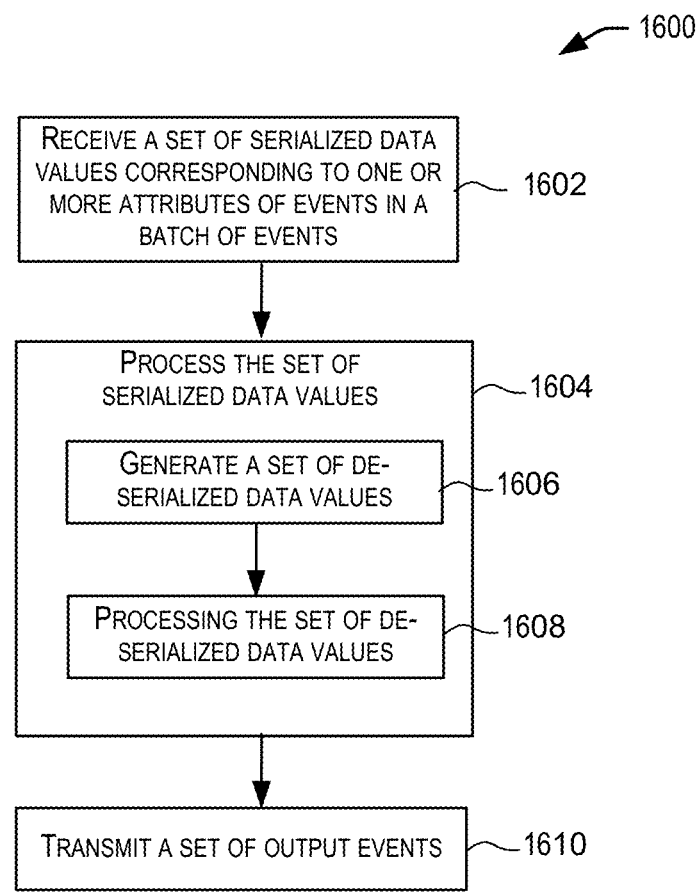
FIG. 16 is an example flow diagram of a process that describes a set of operations by which data comprised in a batch of events can be de-serialized, in accordance with an embodiment of the present disclosure.

In certain embodiments, a 'value index compression' technique may be used to process the values for columns that store non-numeric values such as string values. In this case, we enumerate all the possible values within the batch of inputs and use the index of the location instead of copying values multiple times. For example, if the values of the 'order status' attribute (column) are (open, open, processing, shipped, processing, closed, shipped, closed), the corresponding enumerated unique values will be (open, processing, shipped, closed). When the values of the columns are stored in a linear buffer sequentially, the index of each value will be (0,5,17,25) because the buffer will have open/ 0processing/0shipped/0closed/0 where /0 indicates the end of string marker. The final compressed result is (0,0,5,17,5, 25,17,25) with the linear buffer of the values FIG. 16 is an example flow diagram of a process 1600 that describes a set of operations by which data comprised in a batch of events can be de-serialized, in accordance with an embodiment of the present disclosure. In certain embodiments, the process 1600 can be performed by a batch de-serializer process (420) in the distributed event processing system. As noted above, the batch de-serializer process may, in certain embodiments, be invoked by the master computing node when the master computing node (e.g., 314 as shown in FIG. 3) is requested to run a job/operation defined in the application. As described above, the master computing node identifies a node (e.g., an executor node 318) in the cluster of computing nodes 312 in the distributed computing system 302 to process a batch of events against the job/operation defined in the application and generate a set of output events as a result of the processing. In certain embodiments, processing the batch of events may include the serialization and the subsequent de-serialization of the data in the batch of events. The process of FIG. 16 describes one technique by which data in a batch of events can be de-serialized. The particular series of processing steps depicted in FIG. 16 is not intended to be limiting. Alternative embodiments may have more or less steps than those shown in FIG. 16 in various arrangements and combinations.

In certain embodiments, the process 1600 begins at 1602 by receiving a set of serialized data values corresponding to one or more attributes of events in a batch of events (set of input tuples). At 1604, the process includes processing the set of serialized data values corresponding to the one or more attributes of the events in the batch of events to generate a set of output events. In certain examples, the process at 1604 may include generating a set of de-serialized data values corresponding to the attributes based on the set of serialized data values at 1606 and processing the set of de-serialized data values corresponding to the attributes against a set of one or more continuous queries to generate a first set of output events at 1608. At 1610, the process includes transmitting the set of output events to a user of the distributed event processing system.

Figure 18:
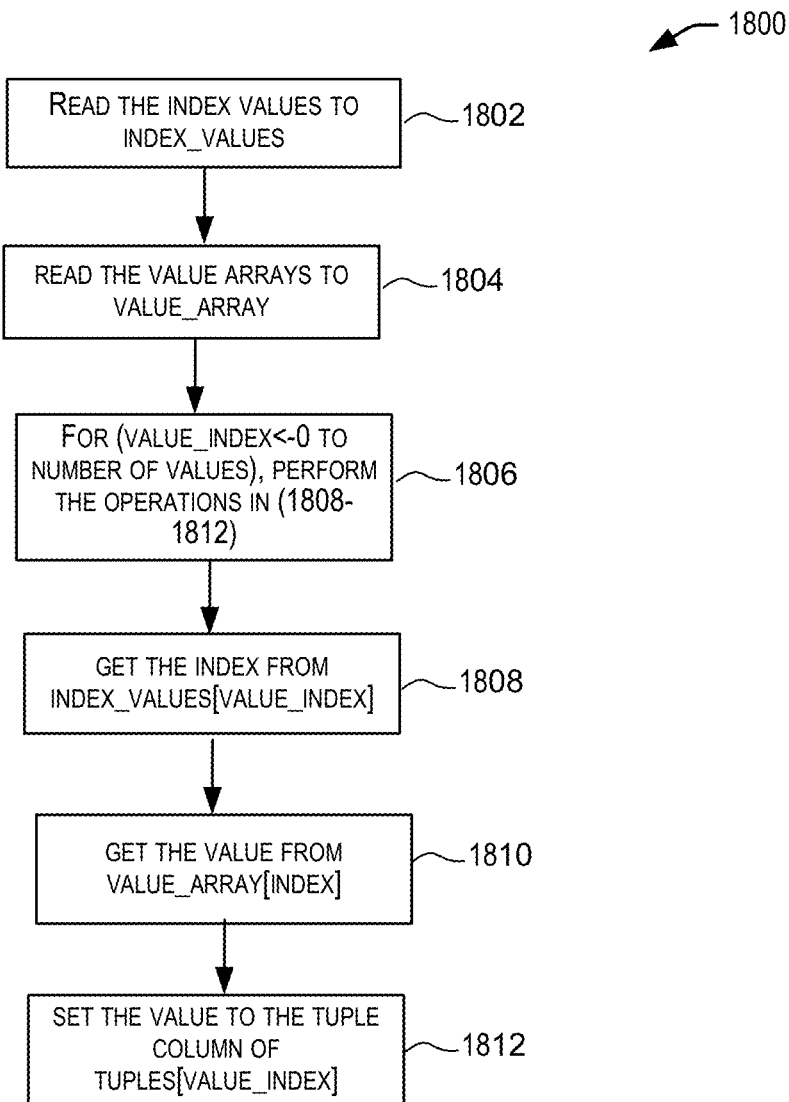
FIG. 18 is an example flow diagram of a process describing a set of operations for generating a set of de-serialized data values corresponding to a numeric attribute or a non-numeric attribute of events in a batch of events using the value index compression, in accordance with an embodiment of the present disclosure.
Figure 19:
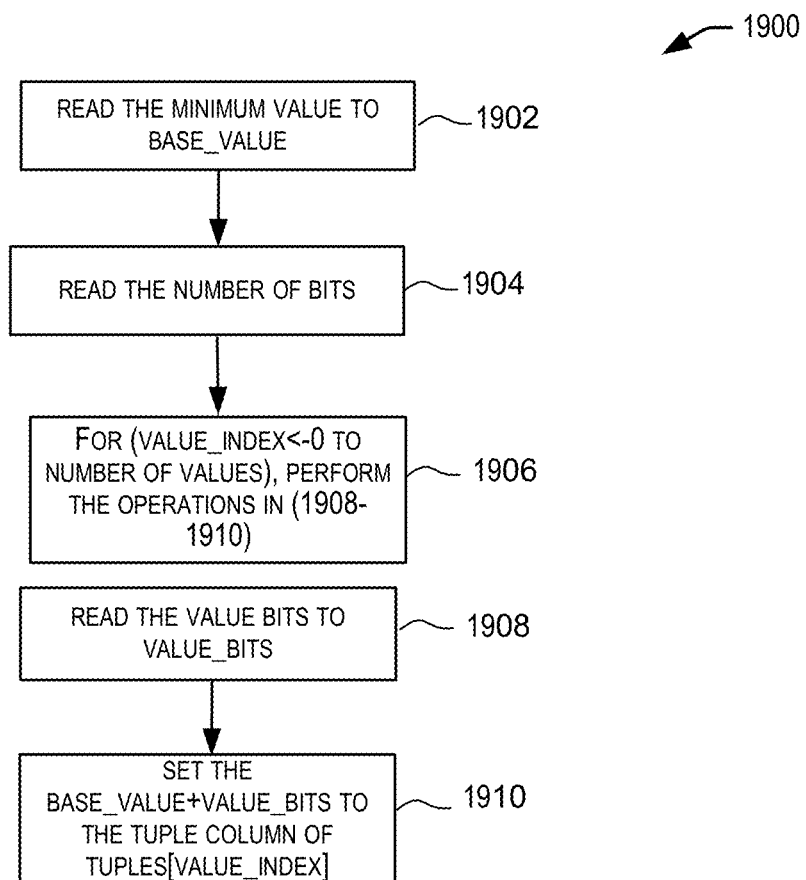
FIG. 19 is an example flow diagram of a process describing a set of operations for generating a set of de-serialized data values corresponding to a numeric attribute of events in a batch of events using the precision reduction compression technique, in accordance with an embodiment of the present disclosure.

The process 1604 of generating a set of de-serialized data values corresponding to attributes of events in a batch of events is discussed in detail in relation to FIGS. 17-14 below. In particular, FIG. 17 describes a process by which a set of de-serialized data values corresponding to one or more attributes of events in a batch of events can be generated. FIG. 18 describes a process by which set of de-serialized data values corresponding to a non-numeric attribute of an event can be generated. FIGS. 19-14 describe a process by which set of de-serialized data values corresponding to a numeric attribute of an event can be generated.

Figure 17:
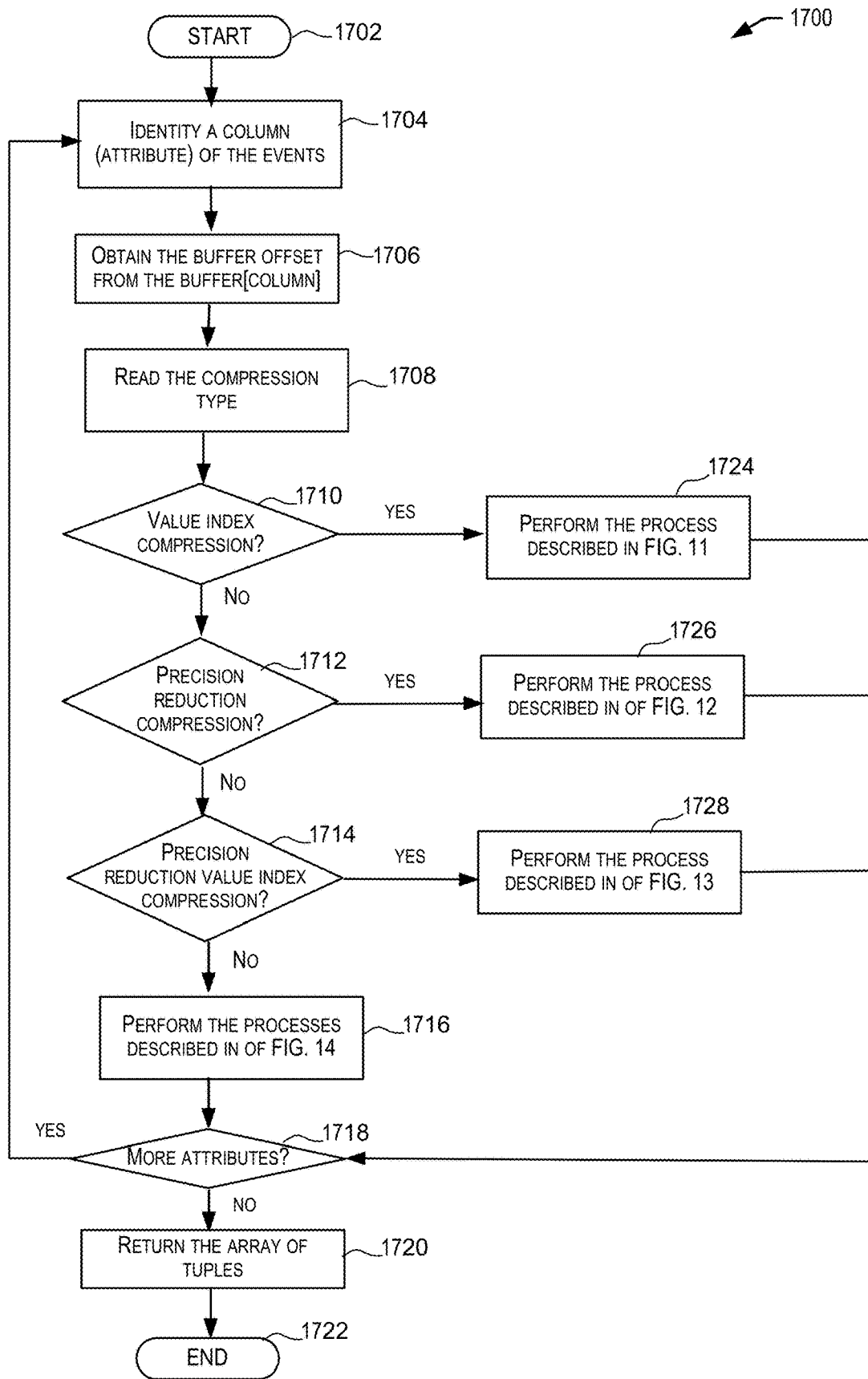
FIG. 17 is an example flow diagram of a process that describes a set of operations to generate a set of de-serialized data values for one or more attributes of events in a batch of events, in accordance with an embodiment of the present disclosure.

FIG. 17 is an example flow diagram of a process 1700 that describes a set of operations to generate a set of de-serialized data values for one or more attributes of events in a batch of events, in accordance with an embodiment of the present disclosure. In an embodiment, the process 1700 describes additional details of the operations of the process in 1604 of FIG. 16. In certain examples, the process 1700 begins at 1702 by creating an array of tuples. At 1704, the process includes identifying a first column (first attribute) of the events. At 1706, the process includes obtaining the buffer offset of the current column number of the column (for e.g., the first attribute) whose data values are being processed. At 1708, the process includes reading the compression type of the attribute. This involves, for example, reading the type of data compression that was performed by the batch serializer process to serialize the data values of the attribute. At 1710, the process includes determining if the type of data compression applied to the attribute is a value index compression. If the compression type applied to the attribute is a value index compression, then the then the process continues to 1724 to perform the process described in FIG. 18.

At 1712, the process includes determining if the type of data compression applied to the attribute is a precision reduction compression. If the compression type applied to the attribute is a precision reduction compression, then the process continues to 1726 to perform the process described in FIG. 19.

In certain embodiments, at 1714, the process includes determining if the type of data compression type applied to the attribute is a precision reduction value index compression. If the compression type applied to the attribute is a precision reduction value index compression, then the process continues to 1728 to perform the process described in FIG. 20.

In certain embodiments, if the process determines that the compression type applied to the attribute is neither a value index compression, or a precision reduction compression, or a precision reduction value index compression, then the process continues to 1716 to determine that the compression type applied to the attribute is a general compression. At 1716, the process includes performing the process described in FIG. 21.

At 1718, the process includes determining if there are additional attributes to be processed. If there are additional attributes to be processed, the process loops back to 1704 to identify and process the next attribute of the events. If there are no attributes to be processed, then, in some embodiments, the process returns an array of tuples to the CQL Engine for further processing at 1720. In certain embodiments, the process ends at 1722.

FIG. 18 is an example flow diagram of a process 1800 describing a set of operations for generating a set of de-serialized data values corresponding to a numeric attribute or a non-numeric attribute of events in a batch of events using the value index compression, in accordance with an embodiment of the present disclosure. In an embodiment, the process 1810 describes additional details of the process 1724 in FIG. 17 and is performed when the type of data compression applied to the attribute is determined to be a 'value index' compression (e.g., at 1710 in FIG. 17). As an example, the process 1800 can be performed for the 'order status' attribute (non-numeric attribute) in the order event stream.

An example of using the value index compression technique is shown in FIG. 8, Column 2. The compressed value has two sets of data (0,0,5,17,5,25,17,25), and ('open', 'processing','shipped','closed'). The second set is referred to value_arrays since the set includes the actual values. The first set is referred to index_values since the set includes the index values to the actual values stored in the value_arrays. The value_index refers to each of the individual index values in the index_values.

In certain embodiments, the process 1800 begins at 1802 by reading the index values to index_values. At 1804, the process includes reading value arrays to value_array. At 1806, the process includes performing the operations in 1808, 1810, and 1812 for each data value corresponding to the attribute in the set of input tuples. For example, at 1808, the process includes getting the index from index_values [value_index]. At 1810, the process includes getting the value from value_array[index]. At 1812, the process includes setting the value to the tuple column of tuples [value_index].

FIG. 19 is an example flow diagram of a process 1900 describing a set of operations for generating a set of de-serialized data values corresponding to a numeric attribute of events in a batch of events using the precision reduction compression technique, in accordance with an embodiment of the present disclosure. In an embodiment, the process 1900 describes additional details of the process 1726 in FIG. 17 and is performed when the type of data compression applied to the attribute is determined to be a 'precision reduction' compression (e.g., at 1712 in FIG. 17). As an example, the process 1900 can be performed for the 'order id' or the 'order amount' attribute (numeric attribute) in the order event stream and the compressed result is shown at FIG. 8, Column 1 is (10, 2, 0x4B). In the set of operations described below, in one example, the term 'minimum values' has a value 17 which is the minimum value of the value range and the term 'the number of bits' has the value 2 which is the number of bits representing the value range In certain embodiments, the process 1900 begins at 1902 by reading the minimum value to the base_value. At 1904, the process includes reading the number of bits. At 1906, the process includes performing the processes in 1908 and 1910 for each data value corresponding to the attribute in the set of input tuples. For example, at 1908, the process includes reading the value bits to value_bits. At 1910, the process includes setting the base_value+value_bits to the tuple column of tuples[value_index].

Figure 20:
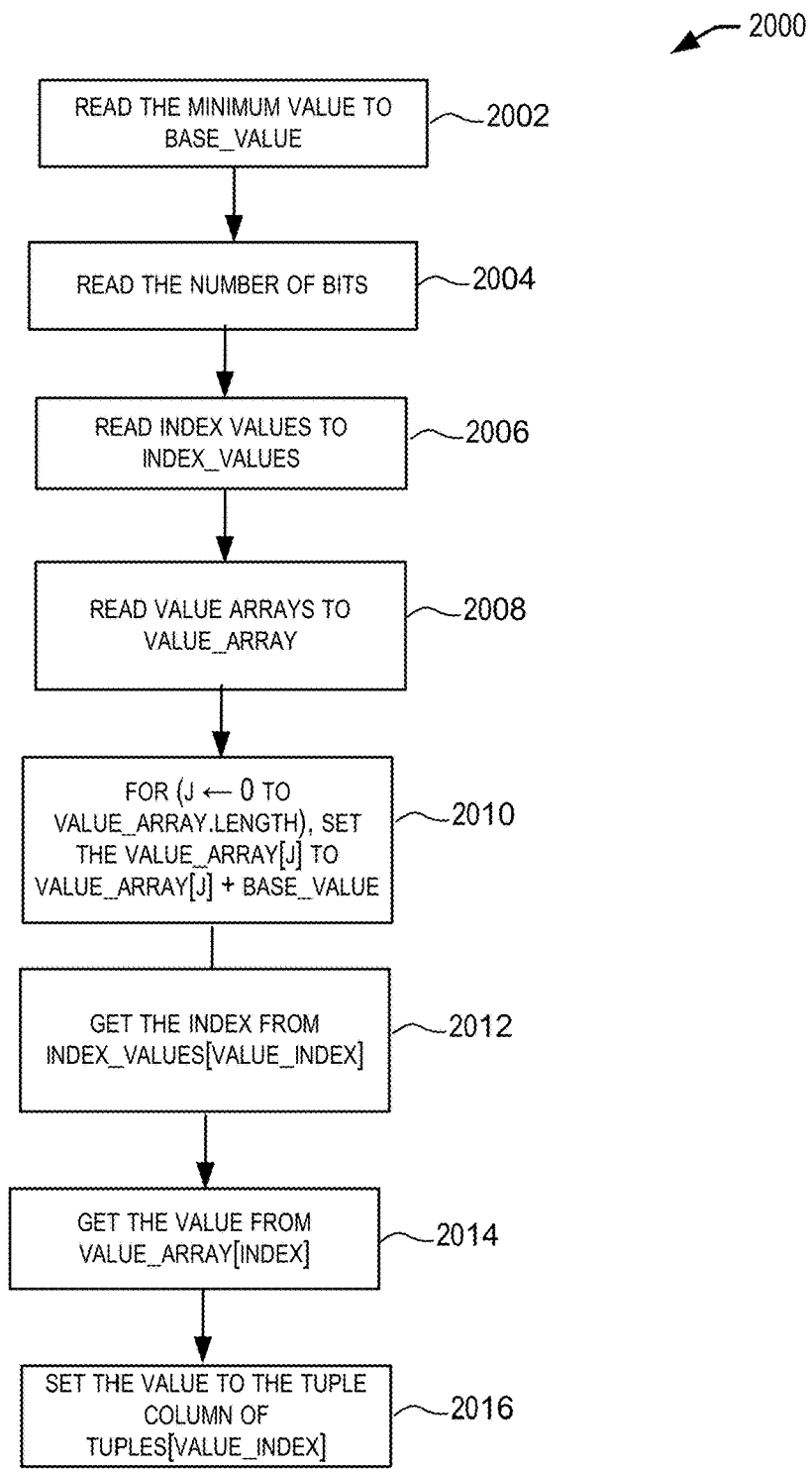
FIG. 20 is an example flow diagram of a process describing a set of operations for generating a set of de-serialized data values corresponding to a numeric attribute of events in a batch of events, in accordance with an embodiment of the present disclosure.

FIG. 20 is an example flow diagram of a process 2000 describing a set of operations for generating a set of de-serialized data values corresponding to a numeric attribute of events in a batch of events using the precision reduction value index, in accordance with an embodiment of the present disclosure. In an embodiment, the process 2000 describes additional details of the process 1728 in FIG. 17 and is performed when the type of data compression applied to the attribute is determined to be a 'precision reduction value index' compression (e.g., at 1712 in FIG. 17). As an example, the process 2000 can be performed for the 'order id' or the 'order amount' attribute (numeric attribute) in the order event stream. FIG. 8, in column 3 shows an example result for the 'order amount attribute' with the result, (100, 2, 0x10, 0x4F) and (0,4900).

In the set of operations described below, the term, 'base value' refers to value 170 for the base value of the column values, the term 'number of bits' refers to value 2 for the number of bits for the index values, the term 'index_values' refers to value (0x10, 0x4F) for the index values, and the term 'value_array' refers to (0,4900) which represents the set of difference values.

In certain embodiments, the process 2000 begins at 2002 by reading the minimum value to the base_value. At 2004, the process includes reading the number of bits. At 2006, the process includes reading the index values to index_values. At 2008, the process includes reading the value arrays to value_array. At 2010, the process includes setting the value_array[j] to value_array[j]+base_value for each value of j←0 to value_array.length. At 2012, the process includes performing the processes in 2014, 2016, and 2018 for each data value corresponding to the attribute in the set of input tuples. For example, at 2014, the process includes getting the index from index_values[value_index]. At 2016, the process includes getting the value from value_array[index]. At 2018, the process includes setting the value to the tuple column of tuples[value_index].

Figure 21:
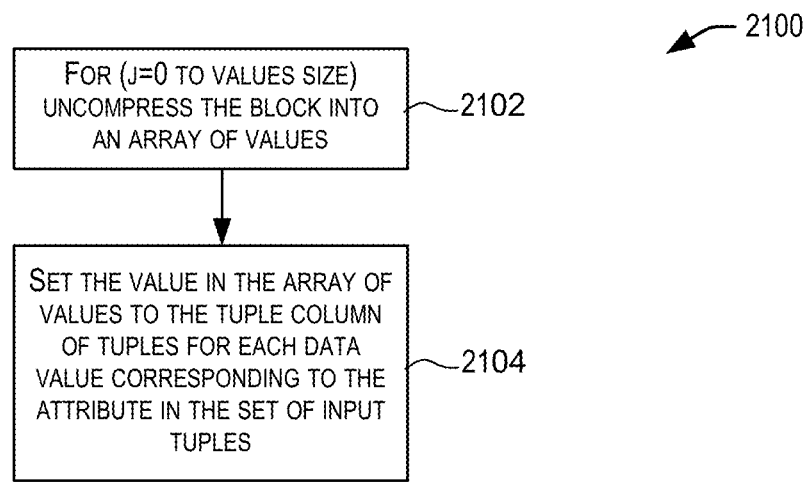
FIG. 21 is an example flow diagram of a process describing a set of operations for generating a set of de-serialized data values corresponding to a numeric attribute of events in a batch of events, in accordance with an embodiment of the present disclosure.

FIG. 21 is an example flow diagram of a process 2100 describing a set of operations for generating a set of de-serialized data values corresponding to a numeric attribute or non-numeric attribute of events in a batch of events, in accordance with an embodiment of the present disclosure. In an embodiment, the process 2100 describes additional details of the process 1716 in FIG. 17 and is performed when the type of data compression applied to the attribute is determined to be a 'general compression' technique (e.g., at 1716 in FIG. 17). As an example, the process 2100 can be performed for the 'order id' or the 'order amount' attribute (numeric attribute) in the order event stream. In the set of operations described below, the term 'values' refers to the uncompressed values.

In certain embodiments, the process 2100 begins at 2102 by uncompressing the block into array of values. At 2104, the process includes setting the value in values array into the tuple column of tuples for each data value corresponding to the attribute in the set of input tuples.

Scheduling and Managing Multiple CEP Engines within a Micro-Batch Based Event Processing System In recent years, data stream management systems (DSMs) have been developed that can execute queries in a continuous manner over potentially unbounded, real-time data streams. Among new DSMs, these systems employ micro-batching based stream processing in order to provide a combination of batch processing and stream processing from a single framework. An example of such a system is a Spark® Streaming application running on the Spark® platform.

Micro-batching stream processing has some shortcomings due to the nature of the system design where stateful processing is generally complex. One such shortcoming is not being able to perform a 'pattern matching' operation. Pattern matching is an important feature that is desirable that a Stream Processing system should support and Pattern Matching requires highly stateful processing in order to run state machines to detect patterns from an unbound stream of events.

In order to support fully stateful query processing, the disclosed technique adds the CQL Query Engine into micro-batching stream processing. Since there are more than one CQL Engines in a cluster, issues related to scheduling, tracking, and maintaining locality have to be addressed.

Figure 22:
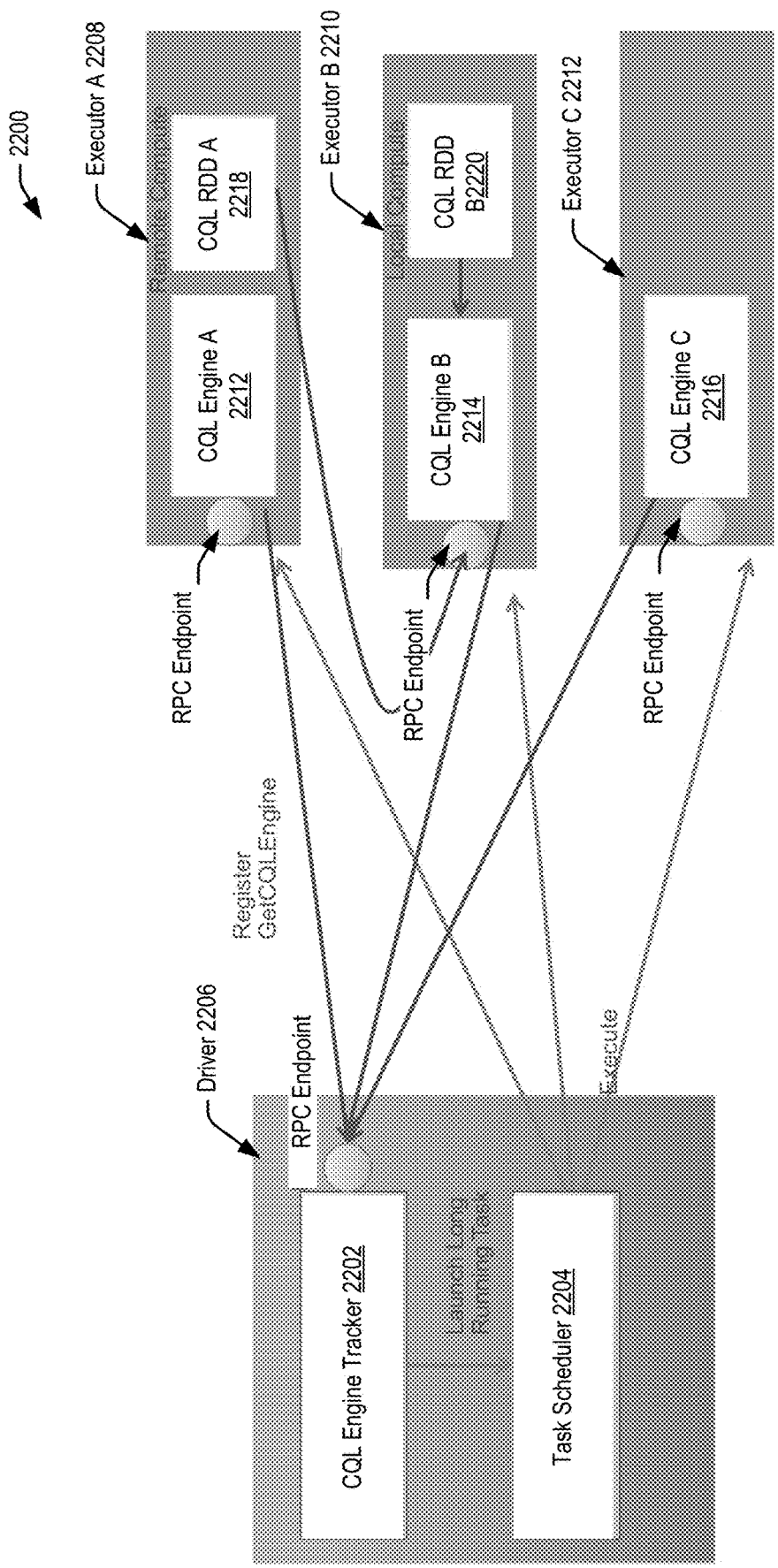
FIG. 22 is a simplified block diagram illustrating the components of a distributed event processing system configured for scheduling and managing multiple CEP engines, in accordance with an embodiment of the present disclosure.

FIG. 22 is an example system or architecture in which a scheduling process in the CQL Engine Tracker can be implemented. In one embodiment, and as shown in FIG. 22 below, a CQL Engine Tracker 2202 component is disclosed in the driver (master) 2206 that can remotely communicate between the CQL engine 2212 and the CQL Resilient Distributed Dataset (RDD) 2218. For launching and scheduling, the CQLEngineTracker 2202 uses a two-step scheduling policy to differentiate different system environments. In order to maximize the locality, in one embodiment, the CQLEngineTracker 2202 uses the following affinity algorithm.

1. All CQLEngines 2212, 2214, 2216 are launched by the CQLEngineTracker 2202 from a driver 2206. No association of a CQLEngine to a preferred location is set.
2. The first CQLRDD 2218 does not have preferred location information.
3. A Scheduler 2204 will try to co-locate to the host where the parent RDD is located using the parent RDD's preferred location.
4. The first run of CQLRDD 2218 associates the CQLEngine 2212 to the same host 2208.
5. The next CQLRDD 2220 will set the preferred location information from the association information set from step 4.
6. The Scheduler 2204 will try to run CQLRDD to the preferred location it is set to.

The disclosed technique enables having fully stateful CQLEngines 2212, 2214, 2216 within micro-batching stream processing, maintaining locality between CQLEngine and CQLRDD, and Multi-step scheduling algorithm for launching and re-launching CQLEngines. In addition, the disclosed local affinity algorithm provides maximum performance compared to other event-by-event based stream processing systems.

In certain embodiments, the disclosed CQL engine tracker 2202 is responsible for scheduling, tracking, and restarting CQLEngines in a cluster. The CQL Engine runs as a long-running task in the cluster and can be launched as a regular Streaming Job. The CQL engine tracker 2202 does not return except when it encounters the fault situation.

In some embodiments, the following tracking information by the CQL Engine Tracker 2202 can be maintained.
    state: CQLEngineState—INACTIVE, SCHEDULED, ACTIVE
       This changes from INACTIVE->SCHEDULED->ACTIVE->INACTIVE throughout the lifecycle of CQLEngine 2212, 2214, 2216 scheduleLocation: TaskLocation
　　The initial scheduled location
runningExecutor: ExecutorCacheTaskLocation
　　The executor 2208 location where the CQLEngine actually runs name: String
　　The name of CQLEngine 2212, 2214, 2216
endpoint: RpcEndpointRef
　　The Remote Process Call (RPC) endpoint of CQLEngine 2212, 2214, 2216 to access it remotely
errorInfo: CQLEngineErrorInfo
　　The last known error information In an embodiment, the launch flow of the CQL Engine 2212, 2214, 2216 may be described as follows:
　Decide number of CQLEngines 2212, 2214, 2216 to launch
　Get the list of executors 2208, 2210, 2212
　Run Round-robin scheduler to schedule CQLEngine 2212, 2214, 2216 to the list of executors 2208, 2210, 2212
　TaskScheduler 2204 launches actual long-running tasks
　The newly launched CQLEngine invokes 'register' RPC call to CQLEngineTracker (e.g., CQL Engine Tracker 2202)

In certain embodiments, the CQLEngine Locality Affinity Algorithm may be described by the following process:
1. All CQLEngines are launched by CQLEngineTracker from a driver. No association of CQLEngine to a preferred location is set.
2. The first CQLRDD does not have preferred location information.
3. The Scheduler will try to co-locate to the host where the parent RDD is located using the parent RDD's preferred location.
4. The first run of CQLRDD associates the CQLEngine to the same host.
5. The next CQLRDD will set the preferred location information from the association information set from step 4.
6. The Scheduler will try to run CQLRDD to the preferred location it's set.

In an embodiment, the CQLEngine Restart Scheduling process may be described as follows:
　Handle two cases (Rejected, Crashed)
　Rejected—If the schedule location and actual location is different (failed to start from the schedule)
　get scheduled executor either using the old scheduled executor (minus the ones that are not active) or the new scheduled executor with schedulePolicy.rescheduleCQLEngine
　　choose the executors that are still alive in the list of scheduled locations
　start CQLEngine with the scheduled executor The following flow shows the data flow of the above architecture:
1. CQLEngineTracker 2202 in Driver 2206 launches long running tasks for each CQLEngine. The CQLEngineTracker 2202 exposes RPCEndpoint of it to the long running tasks.
2. TaskScheduler 2204 executes the long running tasks to executors 2208, 2210, 2212 in the cluster
3. As part of the long running task, CQLEngine runs from executors 2208, 2210, 2212.
4. CQLEngines register themselves to CQLEngineTracker 2202 in Driver 2206 with the RPCEndpoint of CQLEngines.
5. As part of streaming DAG, there will be CQLRDD responsible for CEP Processing. The CQLRDD gets processed by either local CQLEngine or remote CQLEngine by consulting CQLEngineTRacker. The remote CQLEngine is invoked through RPC Starting the CQLEngines The CQLEngine runs as a long-running tasks in the cluster. A CQLEngine gets started by the CQLEngineTracker as a regular Job but it never returns and keeps running except the fault or crash. The CQLEngineTracker launches CQLEngines in the cluster following the algorithm described below:
1. Decide number of CQLEngines to launch
2. Get the list of executors
3. Run Round-robin scheduler to schedule CQLEngine to the list of executors
4. TaskScheduler launches actual long-running tasks
5. The newly launched CQLEngine invokes 'register' RPC call to CQLEngineTracker
6. The long-running tasks returns the control only when the CQLEngine crashes or other faults.

At step #1, the number of CQLEngine in the cluster to launch is decided. The default number of CQLEngine in the cluster is same as the number of executors in the cluster. As the result, one CQLEngine runs from each executor. This maximum number CQLEngine can be configured.

At step #2, the list of executor information (executor host and executor id) is retrieved from the cluster.

At step #3, the round-robin scheduler to assign executors to CQLEngines.

At step #4, launch long-running tasks for each CQLEngine. The TaskScheduler uses the scheduled executor information (executor host and id) to start the CQLEngine in the scheduled executor.

At step #5, the newly launched CQLEngine invokes 'register' RPC call to the CQLEngineTracker. This step initiates the tracking process from CQLEngineTracker shown below.

At step #6, the fault or crash of CQLEngines triggers the recovery process from CQLEngineTracker shown below Tracking CQLEngines In some embodiments, the following tracking information by the CQL Engine Tracker can be maintained for each CQLEngine
　state: CQLEngineState
　scheduleLocation: TaskLocation
　runningExecutor: ExecutorCacheTaskLocation
　name: String
　endpoint: RpcEndpointRef
　errorInfo: CQLEngineErrorInfo The 'state' keeps the state of CQLEngine. It changes from INACTIVE->SCHEDULED->ACTIVE->INACTIVE throughout the lifecycle of CQLEngine. INACTIVE is the initial state before the CQLEngine gets tracked by the CQLEngineTracker. SCHEDULED is the state when the CQLEngine is scheduled to be executed in an executor. ACTIVE is the state when the CQLEngine is actually running from the executor.

The 'scheduledLocation' keeps the scheduled location to execute the CQLEngine.

The 'runningExecutor' keeps the executor location where CQLEngine actually runs.

The 'name' is the name of the CQLEngine as the identifier.

The 'endpoint' is the RPCEndpoint to communicate with.

The 'errorInfo' is the last known error information of CQLEngine.

Recovery of CQLEngines

The long-running tasks returns the control to CQLEngineTracker only when the CQLEngine crashes or other faults. The CQLEngineTracker uses the following CQLEngine Restart Scheduling process in order to re-start the CQLEngine. The Restart Scheduling process gets invoked from two cases: Rejected and Crashed.

Crashed is the case when the running CQLEngine is crashed or the long-running task returned with any faults. Rejected is the case when the scheduled location and the actual location is different (e.g. Failed to start from the scheduled executor and started from different executor by the TaskScheduler). This may happen due to the resources issue from the cluster.

In an embodiment, the CQLEngine Restart Scheduling process may be described as follows:
1. Get the list of candidate executors using the old scheduled executor (minus the ones that are not active) and the new executors in the cluster
2. Choose an executor that are still alive in the list of candidate executors
3. Launch a long running-task that start CQLEngine with the scheduled executor Locality Affinity Algorithm In order to support horizontal scalability, the input datasets are partitioned and get processed with parallelize distributed data processing. A CQLEngine may process multiple partitions using the affinity or association of (queryId, partitionId) to CQLEngine. To optimize transformation with minimal network traffic for sending data between executors, this affinity needs to be created with maximizing locality. In order to maximize the locality, in one embodiment, the CQLEngineTracker uses the following affinity algorithm.
1. All CQLEngines are launched by the CQLEngineTracker from a driver. No association of a CQLEngine to a preferred location is set.
2. The first CQLRDD does not have preferred location information.
3. Spark® Scheduler will try to co-locate to the executor where the parent RDD is located using the parent RDD's preferred location.
4. CQLRDD invokes 'getCQLEngine' RPC to CQLEngineTracker.
5. The first computation of a partition of CQLRDD associates the (partitionId, queryId) to the CQLEngine to the same executor of CQLRDD.
6. The preferred location mapping of (partitionId, queryId) to CQLEngine is maintained in the CQLEngineTracker.
7. The CQLEngine from the association returns to CQLRDD and the RDD gets processed by the CQLEngine.
8. The next CQLRDD will set the preferred location information from the association information set from step 5.
9. Spark® Scheduler will try to run CQLRDD to the preferred location it is set to.
10. CQLRDD invokes 'getCQLEngine' RPC to CQLEngineTracker and the (partitionId,queryId) should be already the same executor.

Figure 23:
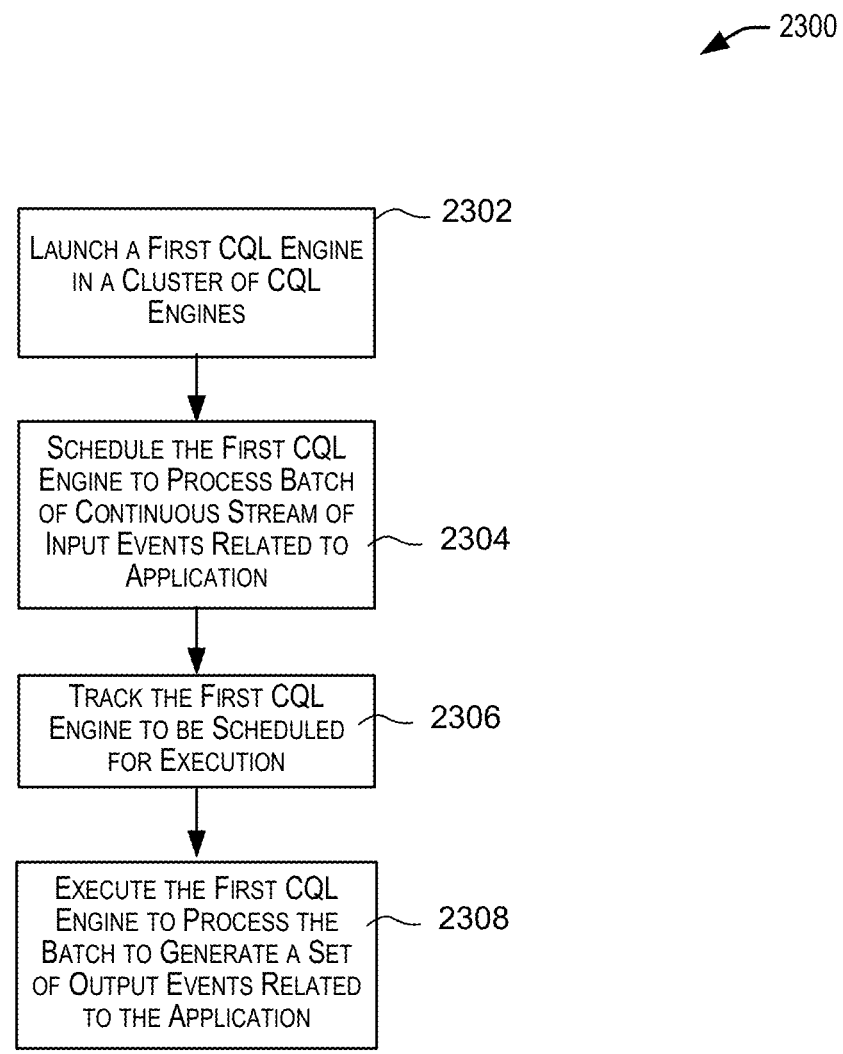
FIG. 23 is an example flow diagram of a process describing a set of operations for scheduling and managing multiple CEP engines, in accordance with an embodiment of the present disclosure.

FIG. 23 is an example flow diagram of a process 2300 that describes a set of operations for scheduling and managing multiple CEP engines within a micro-batch based event processing system, in accordance with an embodiment of the present disclosure. In an embodiment, the process 2300 describes additional details of the operations described in FIG. 22. In certain examples, the process 2300 begins at 2302 by launching a first CQL engine in a cluster of CQL engines. The first CQL engine, and additional CQL engines, can be launched using a CQL engine tracking engine. At 2304, the CQL engine tracking engine can also schedule the first CQL engine to process a batch of a continuous stream of input events related to an application. At 2306, the CQL engine tracking engine can also track the first CQL engine to be scheduled for execution. At 2308, the CQL engine tracking engine can also execute the first CQL engine to process the batch of the continuous stream of input events to generate a set of output events related to the application.

Automatic Data Partitioning and Parallelism Using Group by and Object ID Fields

In recent years, data stream management systems (DSMs) have been developed that can execute queries in a continuous manner over potentially unbounded, real-time data streams. For example, a typical DSMS can receive one or more data streams, register a query against the data streams, and continuously execute the query as new data appears in the streams. Since this type of continuous query is long-running, the DSMS can provide a continuous stream of updated results to a client.

Typical applications in DSMS are designed as a "topology" in the shape of a Directly Acyclic Graph (DAG) of operations or transformations. The topology acts as a data transformation pipeline.

Most stream processing systems including Apache Storm, Spark Streaming, and Flink provide an Application programing Interface (API) for an application developer to build the topology using different programming languages such as Java, Scala, or Clojure.

APIs are good for programmers to build stream processing applications, but it is relatively complex for a code generation system such as Stream Analytics which generates a stream processing application for users, due to the complexity of the code generation layer.

Figure 24:
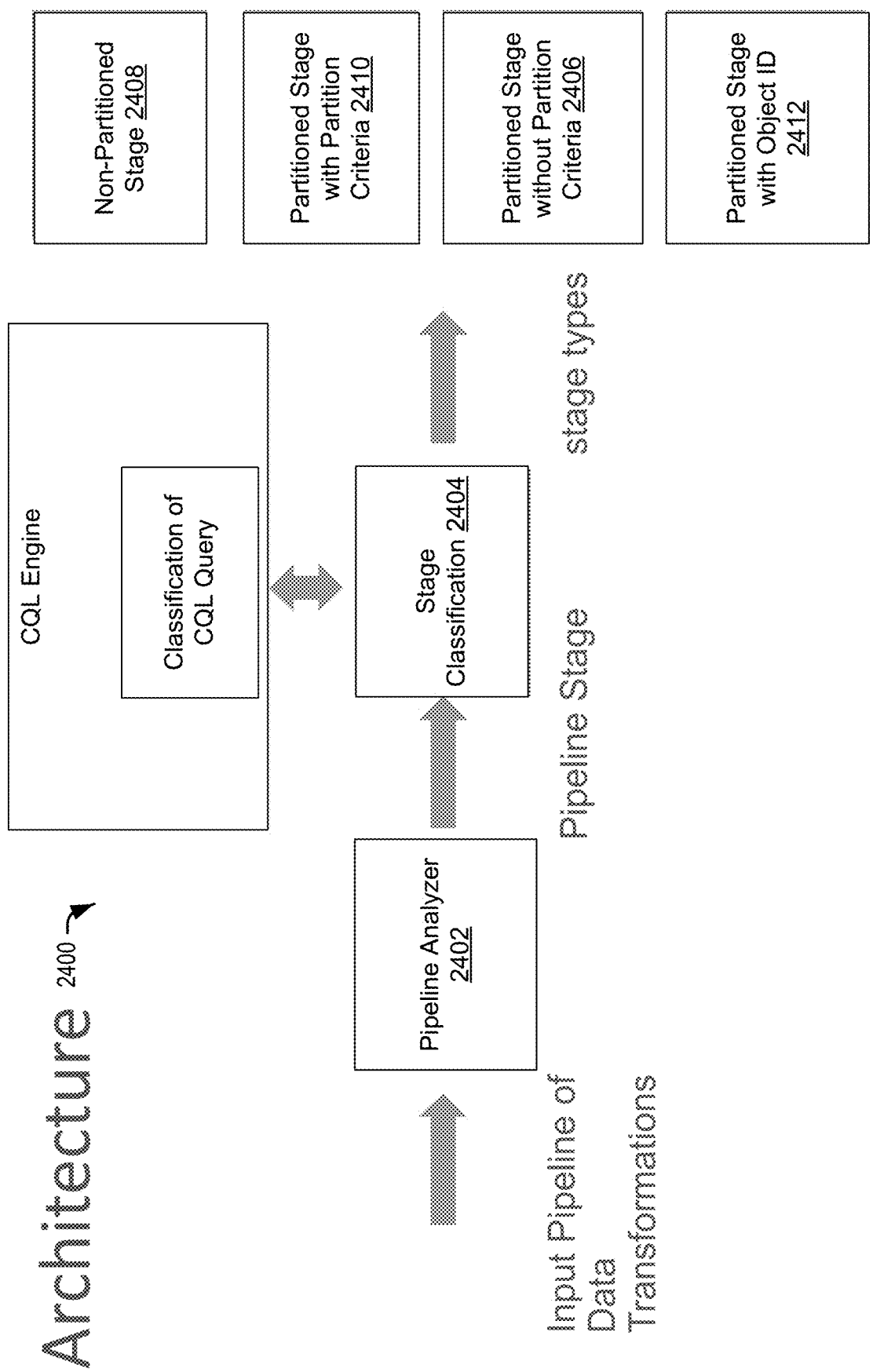
FIG. 24 is a simplified block diagram illustrating the components of a distributed event processing system configured for data partitioning and parallelism, in accordance with an embodiment of the present disclosure.

FIG. 24 is an example architecture 2400 in which an input pipeline of data transformations can be input into a pipeline analyzer 2402 and classified by a stage classification module 2404. In some examples, the code generation layer of Stream Analytics is responsible for determining the parallelism in the data transformation pipeline automatically by analyzing the pipeline stages. A data transformation pipeline is composed of various stages where each stage performs a specific transformation according to the stage definition. An aggregator stage computes the real time aggregates on the incoming stream data. A data transformation pipeline processing can be optimized if the stages of the pipeline can be processed on a cluster of nodes.

To compute a stage on a cluster of nodes, it is desirable to automatically determine the parallelism characteristics of stage operation and then create the DAG of transformations where computation of transformations can be completed on a set of cluster nodes by maximizing parallelism.

In one embodiment, a Data Stream Management System (DSMS) is built which analyzes the data transformation pipeline designed by the user, derives the partitioning criteria for various stages, and generates an optimized DAG of transformation where every stage can run on a set of cluster nodes.

In certain embodiments, the following stages can be included in the pipeline designed by the Stream Analytics platform.
1) Query
2) Business Rules
3) Spatial
4) Pattern The pipeline can be composed of one or more stages of the above types.

An example of a sample pipeline is shown below:

Input->Query->Query->Spatial->Output

In some examples, the user creates the pipeline to achieve desired business logic. While designing the pipeline, the user may select every stage for the pipeline and configure the stage attributes for the pipeline. In some examples, the configuration attribute of a stage becomes the stage metadata.

The disclosed technique determines automatic data partitioning of a stage if the stage type is Query. To transform the user created pipeline into a DAG of native runtime transformations, the Stream analytics platform may perform the following steps:

1) Traverse the pipeline from source to sink.
2) For each stage
   i) Determine the stage type
   ii) If the stage type is 'Query', then the platform marks whether the transformation for this stage can be computed in a distributed manner
      a) Determine the CQL query associated with the Query Stage.
      b) Parse the CQL Query into tokens.
      c) Perform the semantic analysis of the CQL Query of the parsed query.
      d) Determine the Query Classification using various rules
   These rules classify a continuous query into the following categories:
   Stateless, SemiStateful, Fully Stateful
   e) If the query is stateless, mark the stage to be partitioned without any partitioning attribute (criteria) 2406. In this way, the stage will depend on the partitioning criteria of the parent stage.
   f) If the query is stateful, mark the stage to be non-partitioned 2408. In this way, the stage can be executed only on a single cluster of nodes.
   g) If the query is semi-stateful, mark the stage to be partitioned with a partitioning attribute 2410. The partitioning attribute will be obtained from the result of step 2.ii.d. In this way, stage computation can be partitioned on the automatically determined partitioning attribute.
3) For each stage, generate the transformation in the DAG of data transformation pipeline.
   i) If the stage is marked as partitioned without any partitioning attribute 2406, then generate the transformation for this stage in DAG without any repartitioning transformation. Number of partitions of the stage will be determined by number of partitions from the previous stage.
   ii) If the stage is marked as partitioned with a partitioning attribute 2410, then generate the transformation for this stage in DAG with re-partitioning transformation. Input to the re-partitioning transformation will be the partitioning attribute and number of partitions. Re-partitioning transformation will re-partition the incoming stream of events with new partitioning criteria.
   iii) If the stage is marked as non-partitioned 2408, then generate the transformation for the stage in DAG with a repartitioning transformation followed by stage transformation. Input to the repartitioning transformation will be partitioning attribute and number of partitions which will be 1. Re-partitioning transformation will re-partition the already partitioned/non-partitioned stream into single partition.

In certain pipelines, if the system doesn't have enough metadata or if partitioning can't be determined from the query analysis, then the system marks the object id as the partitioning attribute 2412.

If the stage type is spatial and DSMS is processing a stream of geo-location events of moving objects where each object has a unique identity, the Stream Analytics platform marks the object id as the partitioning attribute for the stage and generates the transformations for this stage in DAG with a partitioning transformation followed by a stage transformation.

Embodiments of the disclosed technique provide the following features:
- To perform metadata scan of a pipeline stage and classify the stage on the basis of CQL query classification.
- To automatically determine a partitioning attribute by performing semantic analysis of a query based on continuous query language.
- To generate a DAG of transformations by using the partitioning.

Prior techniques involved the use of a pipeline data transformation system for a user to explicitly define the parallelism characteristics of the pipeline stages. If not specified, the system could process the pipeline stages without fully utilizing the computing resources.

The disclosed technique automatically determines data partitioning criteria by analyzing the stages of a pipelined stream processing system. This significantly reduces the complexity of designing a data processing pipeline for the Stream Analytics Platform.

Figure 25:
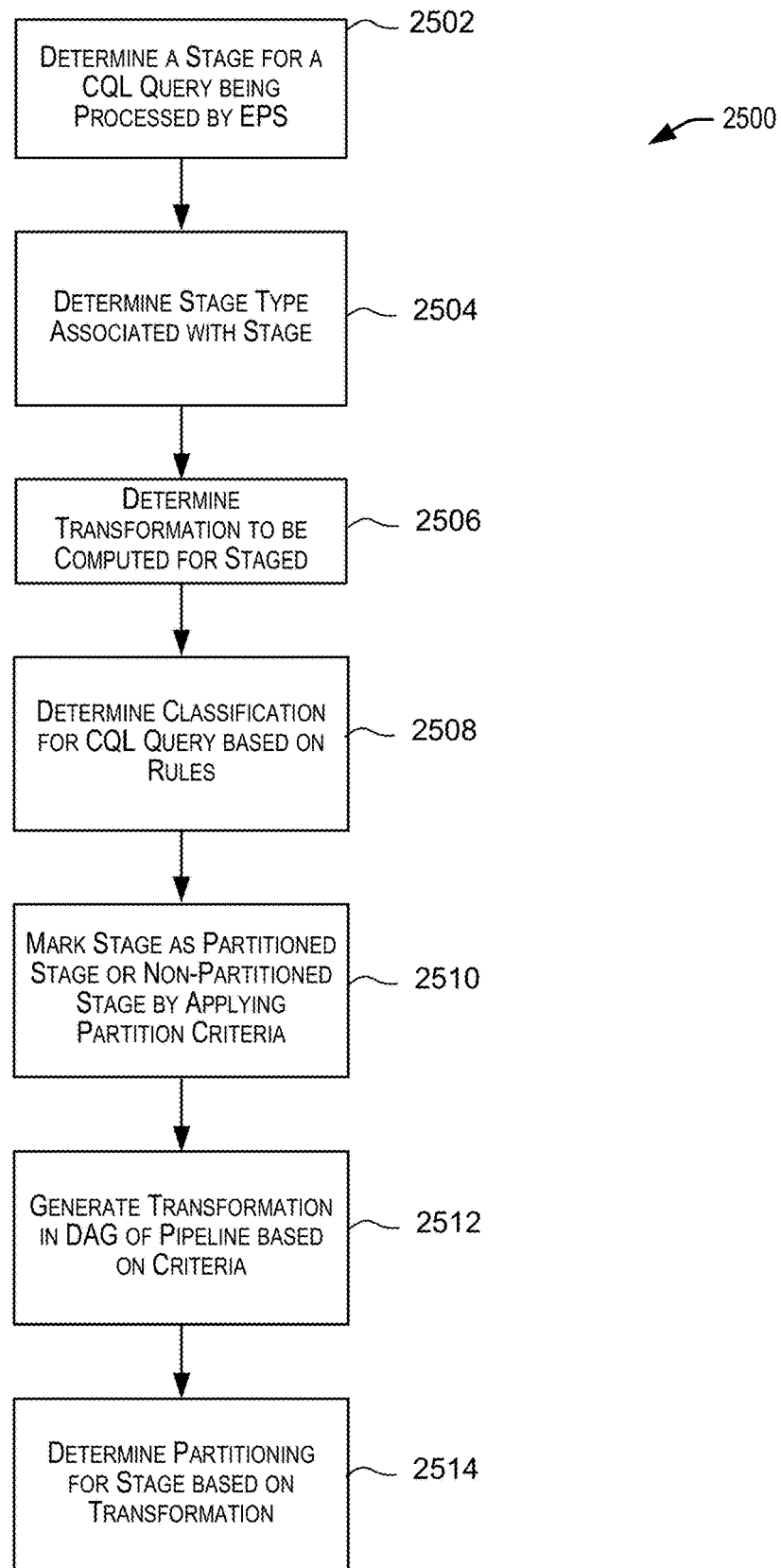
FIG. 25 is an example flow diagram of a process describing a set of operations for automatically partitioning and parallelizing data using query clauses and object IDs, in accordance with an embodiment of the present disclosure.

FIG. 25 is an example flow diagram of a process 2500 that describes a set of operations for data partitioning and parallelism in a distributed event processing system. In an embodiment, the process 2500 describes additional details of the operations described in FIG. 24. In certain examples, the process 2500 begins at 2502 by determining a stage for a continuous query language (CQL) query being processed by an event processing system. At 2504, the system may be configured to determine a stage type associated with the stage. In some examples, the process 2500 may continue at 2506 by determining a transformation to be computed for the stage based at least in part on the stage type. The process 2500 may also determine a classification for the CQL query based at least in part on a plurality of rules at 2508. In some examples, the process 2500 may include marking the stage as a partitioned stage or a non-partitioned stage by applying partitioning criteria to the stage at 2510. Additionally, in some examples, the process 2500 may generate a transformation in a Directly Acyclic Graph (DAG) of a data transformation pipeline for the stage based at least in part on the partitioning criteria for the stage at 2512. At 2514, the process 2500 may determine a partitioning of the stage based at least in part on the transformation. The process 2500 may also process the CQL query based at least in part on the determined partitioning.

Illustrative Systems

Figure 26:
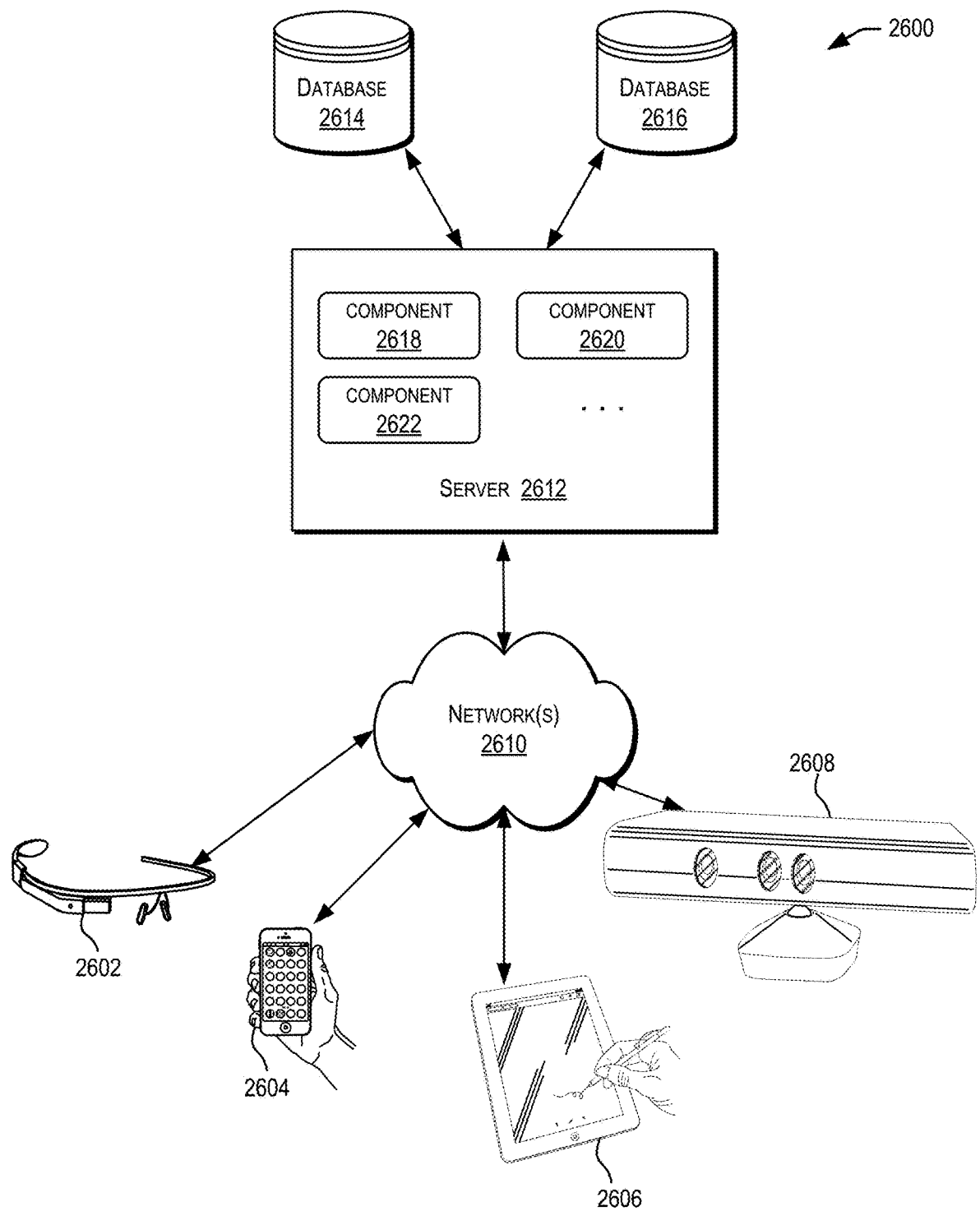
FIG. 26 depicts a simplified diagram of a distributed system for implementing an embodiment of the present disclosure.

FIGS. 26-12 illustrate aspects of example environments for implementing aspects of the present disclosure in accordance with various embodiments. FIG. 26 depicts a simplified diagram of a distributed system 2600 for implementing an embodiment of the present disclosure. In the illustrated embodiment, the distributed system 2600 includes one or more client computing devices 2602, 2604, 2606, and 2608, which are configured to execute and operate a client application such as a web browser, proprietary client (e.g., Oracle Forms), or the like over one or more network(s) 2610. The server 2612 may be communicatively coupled with the remote client computing devices 2602, 2604, 2606, and 2608 via network 2610.

In various embodiments, the server 2612 may be adapted to run one or more services or software applications such as services and applications that provide event processing services. In certain embodiments, the server 2612 may also provide other services or software applications can include non-virtual and virtual environments. In some embodiments, these services may be offered as web-based or cloud services or under a Software as a Service (SaaS) model to the users of the client computing devices 2602, 2604, 2606, and/or 2608. Users operating the client computing devices 2602, 2604, 2606, and/or 2608 may in turn utilize one or more client applications to interact with the server 2612 to utilize the services provided by these components.

In the configuration depicted in FIG. 26, the software components 2618, 2620 and 2622 of system 2600 are shown as being implemented on the server 2612. In other embodiments, one or more of the components of the system 2600 and/or the services provided by these components may also be implemented by one or more of the client computing devices 2602, 2604, 2606, and/or 2608. Users operating the client computing devices may then utilize one or more client applications to use the services provided by these components. These components may be implemented in hardware, firmware, software, or combinations thereof. It should be appreciated that various different system configurations are possible, which may be different from distributed system 2600. The embodiment shown in FIG. 26 is thus one example of a distributed system for implementing an embodiment system and is not intended to be limiting.

The client computing devices 2602, 2604, 2606, and/or 2608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 26, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 2610.

Although distributed system 2600 in FIG. 26 is shown with four client computing devices, any number of client computing devices may be supported. Other devices, such as devices with sensors, etc., may interact with the server 2612.

The network(s) 2610 in the distributed system 2600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 2610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 2602.11 suite of protocols, Bluetooth®, and/or any other wireless protocol), and/or any combination of these and/or other networks.

The server 2612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 2612 can include one or more virtual machines running virtual operating systems, or other computing architectures involving virtualization. One or more flexible pools of logical storage devices can be virtualized to maintain virtual storage devices for the server. Virtual networks can be controlled by the server 2612 using software defined networking. In various embodiments, the server 2612 may be adapted to run one or more services or software applications described in the foregoing disclosure. For example, the server 2612 may correspond to a server for performing processing as described above according to an embodiment of the present disclosure.

The server 2612 may run an operating system including any of those discussed above, as well as any commercially available server operating system. Server 2612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 2612 may include one or more applications to analyze and consolidate data feeds and/or event updates received from users of the client computing devices 2602, 2604, 2606, and 2608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 2612 may also include one or more applications to display the data feeds and/or real-time events via one or more display devices of the client computing devices 2602, 2604, 2606, and 2608.

The distributed system 2600 may also include one or more databases 2614 and 2616. These databases may provide a mechanism for storing information such as event information, and other information used by embodiments of the present disclosure. Databases 2614 and 2616 may reside in a variety of locations. By way of example, one or more of databases 2614 and 2616 may reside on a non-transitory storage medium local to (and/or resident in) the server 2612. Alternatively, the databases 2614 and 2616 may be remote from the server 2612 and in communication with the server 2612 via a network-based or dedicated connection. In one set of embodiments, the databases 2614 and 2616 may reside in a storage-area network (SAN). Similarly, any necessary files for performing the functions attributed to the server 2612 may be stored locally on the server 2612 and/or remotely, as appropriate. In one set of embodiments, the databases 2614 and 2616 may include relational databases, such as databases provided by Oracle, that are adapted to store, update, and retrieve data in response to SQL-formatted commands.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, Calif., may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services typically facilitate the management and control of the underlying computing resources, such as storage, networks, and other fundamental computing resources for customers utilizing services provided by the SaaS platform and the PaaS platform.

Figure 27:
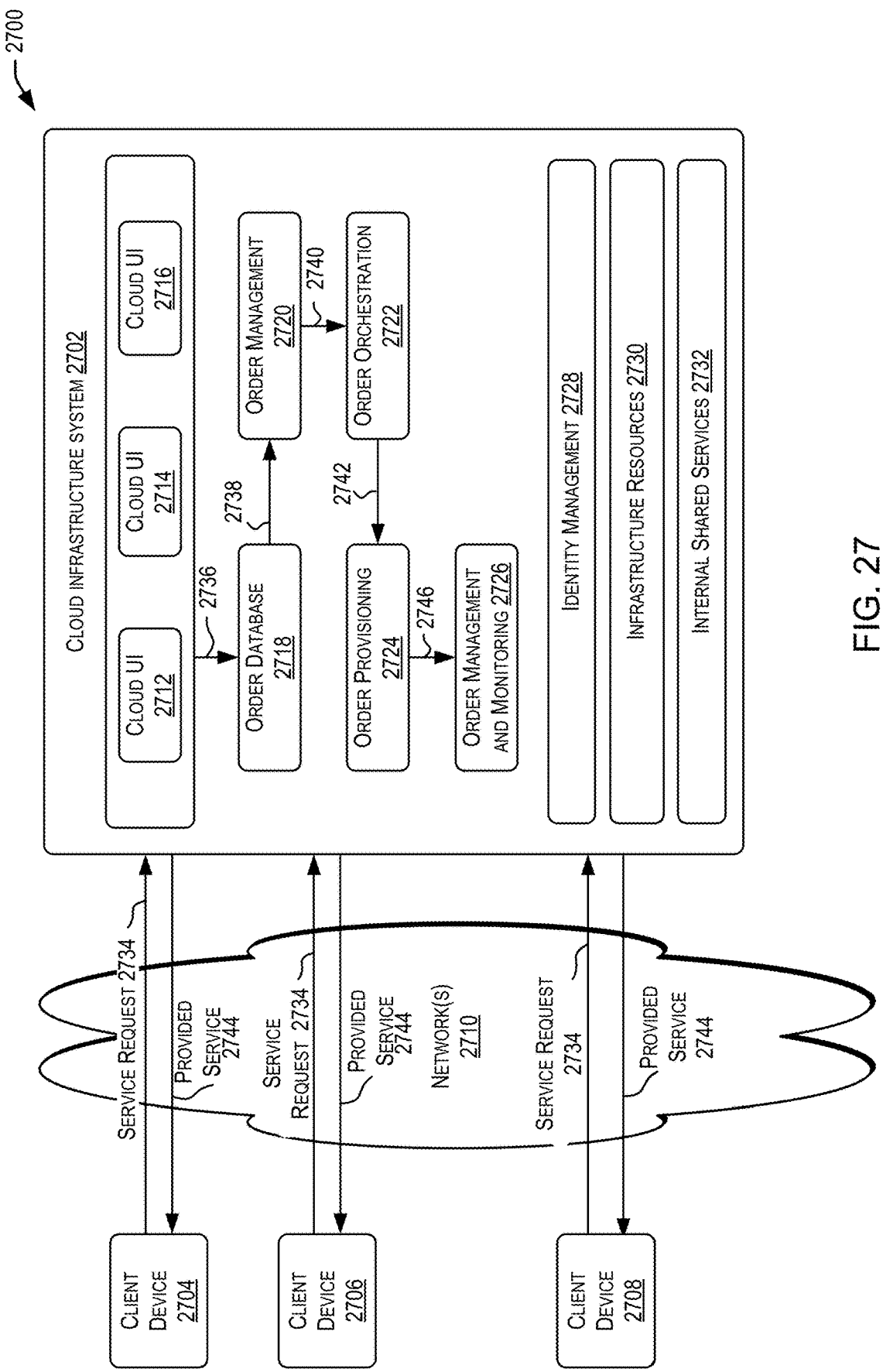
FIG. 27 is a simplified block diagram of one or more components of a system environment by which services provided by one or more components of an embodiment system may be offered as cloud services, in accordance with an embodiment of the present disclosure.

FIG. 27 is a simplified block diagram of one or more components of a system environment 2700 by which services provided by one or more components of an embodiment system may be offered as cloud services, in accordance with an embodiment of the present disclosure. In the illustrated embodiment, system environment 2700 includes one or more client computing devices 2704, 2706, and 2708 that may be used by users to interact with a cloud infrastructure system 2702 that provides cloud services. The client computing devices may be configured to operate a client application such as a web browser, a proprietary client application (e.g., Oracle Forms), or some other application, which may be used by a user of the client computing device to interact with cloud infrastructure system 2702 to use services provided by cloud infrastructure system 2702.

It should be appreciated that cloud infrastructure system 2702 depicted in the figure may have other components than those depicted. Further, the embodiment shown in the figure is only one example of a cloud infrastructure system that may incorporate an embodiment of the disclosure. In some other embodiments, cloud infrastructure system 2702 may have more or fewer components than shown in the figure, may combine two or more components, or may have a different configuration or arrangement of components.

Client computing devices 2704, 2706, and 2708 may be devices similar to those described above for 502, 504, 506, and 508.

Although example system environment 2700 is shown with three client computing devices, any number of client computing devices may be supported. Other devices such as devices with sensors, etc. may interact with cloud infrastructure system 2702.

Network(s) 2710 may facilitate communications and exchange of data between clients 2704, 2706, and 2708 and cloud infrastructure system 2702. Each network may be any type of network familiar to those skilled in the art that can support data communications using any of a variety of commercially-available protocols, including those described above for network(s) 2710.

Cloud infrastructure system 2702 may comprise one or more computers and/or servers that may include those described above for server 2712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2702 may be adapted to automatically provision, manage and track a customer's subscription to services offered by cloud infrastructure system 2702. Cloud infrastructure system 2702 may provide the cloud services via different deployment models. For example, services may be provided under a public cloud model in which cloud infrastructure system 2702 is owned by an organization selling cloud services (e.g., owned by Oracle) and the services are made available to the general public or different industry enterprises. As another example, services may be provided under a private cloud model in which cloud infrastructure system 2702 is operated solely for a single organization and may provide services for one or more entities within the organization. The cloud services may also be provided under a community cloud model in which cloud infrastructure system 2702 and the services provided by cloud infrastructure system 2702 are shared by several organizations in a related community. The cloud services may also be provided under a hybrid cloud model, which is a combination of two or more different models.

In some embodiments, the services provided by cloud infrastructure system 2702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2702. Cloud infrastructure system 2702 then performs processing to provide the services in the customer's subscription order.

In some embodiments, the services provided by cloud infrastructure system 2702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2702 may also include infrastructure resources 2730 for providing the resources used to provide various services to customers of the cloud infrastructure system. In one embodiment, infrastructure resources 2730 may include pre-integrated and optimized combinations of hardware, such as servers, storage, and networking resources to execute the services provided by the PaaS platform and the SaaS platform.

In some embodiments, resources in cloud infrastructure system 2702 may be shared by multiple users and dynamically re-allocated per demand. Additionally, resources may be allocated to users in different time zones. For example, cloud infrastructure system 2730 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2732 may be provided that are shared by different components or modules of cloud infrastructure system 2702 and by the services provided by cloud infrastructure system 2702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2702, and the like.

In one embodiment, as depicted in the figure, cloud management functionality may be provided by one or more modules, such as an order management module 2720, an order orchestration module 2722, an order provisioning module 2724, an order management and monitoring module 2726, and an identity management module 2728. These modules may include or be provided using one or more computers and/or servers, which may be general purpose computers, specialized server computers, server farms, server clusters, or any other appropriate arrangement and/or combination.

In example operation 2734, a customer using a client device, such as client device 2704, 2706 or 2708, may interact with cloud infrastructure system 2702 by requesting one or more services provided by cloud infrastructure system 2702 and placing an order for a subscription for one or more services offered by cloud infrastructure system 2702. In certain embodiments, the customer may access a cloud User Interface (UI), cloud UI 2712, cloud UI 2714 and/or cloud UI 2716 and place a subscription order via these UIs. The order information received by cloud infrastructure system 2702 in response to the customer placing an order may include information identifying the customer and one or more services offered by the cloud infrastructure system 2702 that the customer intends to subscribe to.

After an order has been placed by the customer, the order information is received via the cloud UIs, 2712, 2714 and/or 2716.

At operation 2736, the order is stored in order database 2718. Order database 2718 can be one of several databases operated by cloud infrastructure system 2718 and operated in conjunction with other system elements.

At operation 2738, the order information is forwarded to an order management module 2720. In some instances, order management module 2720 may be configured to perform billing and accounting functions related to the order, such as verifying the order, and upon verification, booking the order.

At operation 2740, information regarding the order is communicated to an order orchestration module 2722. Order orchestration module 2722 may utilize the order information to orchestrate the provisioning of services and resources for the order placed by the customer. In some instances, order orchestration module 2722 may orchestrate the provisioning of resources to support the subscribed services using the services of order provisioning module 2724.

In certain embodiments, order orchestration module 2722 enables the management of business processes associated with each order and applies business logic to determine whether an order should proceed to provisioning. At operation 2742, upon receiving an order for a new subscription, order orchestration module 2722 sends a request to order provisioning module 2724 to allocate resources and configure those resources needed to fulfill the subscription order. Order provisioning module 2724 enables the allocation of resources for the services ordered by the customer. Order provisioning module 2724 provides a level of abstraction between the cloud services provided by cloud infrastructure system 2700 and the physical implementation layer that is used to provision the resources for providing the requested services. Order orchestration module 2722 may thus be isolated from implementation details, such as whether or not services and resources are actually provisioned on the fly or pre-provisioned and only allocated/assigned upon request.

At operation 2744, once the services and resources are provisioned, a notification of the provided service may be sent to customers on client devices 2704, 2706 and/or 2708 by order provisioning module 2724 of cloud infrastructure system 2702. At operation 2746, the customer's subscription order may be managed and tracked by an order management and monitoring module 2726. In some instances, order management and monitoring module 2726 may be configured to collect usage statistics for the services in the subscription order, such as the amount of storage used, the amount data transferred, the number of users, and the amount of system up time and system down time.

In certain embodiments, cloud infrastructure system 2700 may include an identity management module 2728. Identity management module 2728 may be configured to provide identity services, such as access management and authorization services in cloud infrastructure system 2700. In some embodiments, identity management module 2728 may control information about customers who wish to utilize the services provided by cloud infrastructure system 2702. Such information can include information that authenticates the identities of such customers and information that describes which actions those customers are authorized to perform relative to various system resources (e.g., files, directories, applications, communication ports, memory segments, etc.). Identity management module 2728 may also include the management of descriptive information about each customer and about how and by whom that descriptive information can be accessed and modified.

Figure 28:
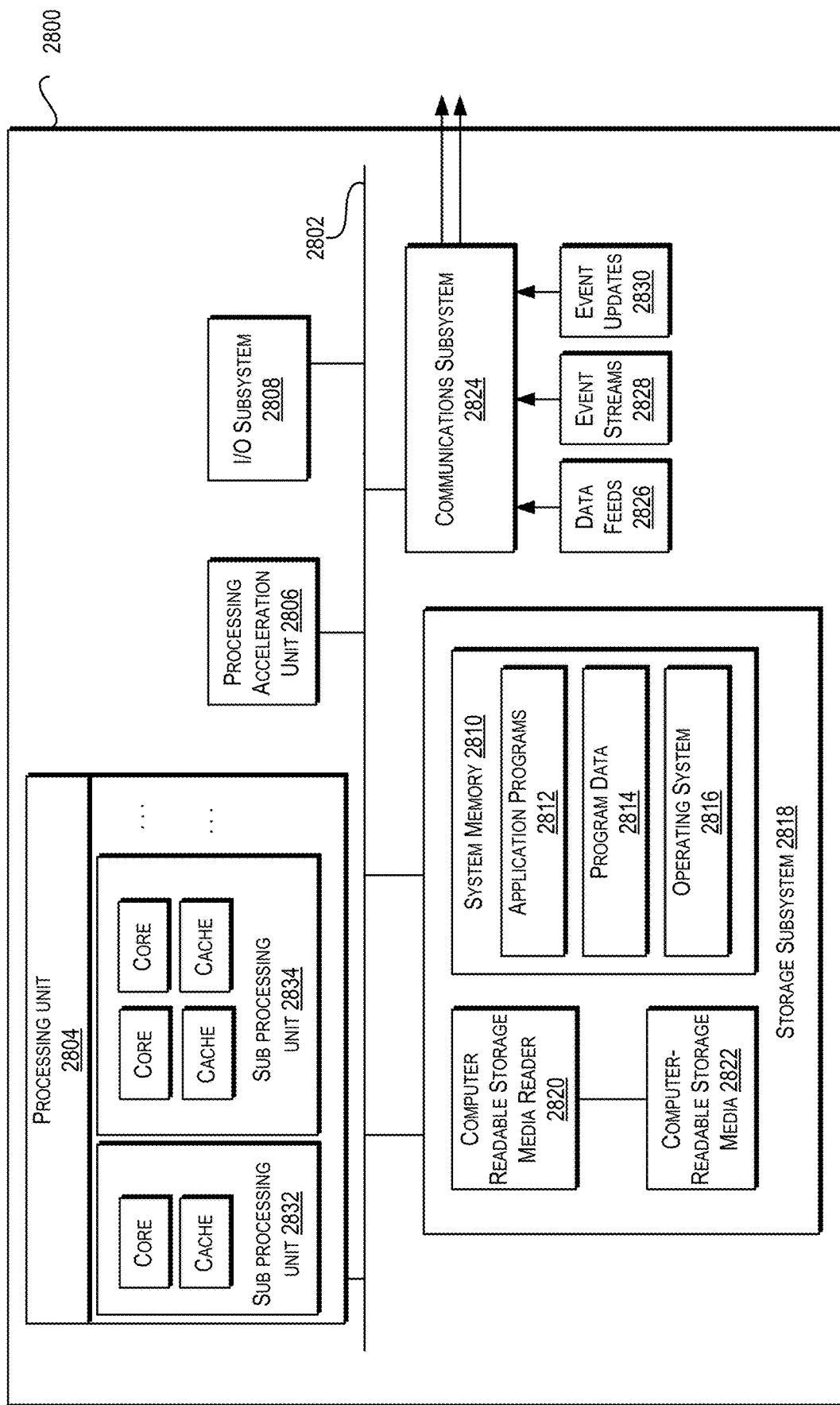
FIG. 28 illustrates an example computer system that may be used to implement an embodiment of the present disclosure.

FIG. 28 illustrates an example computer system 2800 that may be used to implement an embodiment of the present disclosure. In some embodiments, computer system 2800 may be used to implement any of the various servers and computer systems described above. As shown in FIG. 28, computer system 2800 includes various subsystems including a processing subsystem 2804 that communicates with a number of peripheral subsystems via a bus subsystem 2802. These peripheral subsystems may include a processing acceleration unit 2806, an I/O subsystem 2808, a storage subsystem 2818 and a communications subsystem 2824. Storage subsystem 2818 may include tangible computer-readable storage media 2822 and a system memory 2810.

Bus subsystem 2802 provides a mechanism for letting the various components and subsystems of computer system 2800 communicate with each other as intended. Although bus subsystem 2802 is shown schematically as a single bus, alternative embodiments of the bus subsystem may utilize multiple buses. Bus subsystem 2802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 2804 controls the operation of computer system 2800 and may comprise one or more processing units 2832, 2834, etc. A processing unit may include be one or more processors, including single core or multicore processors, one or more cores of processors, or combinations thereof. In some embodiments, processing subsystem 2804 can include one or more special purpose co-processors such as graphics processors, digital signal processors (DSPs), or the like. In some embodiments, some or all of the processing units of processing subsystem 2804 can be implemented using customized circuits, such as application specific integrated circuits (ASICs), or field programmable gate arrays (FPGAs).

In some embodiments, the processing units in processing subsystem 2804 can execute instructions stored in system memory 2810 or on computer readable storage media 2822. In various embodiments, the processing units can execute a variety of programs or code instructions and can maintain multiple concurrently executing programs or processes. At any given time, some or all of the program code to be executed can be resident in system memory 2810 and/or on computer-readable storage media 2810 including potentially on one or more storage devices. Through suitable programming, processing subsystem 2804 can provide various functionalities described above for dynamically modifying documents (e.g., webpages) responsive to usage patterns.

In certain embodiments, a processing acceleration unit 2806 may be provided for performing customized processing or for off-loading some of the processing performed by processing subsystem 2804 so as to accelerate the overall processing performed by computer system 2800.

I/O subsystem 2808 may include devices and mechanisms for inputting information to computer system 2800 and/or for outputting information from or via computer system 2800. In general, use of the term "input device" is intended to include all possible types of devices and mechanisms for inputting information to computer system 2800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2818 provides a repository or data store for storing information that is used by computer system 2800. Storage subsystem 2818 provides a tangible non-transitory computer-readable storage medium for storing the basic programming and data constructs that provide the functionality of some embodiments. Software (programs, code modules, instructions) that when executed by processing subsystem 2804 provide the functionality described above may be stored in storage subsystem 2818. The software may be executed by one or more processing units of processing subsystem 2804. Storage subsystem 2818 may also provide a repository for storing data used in accordance with the present disclosure.

Storage subsystem 2818 may include one or more non-transitory memory devices, including volatile and non-volatile memory devices. As shown in FIG. 28, storage subsystem 2818 includes a system memory 2810 and a computer-readable storage media 2822. System memory 2810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2800, such as during start-up, may typically be stored in the ROM. The RAM typically contains data and/or program modules that are presently being operated and executed by processing subsystem 2804. In some implementations, system memory 2810 may include multiple different types of memory, such as static random access memory (SRAM) or dynamic random access memory (DRAM).

By way of example, and not limitation, as depicted in FIG. 28, system memory 2810 may store application programs 2812, which may include client applications, Web browsers, mid-tier applications, relational database management systems (RDBMS), etc., program data 2814, and an operating system 2816. By way of example, operating system 2816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 26 OS, and Palm® OS operating systems.

Computer-readable storage media 2822 may store programming and data constructs that provide the functionality of some embodiments. Software (programs, code modules, instructions) that when executed by processing subsystem 2804 a processor provide the functionality described above may be stored in storage subsystem 2818. By way of example, computer-readable storage media 2822 may include non-volatile memory such as a hard disk drive, a magnetic disk drive, an optical disk drive such as a CD ROM, DVD, a Blu-Ray® disk, or other optical media. Computer-readable storage media 2822 may include, but is not limited to, Zip® drives, flash memory cards, universal serial bus (USB) flash drives, secure digital (SD) cards, DVD disks, digital video tape, and the like. Computer-readable storage media 2822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 2822 may provide storage of computer-readable instructions, data structures, program modules, and other data for computer system 2800.

In certain embodiments, storage subsystem 2800 may also include a computer-readable storage media reader 2820 that can further be connected to computer-readable storage media 2822. Together and, optionally, in combination with system memory 2810, computer-readable storage media 2822 may comprehensively represent remote, local, fixed, and/or removable storage devices plus storage media for storing computer-readable information.

In certain embodiments, computer system 2800 may provide support for executing one or more virtual machines. Computer system 2800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 2800. Accordingly, multiple operating systems may potentially be run concurrently by computer system 2800. Each virtual machine generally runs independently of the other virtual machines.

Communications subsystem 2824 provides an interface to other computer systems and networks. Communications subsystem 2824 serves as an interface for receiving data from and transmitting data to other systems from computer system 2800. For example, communications subsystem 2824 may enable computer system 2800 to establish a communication channel to one or more client devices via the Internet for receiving and sending information from and to the client devices. Additionally, communication subsystem 2824 may be used to communicate notifications of successful logins or notifications to re-enter a password from the privileged account manager to the requesting users.

Communication subsystem 2824 may support both wired and/or wireless communication protocols. For example, in certain embodiments, communications subsystem 2824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2824 can provide wired network connectivity (e.g., Ethernet) in addition to or instead of a wireless interface.

Communication subsystem 2824 can receive and transmit data in various forms. For example, in some embodiments, communications subsystem 2824 may receive input communication in the form of structured and/or unstructured data feeds 2826, event streams 28217, event updates 2830, and the like. For example, communications subsystem 2824 may be configured to receive (or send) data feeds 2826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 2824 may be configured to receive data in the form of continuous data streams, which may include event streams 2828 of real-time events and/or event updates 2830, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 2824 may also be configured to output the structured and/or unstructured data feeds 2826, event streams 2828, event updates 2830, and the like to one or more databases that may be in communication with one or more streaming data source computers coupled to computer system 2800.

Computer system 2800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 2800 depicted in FIG. 28 is intended only as a specific example. Many other configurations having more or fewer components than the system depicted in FIG. 28 are possible. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method for processing a continuous data stream of events using a distributed event processing system, the method comprising:

receiving, at a computing device of a plurality of computing devices in the distributed event processing system, a batch of events from an event stream;

identifying, by the computing device, a first data type of a first attribute of an event in the batch of events;

computing, by the computing device, a number of bits to store data values represented by the first attribute and a set of unique values represented by the first attribute;

performing, by the computing device, a first type of data compression on the data values represented by the first attribute for the event based at least in part on the first data type of the first attribute, the number of bits to store the data values represented by the first attribute and the set of unique values represented by the first attribute;

based at least in part on performing the first type of data compression, generating, by the computing device, a first set of serialized data values for the first attribute;

generating, by the computing device, a first set of de-serialized data values corresponding to the first attribute based at least in part on the first set of serialized data values;

executing, by the computing device, a plurality of continuous queries against the first set of de-serialized data values corresponding to the first attribute to generate a plurality of output event streams; and transmitting, by the computing device, the plurality of output event streams to a user device.

2. The method of claim 1, wherein generating, by the computing device, the first set of de-serialized data values corresponding to the first attribute further comprises:

identifying, by the computing device, the first type of data compression performed on the data values represented by the first attribute; and de-serializing, by the computing device, the first set of serialized data values represented by the first attribute in accordance with the first type of data compression.

3. The method of claim 1, further comprising:

identifying, by the computing device, a second data type of a second attribute of the event in the batch of events, the second data type being different from the first data type;

performing, by the computing device, a second type of data compression on the data values represented by the second attribute, the second type of data compression being different from the first type of data compression;

based at least in part on the performing, generating, by the computing device, a second set of serialized data values represented by the second attribute; and storing, by the computing device, the second set of serialized data values represented by the second attribute.

4. The method of claim 3, wherein the second type of data compression is determined based at least in part on the second data type of the second attribute.

5. The method of claim 3, further comprising:

generating, by the computing device, a second set of de-serialized data values corresponding to the second attribute based on the second set of serialized data values; and executing, by the computing device, the plurality of continuous queries against the second set of de-serialized data values corresponding to the second attribute to generate the plurality of output event streams.

6. The method of claim 3, wherein the first type of data compression or the second type of data compression comprises at least one of a base compression technique, a value index compression technique, or a precision reduction and value index compression technique.

7. The method of claim 1, further comprising:

identifying, by the computing device, a set of one or more operations to be performed on the event in the batch of events based on the plurality of continuous queries;

representing, by the computing device, the set of one or more operations as a continuous query language (CQL) Resilient Distributed Dataset (RDD) Directed Acyclic Graph (DAG) of transformations; and executing, by the computing device, the COL RDD transformations against the first set of de-serialized data values corresponding to the first attribute to generate the plurality of output event streams.

8. The method of claim 1, wherein the first data type of the first attribute is a numeric data type and the second data type of the second attribute is a non-numeric data type.

9. A computer-readable medium storing computer-executable instructions that, when executed by one or more processors, configures one or more computer systems to perform at least:

instructions that cause the one or more processors to receive, at a computing device of a plurality of computing devices in a distributed event processing system, a batch of events from an event stream;

instructions that cause the one or more processors to identify a first data type of a first attribute of an event in the batch of events;

instructions that cause the one or more processors to compute a number of bits to store data values represented by the first attribute and a set of unique values represented by the first attribute;

instructions that cause the one or more processors to perform a first type of data compression on the data values represented by the first attribute for the event based at least in part on the first data type of the first attribute, the number of bits to store the data values represented by the first attribute and the set of unique values represented by the first attribute;

instructions that cause the one or more processors to generate a first set of serialized data values for the first attribute based at least in part on the instructions to perform the first type of data compression;

instructions that cause the one or more processors to generate a first set of de-serialized data values corresponding to the first attribute based at least in part on the first set of serialized data values;

instructions that cause the one or more processors to execute the plurality of continuous queries against the first set of de-serialized data values corresponding to the first attribute to generate a plurality of output event streams; and instructions that cause the one or more processors to transmit the plurality of output event streams to a user device.

10. The computer-readable medium of claim 9, wherein the instructions that cause the one or more processors to generate the first set of de-serialized data values corresponding to the first attribute further comprises:

instructions that cause the one or more processors to identify the first type of data compression performed on the data values represented by the first attribute; and instructions that cause the one or more processors to de-serialize the first set of serialized data values represented by the first attribute in accordance with the first type of data compression.

11. The computer-readable medium of claim 9, further comprising:
instructions that cause the one or more processors to identify a second data type of a second attribute of the event, the second data type being different from the first data type;
instructions that cause the one or more processors to perform a second type of data compression on data values represented by the second attribute for the events in the batch of events, the second type of data compression being different from the first type of data compression;
based at least in part on the instructions that cause the one or more processors to perform the second type of data compression on the data values represented by the second attribute, instructions that cause the one or more processors to generate a second set of serialized data values represented by the second attribute; and
instructions that cause the one or more processors to store the second set of serialized data values represented by the second attribute.

12. The computer-readable medium of claim 11, wherein the second type of data compression is determined based at least in part on the second data type of the second attribute.

13. The computer-readable medium of claim 11, wherein the first type of data compression or the second type of data compression comprises at least one of a base compression technique, a value index compression technique, or a precision reduction and value index compression technique.

14. A distributed event processing system, comprising:
a memory storing a plurality of instructions; and
a processor configured to access the memory, the processor further configured to execute the plurality of instructions to at least:
receive, at a computing device of a plurality of computing devices in the distributed event processing system, a batch of events from an event stream;
identify a first data type of a first attribute of an event in the batch of events;
compute a number of bits to store data values represented by the first attribute and a set of unique values represented by the first attribute;
perform a first type of data compression on the data values represented by the first attribute for the event based at least in part on the first data type of the first attribute, the number of bits to store the data values represented by the first attribute and the set of unique values represented by the first attribute;
based at least in part on the instructions to perform the first type of data compression, generate a first set of serialized data values for the first attribute;
generate a first set of de-serialized data values corresponding to the first attribute based at least in part on the first set of serialized data values;
execute a plurality of continuous queries against the first set of de-serialized data values corresponding to the first attribute to generate a plurality of output event streams; and
transmit the plurality of output event streams to a user.

15. The system of claim 14, wherein the processor is further configured to execute the plurality of instructions to:
identify a second data type of a second attribute of the event in the batch of events, the second data type being different from the first data type;
perform a second type of data compression on the data values represented by the second attribute, the second type of data compression being different from the first type of data compression;
based at least in part on the instructions to perform, generate a second set of serialized data values represented by the second attribute; and
store the second set of serialized data values represented by the second attribute.

16. The system of claim 15, wherein the second type of data compression is determined based at least in part on the second data type of the second attribute.

17. The system of claim 14, further comprising:
identifying a set of one or more operations to be performed on the event in the batch of events based on the plurality of continuous queries;
representing the set of one or more operations as a continuous query language (CQL) Resilient Distributed Dataset (RDD) Directed Acyclic Graph (DAG) of transformations; and
executing the CQL RDD transformations against the first set of de-serialized data values corresponding to the first attribute to generate the plurality of output event streams.

* * * * *

UNITED STATES PATENT AND TRADEMARK OFFICE
CERTIFICATE OF CORRECTION

PATENT NO. : 12,287,794 B2
APPLICATION NO. : 18/301127
DATED : April 29, 2025
INVENTOR(S) : Park et al.

It is certified that error appears in the above-identified patent and that said Letters Patent is hereby corrected as shown below:

In the Specification

In Column 15, Line 25, delete "the a" and insert -- a --, therefor.

In Column 15, Line 46, delete "(2)" and insert -- (3) --, therefor.

In Column 16, Line 12, delete "XML," and insert -- XML --, therefor.

In Column 16, Line 60, delete "XML," and insert -- XML --, therefor.

In Column 32, Line 8, delete "in in" and insert -- in --, therefor.

In Column 36, Line 44, delete "0 where /0 indicates" and insert -- 0where/0indicates --, therefor.

In Column 36, Line 46, delete "values" and insert -- values. --, therefor.

In Column 38, Line 63, delete "range" and insert -- range. --, therefor.

In Column 42, Line 40, delete "below" and insert -- below. --, therefor.

In Column 44, Lines 28-29, delete "programing" and insert -- programming --, therefor.

In Column 57, Line 38, delete "evolution)," and insert -- evolution)), --, therefor.

In the Claims

In Column 60, Line 12, in Claim 7, delete "COL" and insert -- CQL --, therefor.

In Column 62, Line 41, in Claim 17, delete "COL" and insert -- CQL --, therefor.

Signed and Sealed this
Twelfth Day of August, 2025

Coke Morgan Stewart
*Acting Director of the United States Patent and Trademark Office*